US007222078B2

(12) United States Patent
Abelow

(10) Patent No.: US 7,222,078 B2
(45) Date of Patent: *May 22, 2007

(54) METHODS AND SYSTEMS FOR GATHERING INFORMATION FROM UNITS OF A COMMODITY ACROSS A NETWORK

(75) Inventor: Daniel H. Abelow, Newton, MA (US)

(73) Assignee: Ferrara Ethereal LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/734,102

(22) Filed: Dec. 10, 2003

(65) Prior Publication Data

US 2004/0177002 A1    Sep. 9, 2004

Related U.S. Application Data

(63) Continuation of application No. 09/370,663, filed on Aug. 6, 1999, now abandoned, which is a continuation of application No. 08/934,457, filed on Sep. 19, 1997, now Pat. No. 5,999,908, which is a continuation of application No. 08/243,638, filed on May 16, 1994, now abandoned, which is a continuation-in-part of application No. 07/926,333, filed on Aug. 6, 1992, now abandoned.

(51) Int. Cl.
*G06Q 99/00* (2006.01)
(52) U.S. Cl. .................................................. 705/1
(58) Field of Classification Search .................. 705/1, 705/7, 10; 434/107, 118, 365, 350; 235/38
See application file for complete search history.

(56) References Cited

U.S. PATENT DOCUMENTS

| 4,007,355 A | 2/1977 | Moreno ...................... 235/61.7 |
| 4,092,524 A | 5/1978 | Moreno ...................... 235/419 |
| 4,097,923 A | 6/1978 | Eckert, Jr. et al. |
| 4,298,793 A | 11/1981 | Melis et al. ................. 235/487 |
| 4,367,402 A | 1/1983 | Giraud et al. ................ 235/385 |
| 4,376,299 A | 3/1983 | Rivest |
| 4,442,501 A | 4/1984 | Eckert, Jr. et al. |

(Continued)

FOREIGN PATENT DOCUMENTS

JP        6-195162        7/1994

(Continued)

OTHER PUBLICATIONS

Orr, Joel N., Dr., "Join the information economy. (American Information Exchange online information service is the brain child of Phil Salin)" Apr. 1992 Computer Aided Engineering, v11, n4, p. 84; DialogWeb copy pp. 1-3.

(Continued)

*Primary Examiner*—Thomas A. Dixon
(74) *Attorney, Agent, or Firm*—Sterne, Kessler, Goldstein & Fox P.L.L.C.

(57) ABSTRACT

In an exemplary system, information is received at a central location from different units of a commodity. The information is generated from two-way local interactions between users of the different units of the commodity and a user interface in the different units of the commodity. The interactions elicit from respective users their perceptions of the commodity.

74 Claims, 39 Drawing Sheets

U.S. PATENT DOCUMENTS

| | | | | |
|---|---|---|---|---|
| 4,539,472 | A | | 9/1985 | Poetker et al. ............... 235/488 |
| 4,603,232 | A | | 7/1986 | Kurland et al. ................. 179/2 |
| 4,625,276 | A | | 11/1986 | Benton et al. .............. 364/408 |
| 4,642,685 | A | | 2/1987 | Roberts et al. ................ 358/84 |
| 4,677,657 | A | | 6/1987 | Nagata et al. ................. 379/63 |
| 4,731,818 | A | * | 3/1988 | Clark et al. ............. 379/144.01 |
| 4,734,858 | A | | 3/1988 | Schlafly ....................... 364/408 |
| 4,746,787 | A | | 5/1988 | Suto et al. ................... 235/379 |
| 4,746,788 | A | | 5/1988 | Kawana |
| 4,749,982 | A | | 6/1988 | Rikuna et al. ........... 340/146.2 |
| 4,752,677 | A | | 6/1988 | Nakano et al. .............. 235/380 |
| 4,774,655 | A | | 9/1988 | Kollin et al. |
| 4,803,348 | A | * | 2/1989 | Lohrey et al. ............... 235/381 |
| 4,812,965 | A | | 3/1989 | Taylor |
| 4,816,904 | A | | 3/1989 | McKenna et al. ............ 358/84 |
| 4,839,504 | A | | 6/1989 | Nakano ...................... 235/379 |
| 4,851,997 | A | | 7/1989 | Tatara ......................... 364/401 |
| 4,851,999 | A | | 7/1989 | Moriyama |
| 4,859,837 | A | | 8/1989 | Halpern ...................... 235/380 |
| 4,868,376 | A | | 9/1989 | Lessin et al. ............... 235/492 |
| 4,874,935 | A | | 10/1989 | Younger ..................... 235/492 |
| 4,876,592 | A | | 10/1989 | Von Kohorn |
| 4,905,080 | A | | 2/1990 | Watanabe et al. |
| 4,908,761 | A | | 3/1990 | Tai .............................. 364/401 |
| 4,964,077 | A | | 10/1990 | Eisen et al. |
| 4,972,504 | A | * | 11/1990 | Daniel et al. ................. 705/10 |
| 4,975,841 | A | | 12/1990 | Kehnemuyi et al. ........ 364/401 |
| 4,975,942 | A | * | 12/1990 | Zebryk .................. 379/144.01 |
| 4,988,987 | A | | 1/1991 | Barrett et al. .......... 340/825.31 |
| 4,992,940 | A | | 2/1991 | Dworkin ..................... 364/401 |
| 5,019,697 | A | | 5/1991 | Postman ..................... 235/441 |
| 5,023,435 | A | | 6/1991 | Deniger ...................... 235/375 |
| 5,025,374 | A | | 6/1991 | Roizen et al. ......... 364/413.02 |
| 5,041,972 | A | | 8/1991 | Frost ........................... 364/401 |
| 5,109,337 | A | | 4/1992 | Ferriter et al. .............. 364/401 |
| 5,237,157 | A | * | 8/1993 | Kaplan ....................... 235/375 |
| 5,283,819 | A | * | 2/1994 | Glick et al. ............. 379/93.01 |
| 5,438,355 | A | | 8/1995 | Palmer |
| 5,442,759 | A | | 8/1995 | Chiang et al. |
| 5,961,561 | A | | 10/1999 | Wakefield, II |
| 5,999,908 | A | | 12/1999 | Abelow |
| 6,131,088 | A | | 10/2000 | Hill |
| 6,144,848 | A | | 11/2000 | Walsh et al. |
| 6,148,065 | A | | 11/2000 | Katz |

FOREIGN PATENT DOCUMENTS

| | | |
|---|---|---|
| WO | WO 94/03865 | 2/1994 |

OTHER PUBLICATIONS

Kerwien, Craig "PC MagNet: a guide to ZiffNet. (on-line service)" Jan. 1992, PC Magazine, v 11, n1, p. 383(4); DialogWeb copy pp. 1-5.

O'Leary, Mick "CompuServe at the crossroads, it is indeed the most diverse of all online services" Nov.-Dec. 1990 Link-Up, v7, n6, p. 22(2); DialogWeb copy; pp. 1-5.

No author "Unlimited end-user searching for less than $100 a year from CompuServe flat-fee pricing Plan!" Feb.-Mar. 1992 Database Searcher, v8, n2, p. 37(3); DialogWeb copy pp. 1-3.

Fryxell, David A., "Driving a hard bargain; armed with online ammunition, you can get a better price for a new or used car." Sep.-Oct. 1991 Database Searcher, v8, n5, p. 18(2); DialogWeb copy pp. 1-4.

Anonymous, Information Industries: New Ideas on the Block, Economist 322(7750):83-84, dialog copy, 2 pages (1992).

Dyson, "Information, bid and asked", Forbes 146(4):92 dialog copy, 2 pages (1990).

Lahr et al., "Search MAESTRO", Learned Inf 245-253; dialog copy, 1 page (1989).

No author, "Beyond the Metaphor: AMIX Builds an Electronic Marketplace", Electronic Services Update, dialog copy, 4 pages (1990).

Orr, "Join the Information Economy", CAE 11(4):84, dialog copy, 3 pages (1992).

America Online Expands Internet Access, Newsbytes News Network, Mar. 21, 1993, 1 Page.

Microsoft Press Computer Dictionary, Microsoft Press, p. 41, 1994.

Behavioral Techniques In Systems Development, MIS Quarterly, Mantel et al., Sep. 1989, pp. 257-274.

Author Unknown, How to Use Your Computer to Effect Change, Compute v15, n3, pS7(2), Mar. 1993.

Ubois, On-line Problem Solving, MacWEEK, v7, n24, p. 16(2), Jun. 14, 1993.

LaPlante, Who Ya Gonna Call?, InfoWorld, v15n21, pp. S83-S84+, May 24, 1994.

Yahoo Information Center, www.yahoo.com, copyright 1994-1997, 3 pages.

AT&T, MCI to Release New Management Tools ("New Management Tools") Network World, Jan. 17, 1994, p. 19.

Dialog database IAC PROMT: Direct Dispatch Gives Business Software-Based Trouble Management System . . . ("Trouble Management System") PR Newswire Jan. 24, 1994, 1 page.

Kotler, Philip, Marketing Management Analysis, Planning and Control, Fifth Edition, Prentice Hall Inc., 1984, pp. 340-343.

Schoenbrun, Cynthia, "What has become of the small giant," Online v17, n1, pp. 52-56, Jan. 1993.

English Abstract for JP 6-195162, data supplied from the espacenet database, 1 Page.

* cited by examiner

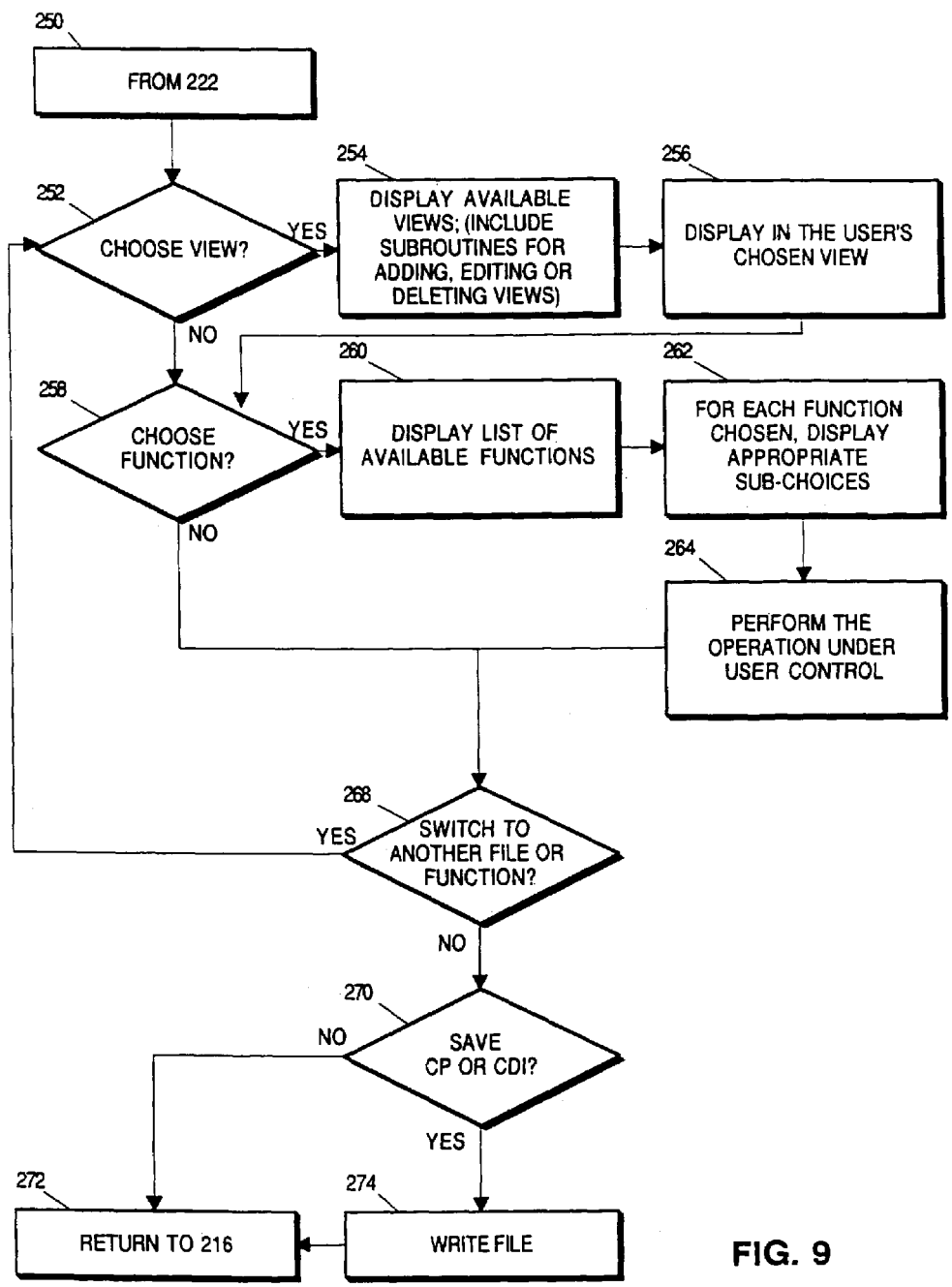

Probe #12: Feature that calculates Net present Value —————— 430

How useful did you find this method of performing this type ——— 432
of calculation? ————— 434
————— 436

| | | |
|---|---|---|
| Very Useful | 12% | 423 |
| Somewhat Useful | 31% | 1,086 |
| Neutral | 25% | 884 |
| Not Useful | 18% | 642 |
| Very Unuseful | 8% | 287 |
| No Answer | 5% | 191 |

————— 438

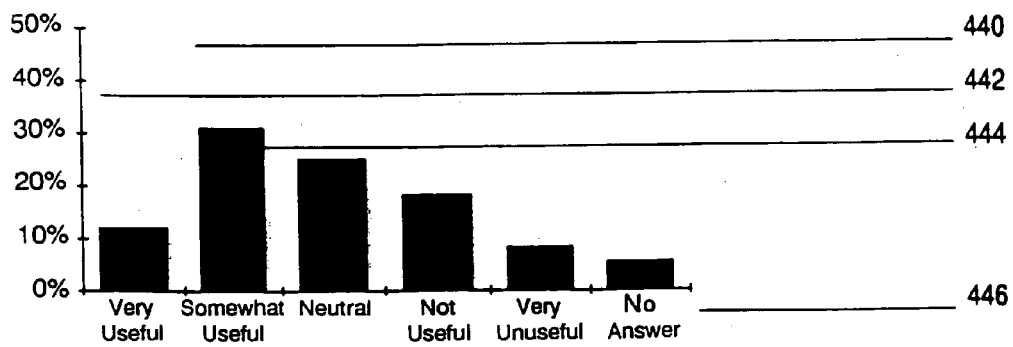

440
442
444
446

Customer comments: ————————————————— 448

Please explain how this calculation method helped or hindered your work: — 450

1 Gives a good understanding of the interaction ——————— 452
 between different financial measures
1 I could experiment with the variables 2 This is easy to understand
2 Gave me a better understanding of the numbers
2 It focused on the key elements so I could think about the sensitivity points 3 Somehow the method and my numbers were not related. Although I spent time on it, it didn't help my
 descision.
3 Too easy to miss the big picture because of data overload.
 Too many numbers to manipulate 4 There seemed to be more than was necessary.
4 Should be more instructive.

5 Help!

No Answer  Can see consequences of different assumptions — 454
No Answer  Helped understanding but too too many tries

FIG. 14

Open Communications and Transactions

AT THE VENDOR

METHODS AND SYSTEMS FOR GATHERING INFORMATION FROM UNITS OF A COMMODITY ACROSS A NETWORK

CROSS-REFERENCE TO RELATED APPLICATIONS

This application is a continuation application of and claims priority to U.S. application Ser. No. 09/370,663, filed on Aug. 6, 1999, now abandoned which is a continuation of Ser. No. 08/934,457, filed Sep. 19, 1997, now U.S. Pat. No. 5,999,908, which is a continuation of Ser. No. 08/243,63 8, filed May 16, 1994, now abandoned, which is a continuation-in-part of Ser. No. 07/926,333, filed Aug. 6, 1992, now abandoned, the contents of each of which are incorporated by reference in their entireties.

BACKGROUND OF THE INVENTION

The growing speed of product development (with shorter time to market, rapid addition of new product features and transformation of many products due to technological change) makes the ability to measure and deal with complexity considerably more difficulty. The rate of product evolution in many product categories has become faster than ever, so measurement methods must evolve to keep pace with the speed and scope of business decision making. Unfortunately, it still generally takes 30 days or more to run many types of meaningful studies in areas like human factors product testing, market research and product field trials. Such labor-intensive studies, conducted by degreed professionals, are also expensive. Since many product design decisions will not wait or do not have the budget, they are made without the benefit of in-depth customer-based studies that would make those decisions clearer, simpler and more accurate.

In some areas current test methods are immature and only partly assist in making crucial product decisions. For example, a growing number of software and computer-integrated products (which may actually be built around a special purpose computer such as a medical monitor) aim to enhance customer performance, problem solving abilities and complex types of thinking. While learning tests are able to determine whether or not a product's users have learned the procedures for using that product, it remains difficult to assess complex thinking skills and changes in attitude toward one's tasks. Those effects must be inferred instead of measured, forcing decision makers to make crucial product decisions based on guesses instead of knowledge.

In other areas it is extremely difficult to obtain action and behavioral information during the actual use of products, services and information systems. From design and business decision making viewpoints this is essential for understanding how products or processes perform across the spectrum of situations and countries to learn their capabilities and deficiencies for actually achieving the goals for which they are purchased. There is a larger, more advanced reason that this information is required now that embedded microprocessors and software are increasingly transforming products, services and the information infrastructures used to operate many types of organizations. In-depth measurement and data are needed to dynamically trigger automatic and appropriate responses and reconfigurations in response to rapidly changing conditions and swiftly evolving situations.

In a growing number of product categories and industries one key to success is improving the full range of outcomes required by customers for their success. For example, the entire computing industry has been judged harshly for failing to significantly improve productivity measures. Similarly, the medical industry struggles to learn how to provide quality care with a lower cost-per-patient outcome. Such transformations in performance require simultaneous improvements by vendors, customers and everyday product users, which requires systemic and systematic measurement and dynamic adaptation across products, organizations, industries, markets and societies. The immediate availability of accurate and meaningful decision making and reconfiguration information is essential for improving products, business decisions and competitive performance with the speed and scale that are required by today's competitive pressures and societies.

This broad range of needs clearly calls for faster, easier, more direct and broader means for learning customer requirements, measuring actual performance, communicating that information in automatically analyzed formats, and responding to customers and users dynamically based on their group or individual objectives and performance measurements.

This Customer-Based Product Design Module invention uses a combination of computer hardware, software and communications technologies to construct a module that is built into certain products and services, to establish a network of customer-vendor-distributor interactions and communications (or a network of internal organization-wide interactions in the area of computer-based performance). These make possible new customer and user roles in the design and development of products and services, and customer-vendor relationships. Over time, this may produce a gradual transfer to customers of commercial direction and market control, both in individual cases (such as the evolution of a particular product) and in aggregate, from vendors and distributors.

One of the core purposes of the invention is illustrated in FIG. 15. This is the ability to learn interactively and iteratively from the users of products and information systems anywhere in the world while they are in use—without having to travel to their sites (or without having to bring them to a testing laboratory). Since this is a two-way link, it also offers the ability to respond meaningfully to customers and users based on worldwide, local, organizational or individual needs regardless of where they are located.

Information technology is so new that we're still figuring out what it is and what it should do for us. This technology turns the user interfaces in products, equipment, tools and toys into an interactive learning system that connects vendors, users and marketplaces worldwide. While this emerges from the built-in computing that is becoming an increasingly common part of many products, it transforms the product interface into a learning device and a learning system—for individual products, for marketplaces and potentially, for societies and economic systems.

Product interfaces are increasingly connected to built-in or embedded computing. These interfaces already surround people at work and at home on equipment (whether in business offices, doctor's offices, factories, construction sites, hospitals, etc.), computers, consumer electronics and more. These interfaces are moving into pockets and briefcases via handheld electronic organizers and PDAs (personal digital assistants). They are transforming millions of computer and TV screens via interactive services and channels. Picture a new module behind interfaces around the world. This enables them to "wake up" when these products and services are used so they ask questions based on how they are used. The module stores user answers and uploads them periodically, and its overall architecture delivers a clear and broad picture of the current state and evolutionary changes in individual and group needs. The module/architecture of this invention also downloads into products new questions, user support, or other new capabilities so that product interfaces provide continuous two-way learning, and users receive new information or features that can be delivered through the product itself.

This may help transform the increasingly everyday environment of built-in computing into a two-way system for meeting both vendor and customer needs faster, more accurately and more effectively. Since this technology is scaleable, it doesn't matter whether the focus is:

One vendor's product in one customer's hands,
All of that vendor's products in use in one country,
The marketplace for those types of products in that country, or
Multiple markets around the world.

Since this through-the-product communications may be used to transform customer-vendor relationships, results may include:

Products that can learn from and work with individuals or groups in new ways, or
Markets that employ these new built-in communications/ information systems to provide new benefits such as additional market efficiencies, built-in marketwide user performance support systems, or accelerated economic growth for individual vendors or national economies.

Everyone talks back to products, but not with words they can repeat in public. Think how customers would guide products and services toward what they want if they could really talk back while they use a product, both when they have a problem and when they have an unmet need. Vendors might find an alive marketplace that helps them improve products, services and business relationships.

A number of service industries, such as market research and product testing, seek to help vendors understand their customers. This invention may enable vendors to learn directly from their customers on an ongoing basis and establish a private two-way product development relationship with them, providing a valuable addition to some current methodologies. This invention may also produce more accurate information than these measurement services because it works with larger numbers of customers, in many more markets and market niches, to learn their needs, expectations and desires during the actual everyday use of products and services.

How does this invention accomplish this? Today, microprocessors are often embedded into products as controllers. For example, many new cars have a dozen or more microprocessors inside of them. This invention uses technology to embed a customer-vendor-distributor NETWORKING MODULE into vendor-selected products and services. This technology-based Module turns the product's interface into a two-way learning device, connected to a larger learning system and architecture, so that rapid and iterative customer-based progress may become a feature of those products, services and markets. Because learning, measurement and performance improvement are interconnected, this new feature may involve customers (as individuals, in groups and marketwide) in the product evaluation and design process, and in planning business services so that they serve customer needs better than competitors can accomplish. These are strategic advantages for companies, societies and economic systems.

For products (and information systems) that contain this Module, customers may continuously inform vendors (or developers) of their current and emerging needs. The vendors of those products may have the best opportunity to respond swiftly to a much clearer view of customer problems, product problems and market opportunities than they have today. The inventor believes that within a generation it will be normal for many products and services to include this type of Module, so that customers (in aggregate, the market) comes to play a larger role in directing and controlling the commercial development of many products and services.

The closest known prior art is a combination of six areas. When combined, these six areas represent the prior art for this invention:

1 Market Research

Product and service vendors invest considerable money, employee time and corporate credibility to create their products and services. Are they as successful as they want to be? The market research industry has sprung up to answer a host of questions about customers. It is obvious that in spite of these market research efforts, customer needs that remain unknown and unfilled provide constant opportunities for creating and launching new products and services. In addition, many customers use products and services in ways that are not anticipated or fully understood by market researchers.

Why doesn't market research provide greater understanding? In market research, a variety of methodologies are used to segment groups of customers and to show the preferences and desires of the market segments. Typically, market research focuses on gathering either quantitative data (such as demographic information or numerical responses to surveys and questionnaires) or qualitative data (such as from focus groups). One of the main limitations of these research studies is that they are usually separate from the customers' actual and everyday use of the products and services being investigated.

2 On-line Surveys

In an on-line survey, a subject sits in front of a computer. Generally, this means bringing the subject to the computer that is running the survey software. At the time the subject has been told to complete the on-line survey, the survey software is run and it asks the subject questions. The subject uses a keyboard or mouse to answer the questions. The software records the subject's answers in a data file. After that subject has completed the survey, the software can report those answers. After all the subjects have been run, software can report various compilations of the data set, and provide various analyses of an individual subject, a sub-set of subjects, the entire group, or comparisons between various sub-groups. Over time, a series of on-line surveys can be compiled, and the data may be compared in various ways (such as longitudinally).

3 Field Programmable Logic Devices

Engineers now able to rapidly produce unique, custom programmed chips in their offices using "desktop silicon foundries." An engineer uses a personal computer or workstation to design the chip with commercially available software. A blank chip, in a special box attached to the desktop computer, is programmed in a few minutes. This is by far the fastest and cheapest way to create custom chips that add custom features to products. When a chip design is finished, if only a small number are needed, copies can be made in that "desktop silicon foundry." If many of these custom chips are needed, they can be mass produced in a factory.

4 Hand-held Bar Code Readers

These devices are carried into the field by many types of employees, such as couriers for organizations like Federal Express. These devices gather data from individual products or transactions by means of reading printed bar codes. This data is held in the bar code reader until it is connected to a computer or to a device that communicates with a computer. At that time, function keys are pressed and the bar code reader's data is uploaded to the computer. During that same connection, function keys are pressed and the bar code reader may be reprogrammed by means of downloading new software into the bar code reader's memory.

5 The Calculator

The small, hand-held calculator contains a microprocessor, memory, display, power supply and input buttons. It can be mass manufactured in large enough quantities that these devices can be sold very inexpensively.

6 Smart Cards

The Smart Card is like a calculator with additional memory and functions built into it. It is used for many types of applications, such as electronic ID systems that provide secure access throughout corporate offices, maintaining personal medical or financial account histories, and other single-purpose uses. A number of the prior art for Smart Cards and related devices demonstrate the feasibility of the present invention, including:

(a) Systems for storing and transferring data between persons based on portable electronic devices (U.S. Pat. No. 4,007,355, February 1977, Moreno and U.S. Pat. No. 4,092,524, May 1978, Moreno), (b) A portable element of reservation systems, for receiving, storing, displaying and outputting digital data (U.S. Pat. No. 4,298,793, November 1981, Melis et al.), (c) A credit card with a memory, including plural memory fields, for keeping accounts with predetermined homogeneous units (U.S. Pat. No. 4,367,402, January 1983, Giraud et al.), (d) A data processing card system that may be carried by a user for insertion into external terminal devices, which actuates the data processing card system (U.S. Pat. No. 4,539,472, September 1985, Poetker et al.), (e) A system for transferring electronic funds by means of portable modules which connect to resident units for transferring data between units or to a central computer (U.S. Pat. No. 4,625,276, November 1986, Benton et al.), (f) An apparatus that accepts data from a people monitoring system (which is attached to a television set), stores the data and transmits it to a removable local unit that stores it (U.S. Pat. No. 4,642,685, February 1987, Roberts et al.), (g) A voice recording card can record and reproduce messages, and transmit and receive messages (U.S. Pat. No. 4,677,657, June 1987, Nagata et al.), (h) An IC card for operating machines such as automatic cash machines and ID systems, including a display for displaying stored data, an IC card reader for reading the IC card, and transmitting/receiving means for updating the data (U.S. Pat. No. 4,746,787, May 1988, Suto et al.), (i) An intelligent card that includes a keyboard, display and IC chip, designed to provide secure identification of the card's holder (U.S. Pat. No. 4,749,982, June 1988, Rikuna et al.), (j) A customer service system that stores customer service information in an IC card, and displays it on the card's display, based on menu selections by the person holding the card (U.S. Pat. No. 4,752,677, June 1988, Nakano et al.), (k) An IC card system compatible with a bank account system, including account maintenance, money transfers and the functions of credit and debit cards (U.S. Pat. No. 4,839,504, June 1989, Nakano), (l) A portable data carrier that stores more than one bank and/or credit account number and data, and provides account information by means of a display (U.S. Pat. No. 4,859,837, August 1989, Halpern), (m) An intelligent portable interactive personal data system (U.S. Pat. No. 4,868,376, September 1989, Lessin et al.), (n) A smart card apparatus and method of programming it, including a smart card control program and a data dictionary (U.S. Pat. No. 4,874,935, October 1989, Younger), (o) A method and system for using facsimile machines to perform electronic funds transfer (U.S. Pat. No. 4,960,981, November 1990, Benton, et al.), (p) A portable electronic keysafe system (e.g., a secure lock) that stores data, along with a stand to interface with a computer, and a computer that programs the lock (U.S. Pat. No. 4,988,987, January 1991, Barrett et al.), (q) A data collection system useful for trade shows employing a card containing a memory chip for recording and storing the data of individuals (U.S. Pat. No. 5,019,697, May 1991, Postman), and (r) A portable interactive medical test selector that displays questions to a patient, stores answers and analyzes the answers to recommend appropriate medical tests (U.S. Pat. No. 5,025,374, June 1991, Roizen et al.).

This invention combines the prior art in a new distributed system whose components reside:

In products (as defined by this invention),

At vendors, and

Throughout the marketplace or throughout an enterprise (when built into its internal business and computing systems).

Some of its technology parallels include:

Bank Automated Teller Machines (ATMs), in which simplified local interactions with individual customers are linked to centralized systems via marketwide networks, to provide immediate personal services across markets and large geographic regions.

Automobile racing, in which key systems of a race vehicle are monitored by sensors, and combined with direct voice communications with the driver, to gain the clearest possible computer display and understanding of the driver's problems and needs, and to gain the new competitive abilities of supporting the driver so that the driver has the best possible chance to perform better than competitors.

The worldwide telephone network and linked voice mail systems, in which individual local users, who may be located anywhere, operate the global phone network and attached voice mail systems with a small keypad of ten numbers (0–9) and two buttons (# and *), illustrating how a simple means for a user to interface with a product or service may control and communicate with complex systems that are widely distributed.

What Are Products and Services?

The departure from this prior art comes from fundamental re-definitions: Physical products and many types of services are really high-level concepts that use specific physical designs of products and service concepts to engage customers and attempt to satisfy their needs, desires and expectations. This is inevitably imprecise, and customers flexibly and individually determine how they will use the products and services that they buy. Thus, any one embodiment of a physical design is temporary and subject to improvements, even though it may look permanent at any one moment.

Vendors typically use market research to discover unfilled user needs and create new product and service designs that might capture valuable market share. The resulting physical products and services are therefore the current conceptual embodiment of a vendor's current knowledge of customer and user needs. As this knowledge is improved, the physical and process designs of products and services are altered. Thus, we propose that the current designs of products and services at any time are a reflection of a vendor's knowledge of customer needs and desires.

A second redefinition is that the current concept of a product life cycle may become less precise and less meaningful as product markets become information markets. The core transformation is from a product development stage followed by a product launch stage and one or more sales campaigns with occasional product improvements when needed to meet sales and revenue objectives. As enabled by this invention, the initial development stage increasingly interpenetrates all other stages of the product life cycle, the operations of corporations, and the evolution of economic systems (i.e., capitalist economies).

As envisioned by this invention, as customers and vendor employees interact to produce continuous improvement, the marketplace may be e-engineered into an interactive development environment (i.e., research and development environment, or R&D environment) with a national or global scope. The opportunities for accelerated learning may transform:

The ability of an individual corporation to satisfy the needs of its customers,

If that company gains competitive advantages that produce additional market share, or other meaningful advantages, similar in-product communications may be adopted by competing companies, which may transform the industry or the marketplace, As the industry or marketplace evolves to interact with its customers, the fundamental efficiencies of those markets and those industries may increase.

As the continuous improvement capabilities of particular industries in particular countries grow, the global market share of those industries and countries may transform the leading companies in those industries worldwide.

Because of the embedding of microprocessors and computing into products, some of the types of industries that may be affected include computers, software, electronics, communications, interactive entertainment, multimedia, transportation, energy, farm equipment, avionics, medical equipment, scientific instruments, etcperceivable or measurable improvements may include customers receiving more of what they really want to buy for each dollar they spend, faster product evolution based on customer needs, increased market shares for companies that are more responsive to customer desires and more able to assist customers in achieving their goals, etc.

Thus, a technology may lead to organizational and market efficiencies that empirically improve the efficiency and effectiveness of capitalist markets. In Adam Smith's terms, the "invisible hand" of the market may be rendered "visible," accelerating the evolution of human welfare by providing greater benefits from free choice and personal freedom. In sum, the redefinitions intended may simultaneously be technological, operational (for products, organizations and economies) and political.

Today there are many approaches to competitiveness and the cost of failing to find a successful approach has mushroomed For example, some world-class corporations use new technologies to capture market share. Others use a constant launching and churning of new product models to attack their competitors' customer-vendor relationships.

This invention focuses on the competitive strategy of having companies work in a partnership with their customers to gain the greatest ability to concentrate their scarce resources on developing the products and markets that customers want most, and on serving customers in the ways that are most valuable to customers, so that these companies gain the largest increases in sales and profits. It suggests that the value of these customer-vendor relationships may be a central business advantage at this point in the emergence of a global information age, and this advantage may be explicitly captured by engaging in new types of product development partnerships that may be made possible by this invention.

Needs for This Invention (Note: this invention's terminology is defined at the beginning of the Preferred Embodiment.)

Simply put, this invention helps vendors and customers by transforming their learning cycle: It compresses the time and steps between setting business objectives, creating effective products and services, and improving them continuously. It also alters their roles: Customers become partners in the improvement process along with vendors and distributors.

This invention's "Customer-Based Product Design Module" (CB-PD Module) generates numerous opportunities for improvements by integrating customers and employees into the design and delivery of products and services as a continuous process. The invention describes a specific new class of product feature that may be added to, or built into, many types of products and services. The CB-PD Module engages Customers in Development Interactions (DI) while products and services are being used. The customers and users provide direct, on-task understanding of their use of the products and services, and of their unfilled needs, to the product vendors, designers and developers Development Interactions (DI) will take place most often during actual uses of the product or service, which is when most unreported problems and dissatisfactions occur. The results of these Development Interactions (DI) clarify customer needs, improve products, and they may also help solve problems, control costs, and improve services and operations.

Because it automates this process and adds networking to many types of products and services, this invention may help change the cost, economics, methods and desirability of involving customers in the design and evolution of products and services. By automating this process, there are new opportunities to produce valuable customer-based information that may become low in cost and constantly available. This might transform the overall learning cycle, the very process by which products and services can be improved continuously in the future. In other words, if your customers and users are telling you directly what has value to them and what doesn't, this becomes a way to manage a business better, to select priorities more responsively, to budget scarce capital and human resources more accurately, to target the points where one's products and services make the most difference to customers, and to increase the company's revenues and profits faster than competitors.

With this CB-PD Module, because of the new customer-vendor partnerships and learning cycle it creates, the result is a different learning cycle based on new kinds of interactive feedback from customers. Over time, if one or more general purpose CB-PD Modules can be productized and modularized for rapid and affordable insertion into appropriate products and services, that will decrease its cost, accelerate the learning process for many companies, and expand management's ability to work directly with their customers to provide valuable new benefits faster than they are able to today.

From this invention's viewpoint, critical management decisions spring from the fact that vendors invest considerable money, employee time and effort to create and market their products and services. One of a vendor's most important questions is, "How can our currently available resources be leveraged to jump faster and farther toward our goals?" Potential opportunities exist at two levels. There are local decisions, such as how to design or improve a specific product or service. There are also system decisions, such as how to prioritize the relative value of different product and service investment opportunities. With multiple opportunities and limited resources, how can vendors continually identify the best available opportunities for investing in products and services, and for choosing their specific features and user interfaces?

Answering these types of questions, to improve the management of businesses, the quality of products and the satisfaction of customers, are some of the core purposes of this invention.

SUMMARY OF THE INVENTION

Role of this Invention (Note: this invention's terminology is defined at the beginning of the Preferred Embodiment.)

This Customer-Based Product Design Module (CB-PD Module) invention is designed to embed a new type of product feature within a range of products and services, helping them evolve into Customer Directed Products (CDP) by means of Development Interactions (DI). The result is a continuous source of Aggregate Customer Desires (ACD) and Defined Customer Desires (DCD) from customers and users while they are using these products and services. This serves vendors as a continuous way to listen to Customers and understand their performance, their needs and their expectations.

The architecture includes varying components and features 662, 670, 672, 664 in FIG. 17 that form a continuous learning and communications system 666, 674 between vendors and customers. A logical starting point is the authoring system 662 on the computer of the vendor 660 This is used to construct automated interactions and download them 666 to CB-PD Modules in products 670. Vendor employees run the authoring system on their computer(s).

The CB-PD Module 670 obtains its findings while customers are in the middle of product uses 668, during their real situations and needs. This has the potential to transform the role of Customers from remote and only partly understood consumers into design partners with vendors 672, 674. By automating these critical connections and the analysis of customer needs 664, this may produce faster, more accurate and profitable working relationships between vendors and customers.

With a mainframe computer, minicomputer, Local Area Network (LAN) or another computer system at the vendor, the Defined Customer Desires (DCD) may be made available on-line 664. While each organization would decide which managers and employees should have access to this data, there is considerable opportunity to expand the connections between customers and employees throughout-vendor organizations. At the same time, the CB-PD Module is an unobtrusive product feature. It is largely invisible to vendors and customers except when (1) the vendor sets up this Module 662, (2) customers engage in Development Interactions during some of their uses of a product or service 670, and (3) when vendor management requests or receives a processed report 664.

Description

An integrated set of components enables this technology as a new communications media in products for vendors, customers and marketplaces. This provides a digital "knowledge environment" that may improve the efficiency and effectiveness of companies and markets. This structure is addressed in FIG. 18 for a single vendor, and FIG. 19 for the larger digital environment and the capabilities it may add to multiple vendors and markets.

On the front-end, the authoring system has a universal data structure that supports the rapid distribution 692, 722 of professionally written customer interactions 696, 692, 694. Users could assemble their in-product dialogs from interactions written by leading professionals in areas like user interface design, usability testing and market research 722A built-in copyright accounting system 720 lets users buy this know-how by purchase order, credit card, etc. Built-in electronic mail lets them receive additional on-line services from those professionals 722, 726, 734 (such as validation of a product's set of dialogs) or buy additional services and data from them.

On the back-end, a universal data dictionary and data structure provides the ability to distribute user information across organizations and between them 708, 690, 692, 694, 734. This projects the ability to learn from users organization-wide 708, 692, 694 and industry-wide 732, 734 Computer screens and printers at one or more vendors 732 could display current user needs—throughout an enterprise 690, 692, across a network of supplier-manufacturer-distributor-retailers 732, 734, at industry trade associations, or sold by third-party vendors of research data 724, 726. Customers could guide these groups 724 in making markets more efficient so that the money customers spend buys them what they really want.

In the same way that the authoring system sells professional know-how 720, 724 the analysis system could sell specialized analysis tools and services from leaders in market research, sales forecasting and customer satisfaction 732, 734. These tools can be sold as products (a software package for specialized data analysis or forecasting), as time sharing (on a per-use basis) or as a service (outsourced data analysis and consulting). When sold in the latter two ways, the tools can be located at the professional's site 734. The vendor's data and the completed analyses can be exchanged by the e-mail capabilities in the technology 734.

Together, the authoring system and data analysis system could turn this architecture into a "point-of-use" distribution system 722, 734 for leading professionals to sell their know-how and services directly to users through the computers on their desktops—at vendors of products in industries and markets worldwide. The best capabilities in areas like user research, product development, sales and marketing could be accessed digitally by users anywhere, 24-hours a day—a digital "knowledge environment" for improving products, sales and the effectiveness of markets FIG. 19.

A CB-PD Module may have varied designs, to fit the functionality of each particular product or service. For a first example, consider a general purpose CB-PD Module. This would be a removable, self-contained module that could be either battery powered or receive its electricity from the product. It includes its own display or speaker for communicating with the Customer; its own keypad or microphone for the Customer to communicate with it; its own microprocessor and memory to run Customer Design Instruments (CDI), interact with the Customer and store the Aggregate Customer Desires (ACD) data that result from those interactions; its own interface to the product to receive signals of specific types of events (such as when the product is turned on and off, when certain product features are activated, etc.); its own means to communicate with the Vendor (such as by an internal modem to link to the telephone network, by a plug to connect to an interface unit like a bar code reader, by a removable chip that stores and carries the data to an external reader, etc.), etc. Some interface and I/O options include the screen, keyboard, keypad, pen, printer, physical buttons on the product, voice (speaker and microphone in any form), modem, phone plug, antenna, corporate network, floppy disk, VANs (value added networks), and third-party service companies that may collect user data. By including such means that are appropriate in each instantiation, this interactive networking invention could be mass manufactured and included in a variety of products and services.

For a second example consider a product that includes its own keyboard for entry and a printer for output, such as an electronic typewriter. A CB-PD Module in the typewriter would be programmed to interact with the Customers or users (such as at every Nth time the unit is turned on, like the 10th and each successive 100th time). If the customer agreed to participate in a Development Interaction (D)), the CB-PD Module would print a series of pre-programmed probes on a paper that the Customer inserts into the typewriter, one probe at a time. The Customer would answer each probe after it was printed, by means of the keyboard. To communicate back with the vendor, the typewriter could (1) if the CB-PD Module contained a modem chip and plug, it could be connected to a phone line so it automatically sends its data to the Vendor, (2) print the address for the Customer to mail in the replies; or (3) print folding instructions and then the address right at the bottom of the replies, so they could be folded closed and mailed.

A third example is any equipment that includes playback and recording, such as VCRs, dictation recorder/transcribers, and computer-controlled products (such as a desktop computer or a personal digital assistant). A CB-PD Module would speak or display (on the TV screen) pre-recorded questions (recorded on chip or on a CB-PD Module tape or disk packaged with the product). The answers could be recorded on tape, in digital storage or on a chip. For example, with a VCR, multiple choice probes could be displayed on a TV screen from a CB-PD Module in the product; the Customer would answer by pressing channel number keys on the hand-held remote control sold with the VCR; the answers would be recorded on a tape that the Customer inserts into the VCR; at the end, the Customer could mail the tape in to the Vendor Depending on the VCR's recording capabilities, open-ended questions could also be asked, with the Customer providing a spoken or a written reply.

A fourth example is a product that might suffer any type of a problem, breakdown or cause user-interface confusion. The CB-PD Module might have a "Help button" and the Customer would press it whenever there is a problem, suggestion or need that the Customer wants to report. The product would use its native recording capability, the CB-PD Module would use its recording capabilities, or the Customer would be instructed in one of the alternative recording options described below. In the simplest example, the Customer might press the CB-PD Module's Help button 1 to 4 times to answer a 4-part multiple choice question, and the customer replies could be stored in the internal Module. This data could be returned to the vendor by one of the means described in the preferred embodiments, such as by reading the CB-PD Module when the product is returned for repair to the Vendor or to a service center.

The fifth example is when a service is provided, such as a car rental. The CB-PD Module could be voice-controlled and installed under the dashboard of the rented automobile Customers could provide the Development Interaction (DI) during their use of the service (i.e., the car). Between each customer, the rental company could download the data from the CB-PD Module, or swap it for a fresh one if it were a modular plug-based unit, then download the data by means of separate data reader (see the preferred embodiments, below).

A sixth example includes information industry products (a software product, corporate application software, a corporate information system, a computer operating system, a computer, a computer peripheral, data communications devices, etc.); products from the convergence of formerly separate industries (interactive home television, electronic newspapers or books, wireless mobile electronic devices of many kinds, etc.); or entirely new interfaces for existing products (such as voice interfaces for desktop computers, pen-based message-pads on hand-held cellular telephones, etc.).

In all of these examples, the CB-PD Module could be re-programble so that new Customer Design Instruments (CDI) could be put into them as needed.

Usage

Each vendor could decide where and how to use CB-PD Modules in its products and services FIG. 20 illustrates this complete system for automating the authoring of Development Interactions (DI) 752, conducting interactions between customers and Customer Designed Products (CDP) 754, 756 during product use, the delivery of data to vendors 760 or into the product itself to produce immediate product modifications 762, followed by their automated analysis into Defined Customer Desires (DCD) 758, and delivery to vendor managers and employees as Customer-Based Product Design Reports (CB-PDR) 758, followed by asking new questions 752. This may result in frequent addition of Customer-based product design recommendations during most stages of a product's life cycle, including:

Uses during product development: As a complete turnaround system, the CB-PD Module can help track the testing of new and prototype products during their development, and provide the output of Aggregate Customer Desires (ACD) and Customer-Based Product Design Reports (CB-PDR) to product managers and designers. This keeps the development team informed of Customer responses and recommendations.

Use in currently marketed products: Once a product is on the market, the CB-PD Module can be used to accelerate future improvements in the product by means of customer-generated suggestions and insights Specific Customer Design Instruments (CDI) may be used to elicit different information from specific groups of customers (such as by dividing Customers functionally by their product uses, or vertically by their market segments). The speed of this system also plays a role in that it communicates back to the product developers, instantaneously in some cases or at least quickly in many cases, the desires of numerous customers that would otherwise not be known or applied.

Though this describes numerous uses, this might be made quick and easy for customers while they are using many types of products, in many markets and countries. There is already the system of UPCs (universal product codes), which is the bar code symbol on many products. Similarly, this technology may evolve a UPI, a universal product interface 870 in FIG. 24, 966 in FIG. 27, 1026 in FIG. 29, 1056 in FIG. 30, 1086 in FIG. 31A clear and predictable interface would make it easy for users to turn from one product to the next, know how to interact with new products and guide vendors as a normal product feature. Such a UPI would evolve as a usability tested interface or pattern(s) of interaction(s) that are independent of a particular internal operating system or product category, so it could fit many types of products and platforms.

Possible Impacts from this Invention

Some of the possible impacts include:

A first potential impact could be on the market share of vendors who include this in their products. The CB-PD Module may provide competitive advantages that fit the vendor's needs because, in the end, many vendors develop a product or service for only one reason, and that is to produce sales and profits. This invention offers the ability to demonstrate clearly to decision makers at the vendor company what it is about their product that is, or is not, effective, appealing, useful, etc. to their Customers while their product is being used. In many product life-cycle decisions, these clearly Defined Customer Desires (DCD) could prove to be crucial for the design, marketing, positioning, and future of the product and its specific features.

A second potential impact is that this makes material transformations in the products and services that include this invention. For example, the Defined Customer Desires (DCD) that receive the most attention by the product's vendor may be those that appear to have the largest direct impact on the financial success and marketing performance of the product (or the fundamental goals of the organization, which may or may not be commercial; for example, an educational institution may be developing a technology-based curriculum product to produce certain learning outcomes or performance results, such as new skills in its students, and it may use a CB-PD Module to assess outcomes of its curriculum product during use, helping provide a constant flow of improvement information for this educational and non-commercial "product").

A third potential impact is that this may change relationships between some vendors, customers and product users. For example, instead of a remote relationship between sellers (vendors) and buyers (customers) they have the opportunity to engage in an evolving dialog during product use, and redefine their relationship. One potential direction is for customers to assist or direct vendors in defining product features, interfaces, functionality, etc. Another potential direction is for customers to assist or direct vendors in developing services offered with the product, such as training, documentation, customer support, financing, volume buying discounts, etc. In addition to improving products and services, many new options are available. Three examples are on-line customer support (that is built into the product and responsive to individual customer needs), interactive performance support systems (that measure customer productivity, recommend productivity improvements, and assist customers in achieving them), and point-of-use transactions (the ability for customers to buy additional products and services from vendors through products, while they are using them, anywhere in the world).

A fourth potential range of impacts may come from using this as a broadcast, narrowcast or point-to-point communications media. One contribution of a patent could be to produce all three capabilities by requiring licensees to adhere to common standards. Thus, A vendor could "broadcast" to all the users of its CB-PD Module-equipped products throughout a marketplace, or "narrowcast" to specific groups of customers in specific market niches. If the customer chooses to identify himself or herself (such as someone who has an urgent need, wants on-line personal support, or is conducting a transaction through a product) the vendor could send a point-to-point reply to the module in that customer's product. In reverse, users could choose to send (or sell) their data to any third-party, including information buyers FIG. 19 726. Who is more interested in the problems and needs of one vendor's word processing software product—that software vendor, a competing software vendor, a vendor of market research data, or a corporation deciding which word processing software to buy? With modules in products and communications options, the data from users has commercial value and may be a source of revenue to product users.

An agenda for product development may thus emerge from customer participation: the sphere of involvement and influence is potentially expanded far beyond product developers and internal managers (which is generally the scope at present). Vendor employees may gain a greater recognition of the direct stake that customers have in the products and services that they buy and use. Similarly, customers may recognize the direct stake the vendors have in their ability to perform and succeed with the products they buy. These converging interests may foster new types of partnering, networking and market relationships made possible by this invention.

The questions of how this invention may improve market share and profits are answered by suggesting that vendors may become increasingly customer responsive by means of this invention. This may empower customers to make a normal and largely unobtrusive part of using products and services the interactive communication of their unfulfilled needs, to pro-actively guide vendors. To the extent that vendors gain market share, bottom-line increases and competitive advantages from this expanded relationship with customers, they would demonstrate the strategic value of turning their product interfaces into a marketwide learning system that increases their ability to respond faster and more accurately to customer needs, that improves the performance and effectiveness of their customers, and that allows them to satisfy individual, group and market needs better.

If that should happen, it would become increasingly difficult to think of many types of products and services as non-communicative and unresponsive On-line, networked products (i.e., those with a CB-PD Module, which this invention calls Customer Directed Products) offer a range of expanded two-way, interactive relationships between customers and vendors. Over time, these new relationships might even produce an evolution of free market economies toward increasingly responsive processes (see below for an initial description). If that evolution does begin, the companies that fail to add this type of interactivity to their products (where this is an appropriate addition added by their competitors) might grow increasingly out of touch with a faster-moving world that includes two-way opportunities to improve products and services rapidly—a new normal way to do business in a networked world.

BRIEF DESCRIPTION OF THE DRAWING

The above and other features and advantages of the present invention will become apparent from the discussion below of specific, preferred embodiments presented in conjunction with the accompanying drawings. It is to be understood that the drawings are designed as an illustration only and not as a definition of the limits of the invention.

FIG. 9 is a flow chart of the Instrument Design Repository (IDR).

FIG. 14 is an illustration of a recommended reporting format for Customer-Based Product Design Reports (CB-PDR).

FIG. 15 is an illustration of the invention's geographic scope.

DESCRIPTION OF THE PREFERRED EMBODIMENTS

Components of this Invention

Figure 1:
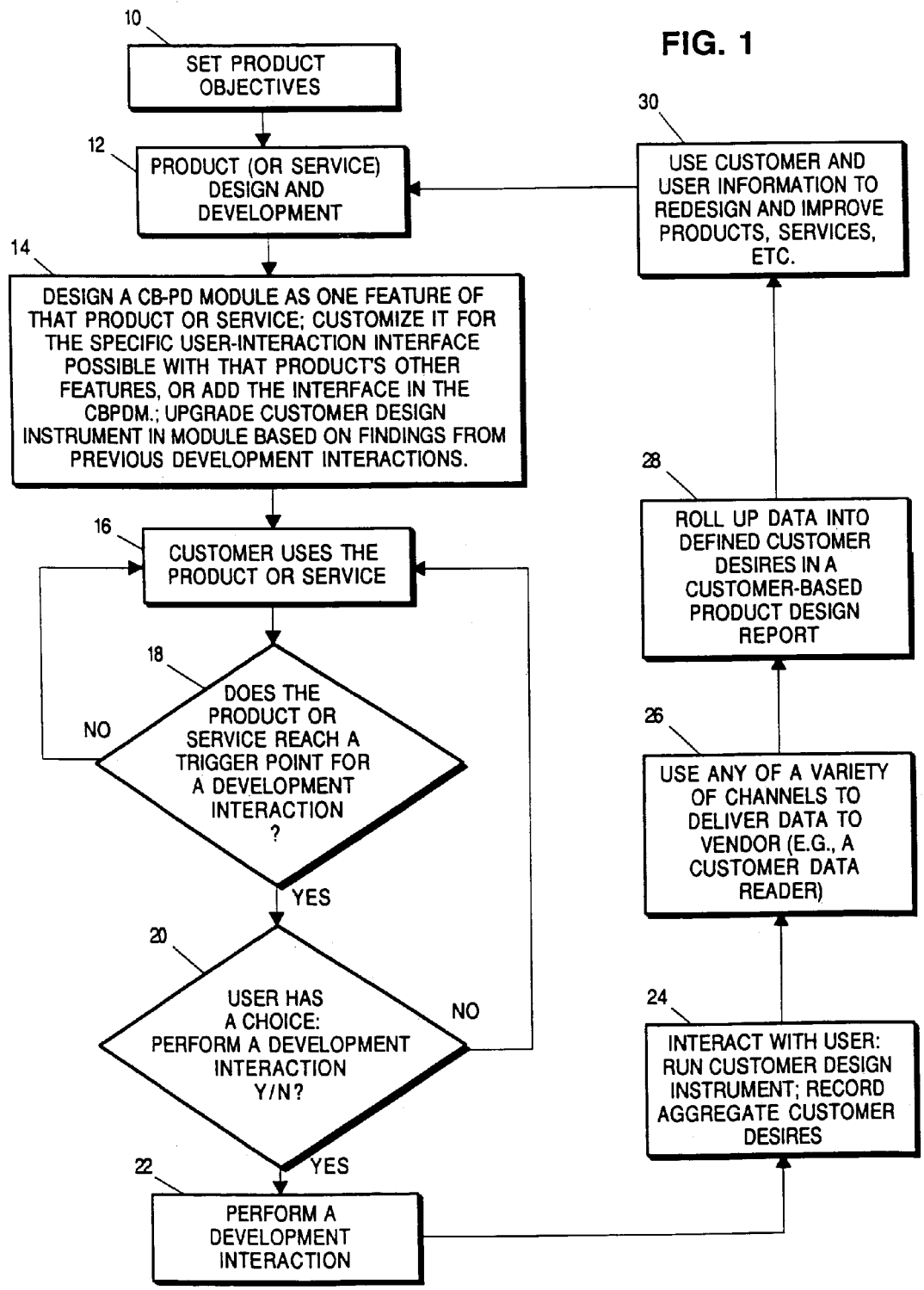
FIG. 1 is a flow chart of the Customer Design System (CDS).

To facilitate the description of the invention, it is worthwhile to define some conventions solely for this purpose. These conventions are somewhat arbitrary and should not be construed as limiting to the generality of the invention. For the purpose of this description:

(a) Customer Directed Product (CDP): An interactive product includes a CB-PD Module (which may be attached to a product or built into it); a CDP interacts with the Customer, or the Customer may initiate interactions with a CDP; these interactions are by means of the CB-PD Module.

(b) Customer Design System (CDS) is the overall, interactive system by which the Customer provides design information to a Vendor.

(c) Customer Design Instrument (CDI) is a specific set of Customer Probes (CP) that are intended to elicit the raw data, which are called Aggregate Customer Desires (ACD).

(d) Customer Probes (CP) are the prompts, questions, etc stored in a CB-PD Module for interacting with a Customer.

(e) Instrument Design Repository (IDR) is a stored set of Customer Probes (CP) that are available, as an authoring system, for use in constructing Customer Design Instruments (CDI). It also stores Customer Design Instruments (CDI) that may be reused or modified to produce new Customer Design Instruments (CDI).

(f) Aggregate Customer Desires (ACD) are the raw data that results from customer use of the CB-PD Module.

(g) Customer Data Reader/Programmer (CDRP) is a hardware device used in the collection and/or transmission of Aggregate Customer Desires (ACD) data to a Vendor, and in programming the CB-PD Module.

(h) A Development Interaction (DI) is the actual event when a Customer interacts with a Customer Directed Product (CDP).

(i) Vendor Initiated Interactions (VII) and Customer Initiated Interactions (CII) are two types of Development Interactions (DI) that are described in the preferred embodiment; other types are possible, and some are listed below.

(j) Defined Customer Desires (DCD) are the analyzed findings that result from customer use of the CB-PD Module in a Customer Directed Product (CDP).

(k) Customer-Based Product Design Report (CB-PDR) is an automated, structured report system that analyzes and presents the Defined Customer Desires (DCD).

For the purposes of this description, both the Products and the Services appropriate for this invention will be referred to as Products. In many types of services it is possible to include a CB-PD Module, such as in the rental of automobiles; scheduling, during or after the delivery of travel services (such as an on-line system to plan a trip, and during a stay at a resort); etc. Thus, many services might be turned into Customer Directed Services (CDS) by means of this invention.

The Parties in this Invention

To facilitate the description further, it is worthwhile to define some of the players in the product design process that is envisioned by this CB-PD Module invention:

(a) The Customer is the person, group of people, or company that uses the Customer Directed Product (CDP) and interacts with the CB-PD Module.

(b) The Vendor is the company that sells the Customer Directed Product (CDP), which may be either a product or a service [Note that a "vendor" may also be an educational institution (such as a university that wants to evaluate the effectiveness of an educational technology curriculum product), a nonprofit organization (such as a foundation that wants frequent client feedback from a program of one of its grantees, to help improve that program rapidly), a government agency (such as the State Department, which may want a CB-PD Module that helps improve its automated language education laboratories), etc. In other words, the Vendor referred to here may be any type of organization or institution.

(c) The Distributor is a company that re-sells a Customer Directed Product (CDP) and may add services or support to it. The Distributor may sell to Retailers or directly to Customers (Retailers are a special category of Distributor who can engage in all the same activities as a Distributor, with respect to this CB-PD Module invention.)

(d) The Service Company is a company that provides post-sale repair or support to the Customer.

(e) The Communications Service Vendor is the common carrier that provides communications services.

(f) Professional Experts and Other Third Parties include specialized experts, consultants, colleagues, data buyers and vendors, service companies, vendors of related products, distributors, retailers, industry associations, academic researchers, researchers at "think tanks," government agencies, this technology's licensor, etc.

System Description

The product that is manufactured in the preferred embodiment of this Customer-Based Product Design Module (CB-PD Module) invention is a specialized computer module, which on occasion is similar to a "smart card," including internal software and optional external components that together form a Customer Design System (CDS). This Customer-Based Product Design Module (CB-PD Module) is applicable to a wide range of products and services, and the use of a sub-set of these CB-PD Module embodiments should be construed as included.

Turning now to FIG. 1, the overall Customer Design System (CDS) describes the process by which Customers, by means of the CB-PD Module, can direct, guide or assist the Vendors of Customer Directed Products (CDP), which contain such a module. This process begins with a Vendor setting product, market or other commercial objectives 10 and then designing the product 12. One of the product's features will be a CB-PD Module 14, which will include a custom Customer Design Instrument (CDI) specific for that product. As the Customer uses the product 16, pre-programmed trigger points are checked in the CB-PD Module 18. These trigger points may be initiated by the CB-PD Module or by the Customer. If a trigger point has not been reached, the Customer's use is not interrupted. If a trigger point is reached, the CB-PD Module requests the Customer's participation in a Development Interaction (DI) 20. If the Customer says no, then that trigger point is passed without a DI occurring. If the Customer agrees, a Development Interaction is performed 22. This includes running the Customer Design Instrument (CDI) and recording the Aggregate Customer Desires (ACD) 24, which are comprised of the Customers responses during the Development Interaction. The Aggregate Customer Desires are delivered to the Vendor 26 where they are entered into an Aggregate Customers Desires (ACD) database. Periodically, a report is run 28 which analyzes the aggregate data into Defined Customer Desires (DCD) comprised of the Customer's views and suggestions during that period. This is presented in an on-line or printed Customer-Based Product Design Report (CB-PDR) 28. This Customer information is used to help improve products, services, marketing and other areas of business operations 30, and is fed back into an iterative design 12. Whenever needed, the Customer Design Instrument is updated 14, and distributed by a variety of means (such as including it in the new products sold) to Customers.

The Customer Design System (CDS) in FIG. 1 provides the Vendors that use it with customer-based product and market development information 30, based on a Customer-Vendor NETWORK 14, 24, 26, 30 that is built into appropriate Customer Directed Products (CDP) 12 by means of a CB-PD Module 14, Vendors may employ this new source of Customer information 30 whenever they wish to improve their product design decisions 12. The Vendors may also use this new information 30 to reduce some of their other types of market research expenses.

The Customer Design System (CDS) in FIG. 1 gives Vendors hands-on Customer-based information 30 that is generated WHILE THEIR PRODUCTS ARE BEING USED. At their moments of greatest need, Customers tell Vendors their perceptions, expectations and the shortcomings of their product(s) and their associated services 24. They are able to communicate 24, "This is what I'm doing to use your product. This is why I need it and why I use it this way. Here are the specific things I'd like you improve, and why they are important to me. I'd also like to tell you how to improve your relationship with me. Here are the important things I'd like you to do now." Since Customer purchases decide those products' adoption, rate of use, success and market share, the type of Customer-Vendor network in FIG. 1 may provide strategic competitive advantages to Vendors interested in increased sales, revenues, market share or profits.

Vendors can use this Customer Design System (CDS) to involve their Customers in guiding and determining:

What product features to improve and why 12,

How to improve target marketing's accuracy and effectiveness by clarifying what has the most value to specific groups of customers 30, Sales force insights into the needs of specific customers that assist in winning adoption of their product(s) throughout those customers' business operations 30, and Other insights unique to an individual customer, a market segment, or a mass market 30.

It is commonly said that microprocessors are being integrated into numerous products; that computers are disappearing into products. This is true, but in addition, many mechanical products are being partly or wholly replaced by special purpose computers that are designed to look and operate as those products (such as some scientific and test instruments, medical monitors, etc.). The same transformation is taking place in many services, which are being partly or wholly replaced by special purpose information systems that are designed to operate as those services, or to replace them (such as voice mail systems instead of telephone receptionists, home video rental through television sets instead of going to a video store, etc.).

This Customer Design System (CDS) may uncover and enable new strategic business advantages 30 by means of placing a network(s) into appropriate products Strategic competitive advantages may include accelerating these Vendors' abilities to improve their products faster, fitting their products to their Customers and markets accurately, and satisfying Customer needs better than their competitors who do not include a network in their products. Stronger advantages may be obtained where products, features or capabilities are wholly or substantially new (such as the use of interactive multimedia for training, performance support, information delivery and entertainment); or where users are new (such as interactive television in the home, hand-held personal digital assistants, voice-operated computers, etc.); or where markets are new (such as the mass market introduction of new types of products and technologies that have not bought them before); etc. In brief, where rapid and accurate learning is a strategic advantage, this technology makes a larger contribution.

Vendors who use this 14, and only these Vendors, have this automated network to work with their Customers and learn from them 24 during product use. With each new cycle of iterative product improvement 12, these Vendors' may leap farther ahead of their competitors in product quality, customer satisfaction, sales and profits.

Since businesses of all types increasingly rely on information technologies for their business operations, how can these emerging technology capabilities be harnessed to improve product quality, revenues and operations faster and more capably than their competitors? This Customer Design System (CDS) assists Vendors in fitting their products to the most important needs of Customers 12 by means of automated interactivity 24 that enlists larger numbers of Customers 20 as design and business partners. Because these Customers provide their information WHILE THEY ARE USING THE PRODUCTS 18, these Vendors may gain the opportunity to fit their products and marketing to Customer needs faster and more accurately than their competitors 12. The Customer Design System (CDS) in FIG. 1 may be integrated as a customer-linked network that is attached to 26 and integrated into 28 the firm's information technology systems, so that this reporting system 28 (which may deliver finished reports that are easy to read and understand) can be provided on-line 30 to numerous managers and employees throughout the organization.

Figure 16:
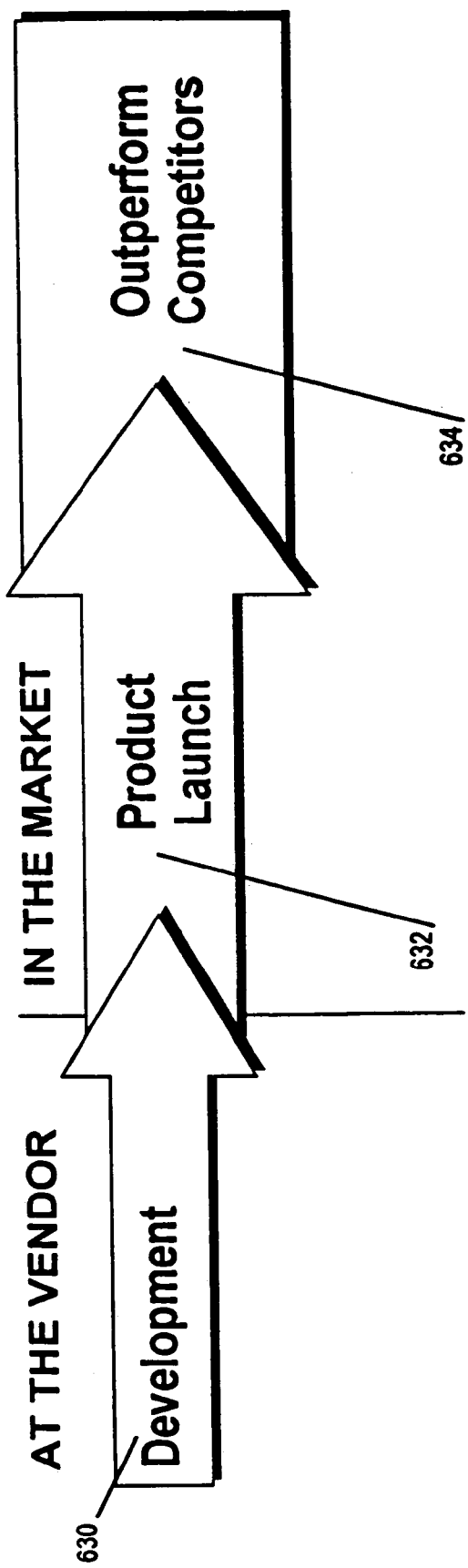
FIG. 16 is an illustration of the invention's longitudinal scope during product, application, business process, and other system life cycles.
Figure 17:
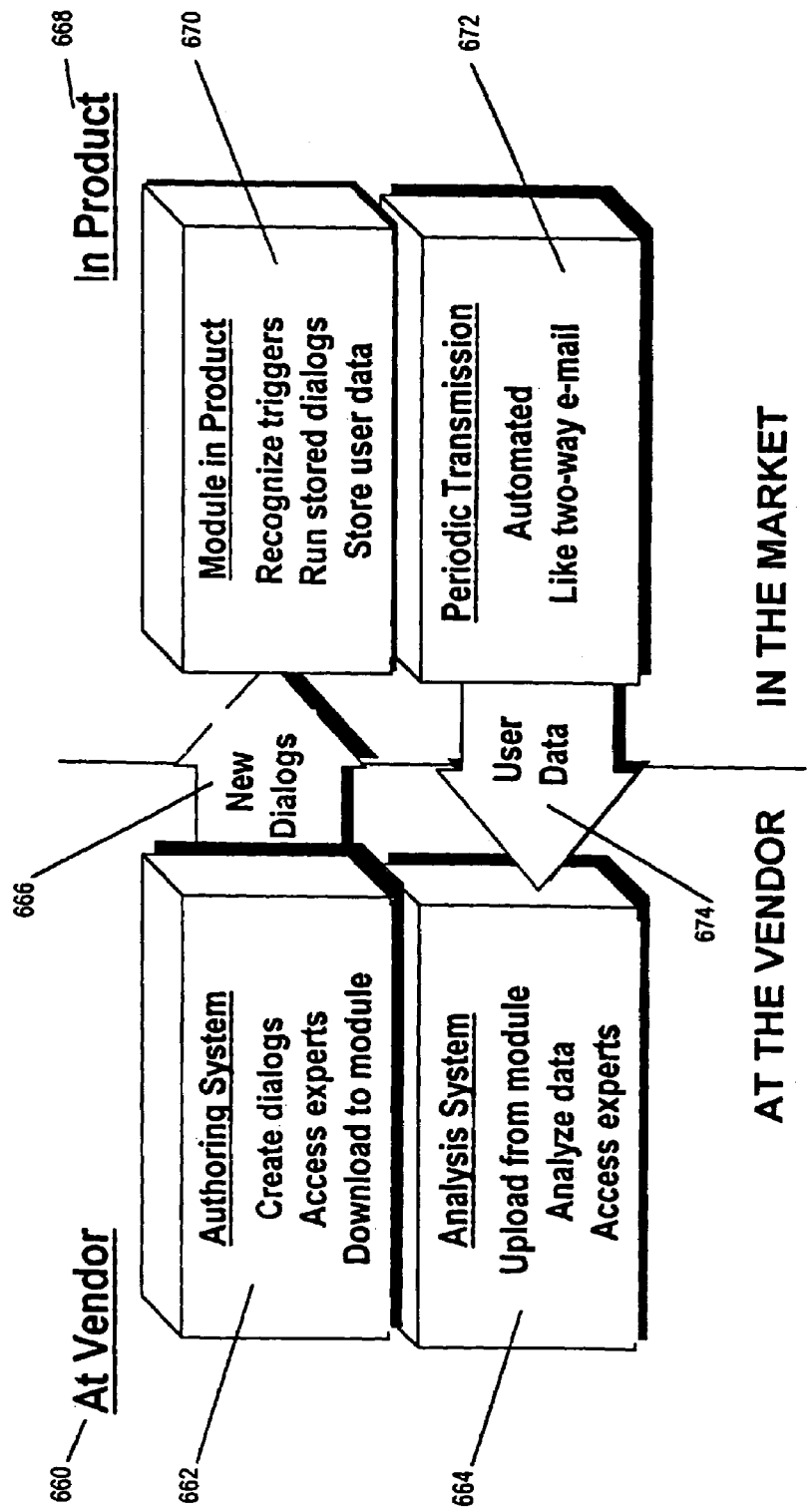
FIGS. 17, 18 and 20 are illustrations of components, architecture and processes.
Figure 18:
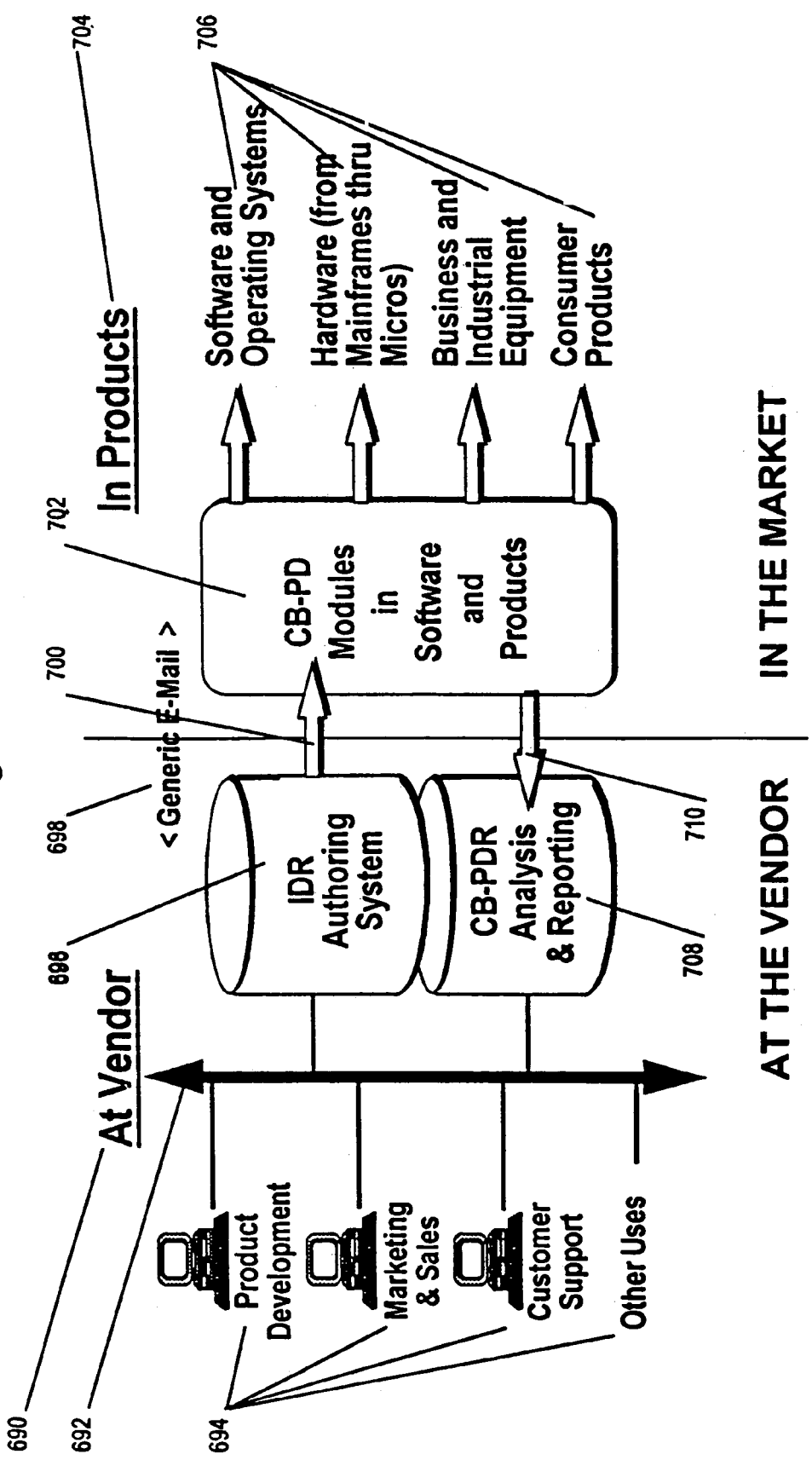

As illustrated in FIG. 15, the scope of the preferred embodiment is worldwide 600. The vendor 604 may be located anywhere. By means of the invention's two-way communications 666, 674 in FIG. 17, the vendor may work with users regardless of their location 602, 606, 608. The invention's product and market advantages may therefore be projected, as a flexible set of new product and vendor capabilities, into local markets in any country or region In addition to geographic scope FIG. 15, the preferred embodiment describes longitudinal uses throughout each stage of the product life cycle FIG. 16. While these are described in greater detail later in the preferred embodiment, during product development 630 some examples include:

Automate product tests such as usability tests or human factors tests,

Automate data gathering and analysis from field trials (such as clinical trials for medical products and beta tests for software), Expand product tests by including more users in more countries, Expand tests by enabling automated testing every day during product use, instead of two hours of tests in a laboratory or occasional contacts during field trials, and Lower the cost of testing by using automation for many currently labor-intensive steps.

Gather additional information from more market niches and regions in areas such as marketing, customer support, training, documentation; etc.)

During initial product launch 632 some examples include:

Increase the accuracy of marketing by learning right away who buys the product, why, what media was seen by those who buy, what messages appealed to them, what they really like and want about the product, etc., Increase sales by having the product learn which customers need additional units and delivering them immediately, Provide on-line customer support through the product to its new users, helping them overcome problems and succeed right away, and Provide on-line training through the product to help users increase their skills and capabilities in benefiting from the product.

Over the product's life cycle 634 deliver both continuous improvements and major milestone product upgrades by a variety of means. A few examples illustrate how to use this to outperform competitors:

Deliver dynamic product improvements through on-line communications built into the product, to upgrade existing products in the field while they are in the hands of customers, Provide ongoing customer support and training that helps your product's users outperform the users of competing products, and Turn customers into partners for improving products and services by many means such as improvements in product design, product development, major product upgrades and revisions, improving other product uses, and a variety of business activities; etc.

Figure 2:
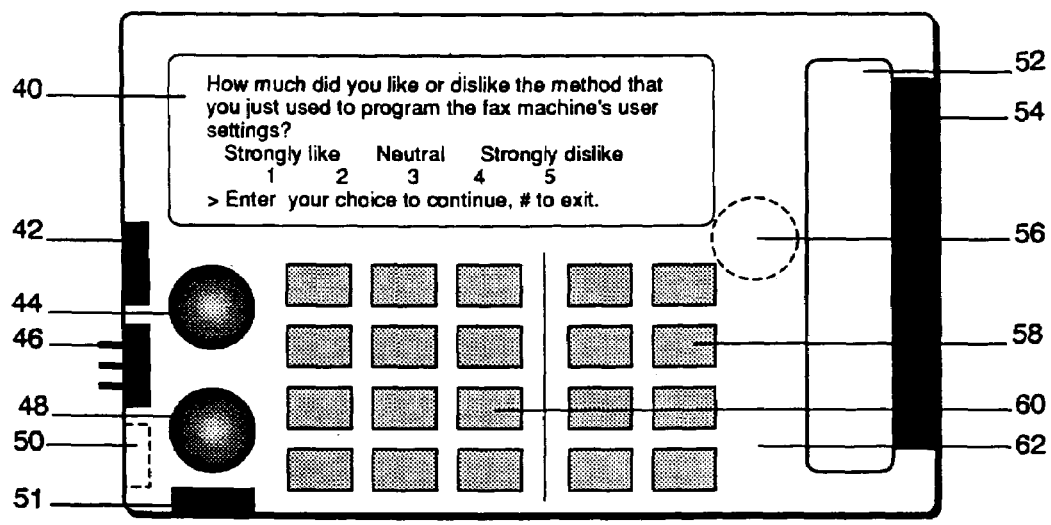
FIG. 2 is an illustration of the front view of a Customer-Based Product Design Module (CB-PD Module).

Turning now to FIG. 2, the physical apparatus of one embodiment of a Customer-Based Product Design Module (CB-PD Module), which is detailed below, is illustrated. The following represents a reasonably complete set of user interface, electric power and communications input/output (I/O) features; not all of these need to be included simultaneously in any one CB-PD Module. On the front surface of the card 62 there are provided a display 40; an input/output (I/O) communications plug 42; an audio speaker 44; a plug for electric power 46; a microphone 48; a removable memory chip 50; additional I/O communications 51; a physical handle for the device 52; a wireless antenna 54; an internal battery for power 56 (which may be a rechargeable battery for portability, a non-rechargeable lithium battery for longer life, etc.); keys or buttons for entering letters and numbers 60; and keys or buttons for choosing functions or operating modes 58. In some cases there are two possible features that perform the same operation (some of these options include entering Customer input via the microphone 48 or by the letter/number keys 60, communicating with external devices via the I/O plug 42 or the antenna 54 or a removable chip 50, I/O communications with the product 42 and with the vendor 51, and communicating with the Customer via the speaker 44 or the display 40) and in such cases, only one of these features needs to be employed. In some cases a feature may be required even if it is usually non-essential (for example, if the type of RAM memory is present that requires electric power, then a battery 56 backup is required to power the Module when it is not powered by the product's electricity through the plug 46). In cases where the product contains the means to perform some of these functions, as will be illustrated in another preferred embodiment, it may not be necessary to duplicate those features in that product's CB-PD Module.

The special purpose function keys 58 include labeled buttons for those interactions needed in any particular CB-PD Module. Some of those functions may include transmitting or receiving data via the I/O plug 42 or the antenna 54, starting and stopping the recording of a voice message via the microphone 48, playing back stored data via the speaker 44 or the display 40, or quitting a Development Interaction (DI) via a terminate function key 58.

Figure 3:
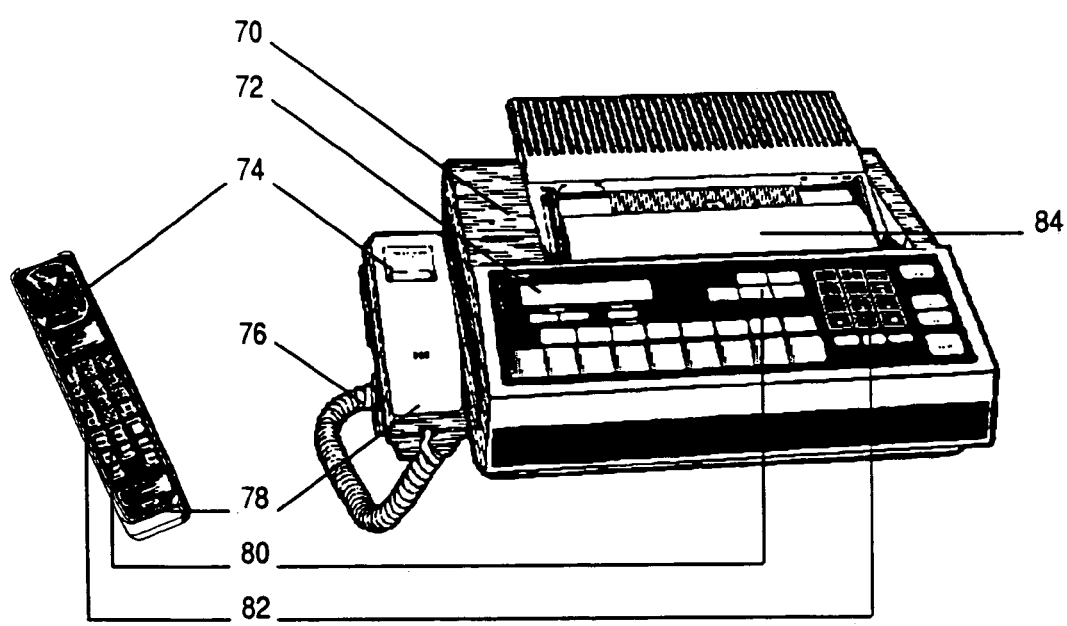
FIG. 3 is an illustration of a Customer Directed Product (CDP).

Turning to FIG. 3, the physical apparatus of a second preferred embodiment of the CB-PD Module is illustrated as a complete Customer Designed Product (CDP), a facsimile machine 70. The difference is that this embodiment employs features already built into the product, so its design has been adapted to fit into the physical appearance and functioning of the product. The following represents a reasonably complete set of user interface, electric power and communications input/output (I/O) features based on those already included in this product. In the facsimile machine 70 there are provided a display 72; telephone communications for input/output (I/O) 76; an audio speaker 74; electric power from the facsimile machine 70; a microphone for Customer input 78; keys or buttons for entering letters and numbers 82; keys or buttons for choosing functions or operating modes 80; and a printer 84. In some cases there are two or more possible product features that may perform the same CB-PD Module operation (some of these options include entering Customer input via the microphone 78 or by the letter/number keys 82, communicating with the Customer via the speaker 74 or the display 72 or the printer 84, and locating function or mode keys on the facsimile machine 80 or on the handset 80) and in such cases, only one of these features needs to be employed. The CB-PD Module in the facsimile machine 70 is therefore able to employ already existing product features 72, 74, 76, 78, 80, 82, 84 and may therefore merge them with the CB-PD Module to produce an integrated product design and integrated product/CB-PD Module operation.

Figure 4:
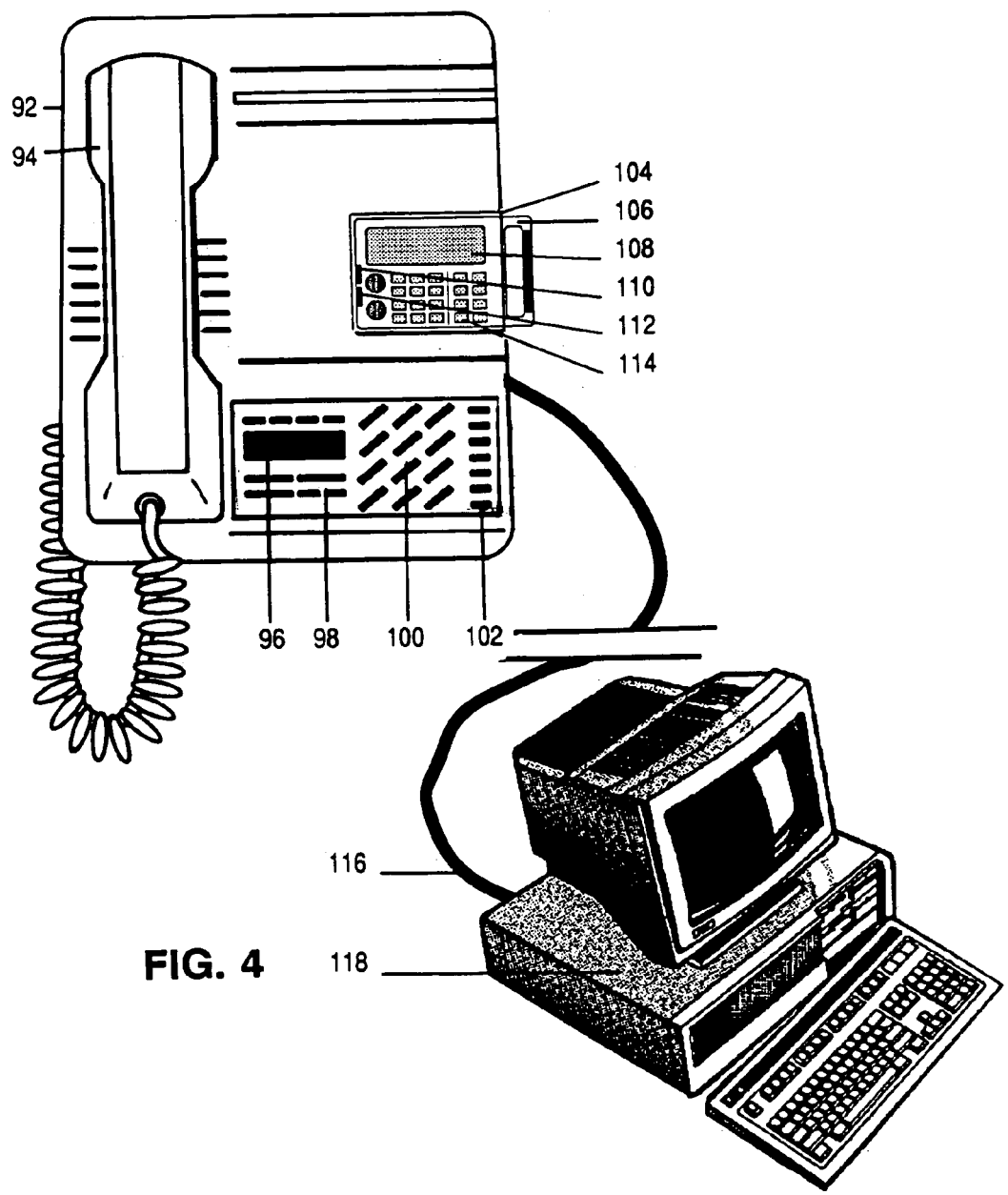
FIG. 4 is an illustration of a Customer Data Reader/Programmer (CDRP).

Another physical component in this invention is the Customer Data Reader/Programmer (CDRP) illustrated in FIG. 4 This embodiment of a reader/programmer 92 resembles a credit card authorization terminal. This apparatus includes keys for dialing the phone 100, a handset 94, a display 96, and an optional light 102. The CB-PD Module 106 is inserted into the reader socket 104. There, the Module's electric power may be supplied by the Customer Data Reader/Programmer 92 via the CB-PD Module's plug 112. The connection between the CB-PD Module 106 and the Customer Data Reader/Programmer 92 is via the I/O plug 110 Once the CB-PD Module has been inserted, the operator connects to the Vendor's computer 118 over the telephone line 116 by pressing a function key 98 and dialing the Vendor's phone number on the dialing keys 100. The data exchange from the CB-PD Module 106 may be wholly controlled by the Vendor's computer 118, with the Customer Data Reader/Programmer 92 acting as an interface to the CB-PD Module 106. After the data has been read, the Vendor's computer 118 may download a new program through the Customer Data Reader/Programmer 92 into the CB-PD Module 106 As an interface device, this embodiment of the Customer Data Reader/Programmer 92 may be attached locally and directly to the Vendor's computer (to provide data reading, programming or both) instead of being linked from a remote location via a telephone line 116.

Alternatively, the Customer Data Reader/Programmer may serve as a stand alone device under its own program control. In this case, reading the data would be initiated by pressing a "receive" function key on the Customer Data Reader/Programmer 98 and a "transmit" function key on the CB-PD Module 106. The Customer may be guided through this by prompts or instructions on the display 96, or on the display 108. While the data is being read, the light 102 may be lit to indicate proper operation. Alternatively, a message such as "Receiving data" may be displayed on the display 96, or a message such as "Sending data" may be displayed on the display 108. The operator may then connect to the Vendor's computer 118 over the telephone line 116 by pressing a function key 98 and dialing the Vendor's phone number on the dialing keys 100. The operator may then transmit the data to the Vendor's computer 118 by pressing a function key 98; while the data were being transmitted, a message such as "Sending data" may be displayed on the display 96.

After this data transmission occurs, the Customer Data Reader/Programmer 92 may have a new program downloaded to it by the Vendor's computer 118 for upgrading the program in the CB-PD Module 106. The programming of the CB-PD Module 106 by the Customer Data Reader/Programmer 92 may then be initiated by pressing a "Send program" function key on the Customer Data Reader/Programmer 98 and a "Receive program" function key on the CB-PD Module 114. The Customer may be guided through this process by prompts or instructions on the display 96, or on the display 108. While the CB-PD Module 106 is being programmed, the light 102 may be lit to indicate proper operation, or a message such as "Program downloading" may be displayed on the display 96, or on the display 108.

Figure 5:
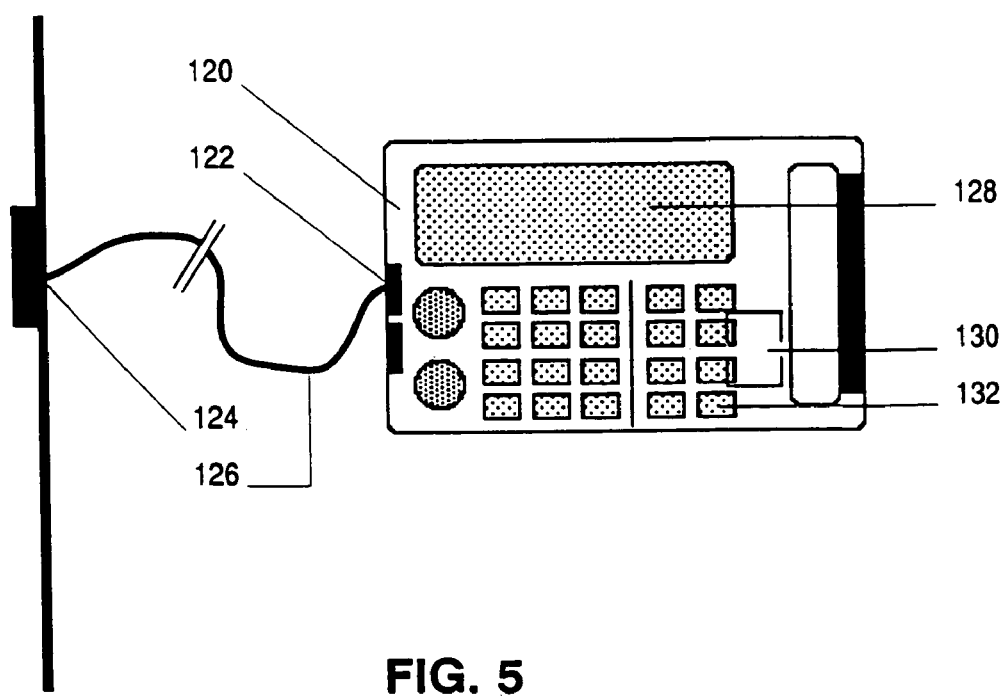
FIG. 5 is an illustration of a CB-PD Module directly transmitting Aggregate Customer Desires (ACD) data through the telephone network.

FIG. 5 illustrates a second embodiment of the Customer Data Reader/Programmer. In this embodiment, the CB-PD Module 120 contains a standard telephone plug as its I/O plug 122 and an internal modem 130. A standard telephone cable 126 is used to attach the CB-PD Module 120 to a telephone line 124. When the CB-PD Module is connected to the telephone network, this is indicated by a message such as "Ready to transmit" on the display 128 Pressing the appropriate "Send and receive" function key 132 at that time automatically dials the Vendor's computer, transmits the data and receives a new program. An appropriate message may be displayed on display 128 while this is taking place, such as "Data is being exchanged."

Internal Physical Descriptions

Figure 6:
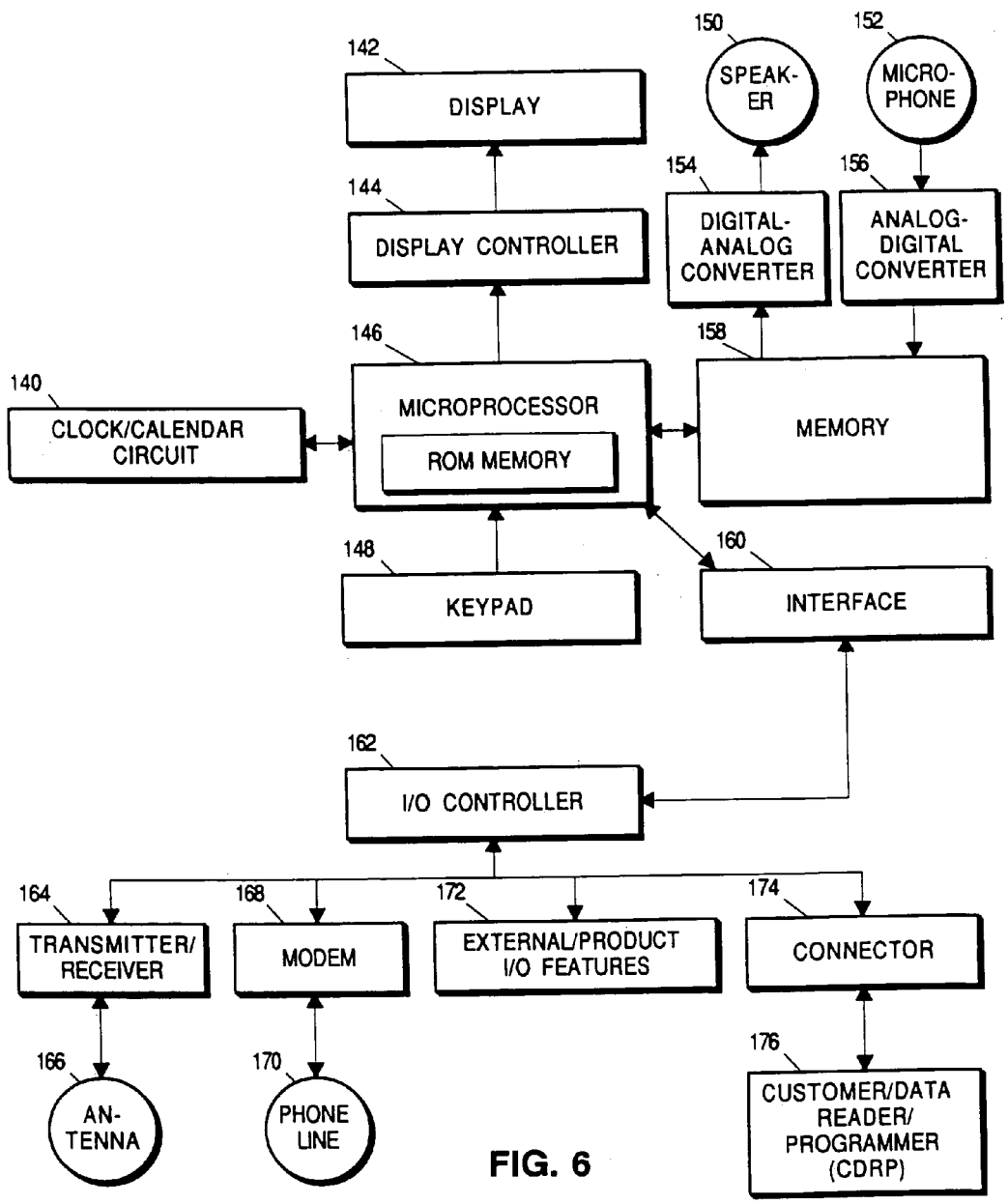
FIG. 6 is a block diagram of a Customer-Based Product Design Module (CB-PD Module).

FIG. 6 shows a functional block diagram of the CB-PD Module in FIG. 2. This is preferably a microprocessor-based integrated circuit (IC) of compact and inexpensive design.

The CPU/ROM Memory 146 is a microprocessor plus ROM and RAM memory 158. The memory 158 may be volatile, which requires constant electric power (i.e., conventional DRAM) or it may retain its data without requiring power (i.e., nonvolatile "flash" memory). A separate unit is not specified for physical storage of the Customer Design Instrument (CDI) and the Customer's Aggregate Customer Desires (ACD) data (i.e., a miniature hard or floppy disk) since memory technology is evolving rapidly Currently, "flash" memory provides system BIOS; replaces ROMs, DRAMs and SRAMs; and is beginning to replace floppy and hard drives in various systems.

Alternatively, a system of removable physical storage may be employed, such as the removable chip 50 illustrated in FIG. 2. A removable storage method enables the CB-PD Module's control programs to be updated without involving data communications. For example, a removable chip enables the data to be transferred by inserting the chip in a reader capable of downloading the data and updating the Customer Design Instrument (CDI) stored on the chip. If a removable storage method is used, it should be easily removable and replaceable by an untrained Customer.

The keypad 148 may contain sufficient keys for all letters and numbers, or a reduced set. It also contains function keys that provide specific programmed operations (such as transmitting the collected data). The keypad 148 is coupled to ports on the microprocessor to provide digital input from the Customer, which may include any character or function that may be enabled by a key that is programmed in that manner (such as letters, numbers or an "enter" key; more complex operations connected with. Development Interactions (DI) such as opening a scratch pad to attach a text comment or suggestion to a particular question; or functional operations such as transmitting and receiving data; etc.).

The display controller 144 delivers ASCII text to the display 142 The display provides menus, instructions, probes, messages and other communications to the Customer. With the display 142 and keypad 148 together, the CB-PD Module is capable of conducting a Development Interaction (DI) with the Customer. This may be initiated by the Customer or by the CB-PD Module Memory 158 provides digital storage for one or more Customer Design Instruments (CDI), customer data from Development Interactions (DI), etc. in small data files or in a database of Aggregate Customer Desires (ACD). The power sources 46, 56 shown in FIG. 2 supply electric power to the electronic circuit of the CB-PD Module shown in FIG. 6. An optional clock/calendar circuit 140 may be included to provide a trigger for running Development Interactions (DI), to stamp the time and date of each DI in the Aggregate Customer Desires (ACD) file, to log the frequency of use of the product or of certain features of it, etc.

Alternatively, Development Interactions (DI) may be conducted by means of voice In FIG. 6 the microphone 152 is connected to an analog-to-digital converter 156 When voice or sounds are entered via the microphone 152, the analog-to-digital converter 156 converts it to digital data which is stored in memory 158. The speaker 150 is connected to a digital-to-analog converter 154. When digital data is stored in memory 158, the digital-to-analog converter 154 converts it to analog data which can be reproduced as voice from the speaker. The speaker may also be used to signal the Customer via beeps, alarms, tones, words or other sounds.

The CPU/ROM memory 146 is connected to an I/O device or circuit which may have various designs Some of the I/O options include direct connection to a Customer Data Reader/Programmer 176 by means of a connector 174, connection to a telephone line 170 by means of a modem 168, and wireless radio communications by means of a transmitter/receiver 164 and an antenna 166. In addition, there may be connections with communications features already included in the product 172. Regardless of the I/O means chosen, a compact design and components are preferable. For transmission, the digital data stored in memory 158 can be transmitted 166, 170, 176. For reception, digital data received 166, 170, 176 can be stored in-memory 158 By means of an 800# phone call, there does not need to be any cost to the Customer for this call.

Based on the present embodiment, Development Interactions (DI) are recorded during the use-of a Customer Directed Product (CDP) and stored in memory 158 When the CB-PD Module is enabled for I/O (based on the method built into the Module 166, 170, 176) and the appropriate function key pressed 58 in FIG. 2, the Module transmits its Aggregate Customer Desires (ACD) data. If the Vendor would like to re-program the CB-PD Module, the new program (such as a new Customer Design Instrument) is received by the Module by the communications method built into the Module 166, 170, 176 and stored in memory 158.

Figure 7:
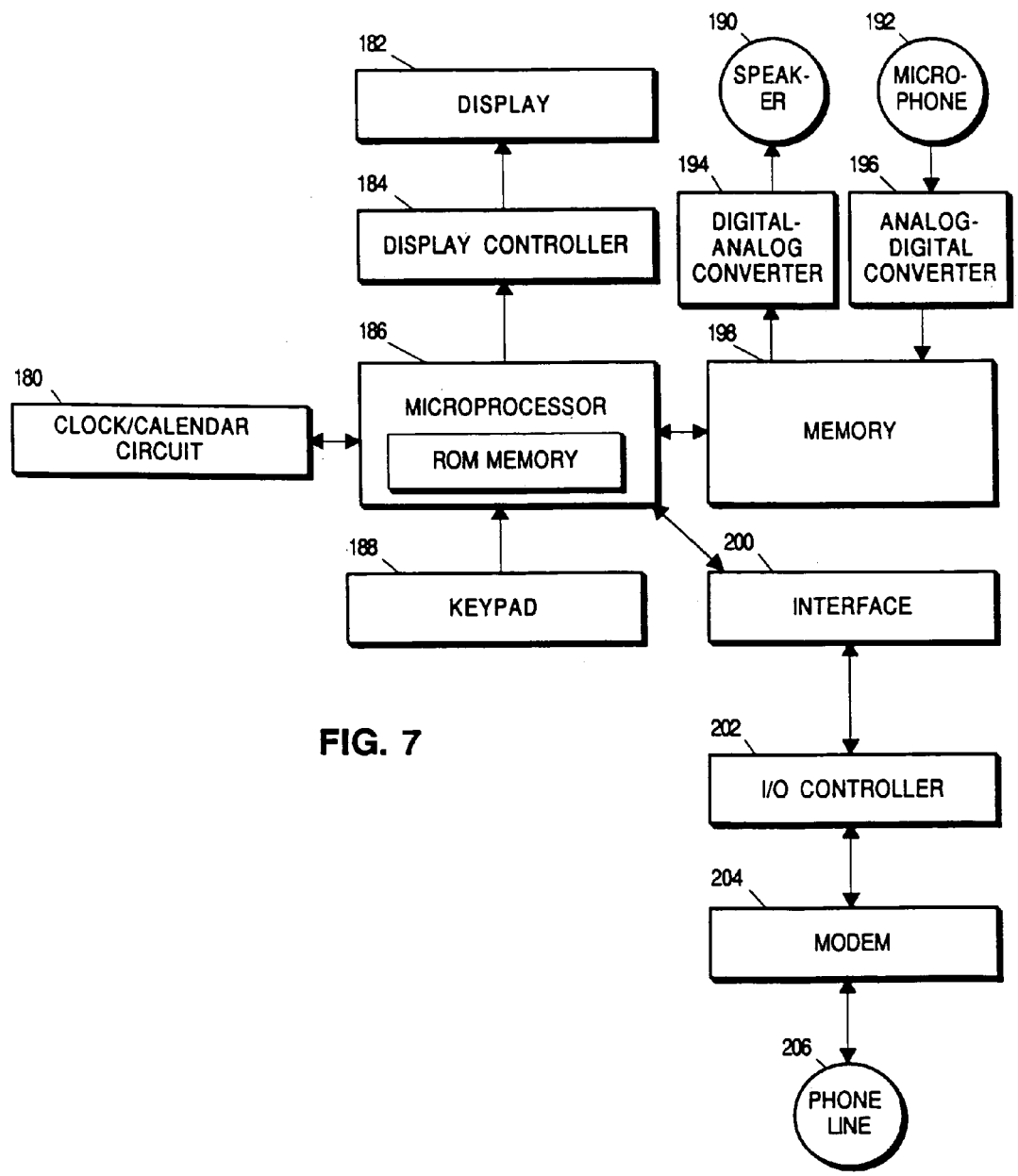
FIG. 7 is a block diagram of a Customer Directed Product (CDP).

FIG. 7 shows a functional block diagram of the CB-PD Module installed in the Customer Directed Product in FIG. 3, the facsimile machine 70 Certain design assumptions have been made: first, the user interface (UI) is based on a combination of voice 74, 78 in FIG. 3, display 70 and function keys 80 (though other options are possible, such as the display 70 and keypad 82, or the printer 84 and keypad 82); the I/O with the vendor is based on an internal modem and the telephone line 76; and because of this direct facsimile machine 70 to Vendor telephone connection, the CB-PD Module is not removable and a Customer Data Reader/Programmer (CDRP) 92 in FIG. 4 is not needed.

The CPU/ROM Memory 186 is a microprocessor plus ROM and RAM memory 198. The memory 198 may be volatile, which requires constant electric power (i.e., conventional DRAM) or it may retain its data without requiring power (i.e., "flash" memory). A separate unit is not specified for physical storage of the Customer Design Instrument (CDI) and the Customer's Aggregate Customer Desires (ACD) data (i.e., a miniature hard or floppy disk) since memory technology is evolving rapidly. Currently, "flash" memory provides system BIOS; replaces ROMs, DRAMs and SRAMs; and is beginning to replace floppy and hard drives in various systems.

The keypad 188 may contain sufficient keys for all letters and numbers, or a reduced set. It also contains function keys that provide specific programmed operations (such as transmitting the collected data). The keypad 188 is coupled to ports on the microprocessor to provide digital input from the Customer, which may include any character or function that may be enabled by a key that is programmed in that manner (such as letters, numbers or an "enter" key; more complex operations connected with Development Interactions (DI) such as opening a scratch pad to attach a text comment or suggestion to a particular question; or functional operations such as transmitting and receiving data; etc.).

The display controller 184 delivers ASCII text to the display 182 Depending on the UI, menus, instructions, probes, messages and other communications may be made with the Customer by means of the display, voice or a combination of both Memory 198 provides digital storage for one or more Customer Design Instruments (CDI), customer data from Development Interactions (DI), etc. in small data files or in a database of Aggregate Customer Desires (ACD). The power source is directly from the facsimile machine 70 which remains powered at all times to preserve its user-programmed memory; this also supplies electric power to the electronic circuit of the CB-PD Module shown in FIG. 7. Either the facsimile machine's 70 clock/calendar circuit or an optional CB-PD Module clock/calendar circuit 180 may be included.

Development Interactions (DI) may be conducted by a variety of means that may include communications from the Customer Directed Product (CDP) to the Customer by means of the LED display 72, the printer 84 or voice 74; and communications from the Customer to the Customer Directed Product (CDP) by means of the keypad 82, function keys 80 or voice 78.

In this description of this preferred embodiment, Development Interactions (DI) are conducted by means of voice. The speaker 190, which is the handset 74 (or a speakerphone if the facsimile machine has one) is connected to a digital-to-analog converter 194. When digital data is stored in memory 198, the digital-to-analog converter 194 converts it to analog data which can be reproduced as voice from the speaker. The speaker may also be used to signal the Customer via beeps, alarms, tones, words or other sounds. The microphone 192 is connected to an analog-to-digital converter 196. When voice or sounds are entered via the microphone 192, the analog-to-digital converter 196 converts it to digital data which is stored in memory 198.

With a combination of the speaker 190, microphone 192, display 182 and keypad 188 together, the CB-PD Module in this embodiment is capable of conducting a Development Interaction (DI) with the Customer. This may be initiated by the Customer or by the CB-PD Module. For example, the speaker 190 could recite a question and a beep could sound at its end. The Customer could recite a reply into the microphone 192 which would be stored in memory 198. The Customer could be verbally told, using the speaker 190, the key to press after finishing the reply. In addition, yes/no, multiple choice, scale questions and similar types of questions might be enabled by means of the display 182 which might display a message, such as the following for a yes/no question:

First line: "Press 1 for Yes and 2 for No"

Second line: "Press # to end and exit".

For communications, the microprocessor/ROM memory 186 is connected to a modem 204 that is connected to a telephone line 206 For transmission, the digital data stored in memory 198 can be transmitted 204, 206. For reception, digital data received 206, 204 can be stored in memory 198. By means of an 800# phone call, there does not need to be any cost to the Customer for this call.

Based on the present embodiment, Development Interactions (DI) are recorded during the use of a Customer Directed Product (CDP) and stored in memory 198 When the CB-PD Module is enabled for connection to the Vendor's computer by pressing the appropriate function key 80, the CB-PD Module transmits its Aggregate Customer Desires (ACD) data. If the Vendor would like to re-program the CB-PD Module, the new program (such as a new Customer Design Instrument) is received by the Module 206, 204 and stored in memory 198.

Instrument Design Repository (IDR)

The Instrument Design Repository (IDR) is an automated means to construct Customer Design Instruments (CDI) and program (or re-program) Customer-Based Product Design Modules (CB-PD Modules). The IDR includes one or more stored sets of Customer Probes (CP), one or more Customer Design Instruments (CDI), and utilities for downloading CDIs to CB-PD Modules Existing Customer Design Instruments (CDI) may be used, modified, combined, re-used, etc to produce new CDIs. The new Customer Design Instrument (CDI) may then be downloaded into a CB-PD Module or saved for downloading in the future FIGS. 8 through 9 inclusive are flow charts which set forth the operation of the Instrument Design Repository (IDR). The IDR allows a Customer Design Instrument (CDI) author to create new CDIs The new CDIs will then be downloaded or programmed into the CB-PD Module.

Figure 8A:
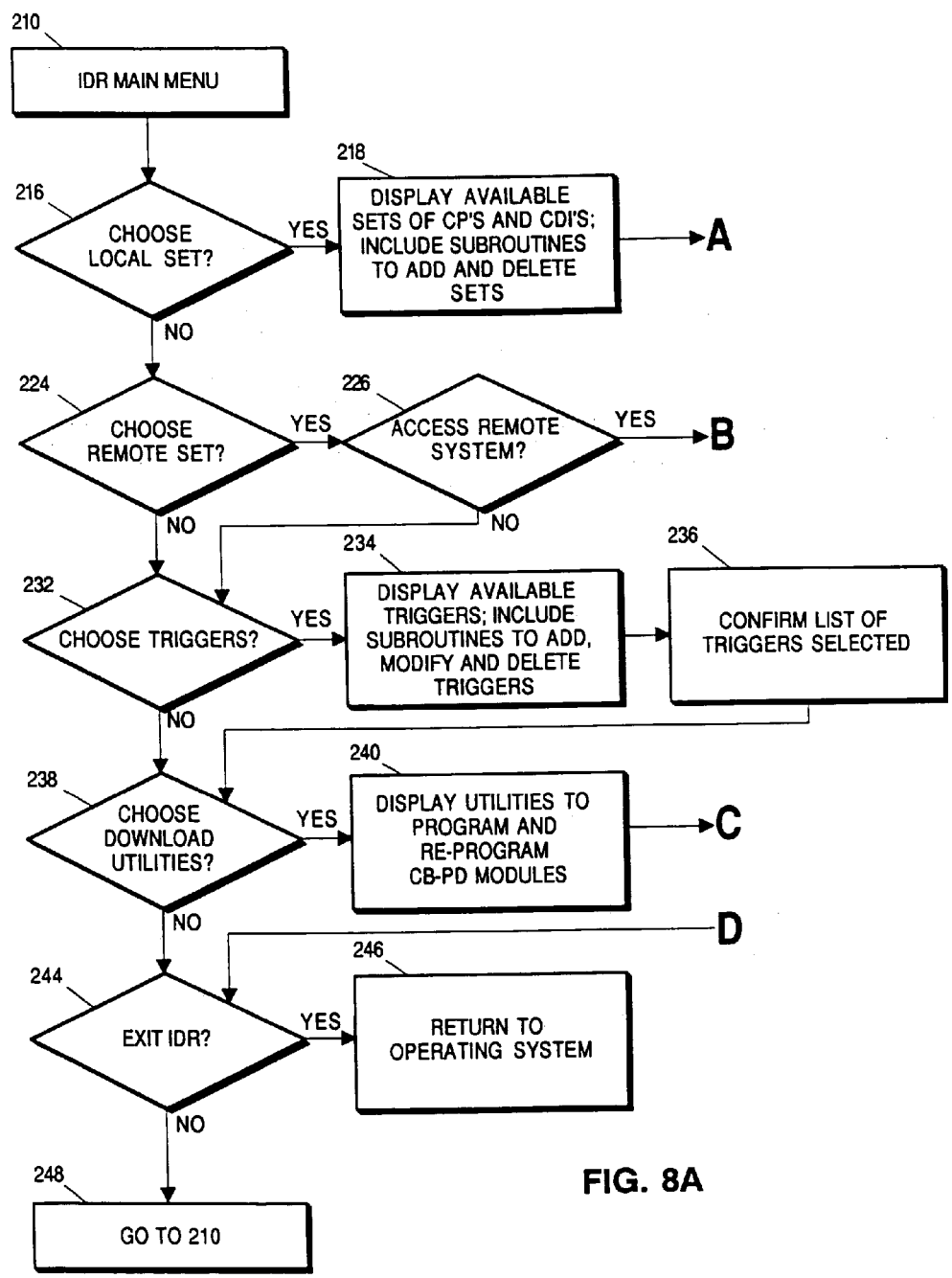
FIG. 8 is a flow chart of the Instrument Design Repository (IDR).
Figure 8B:
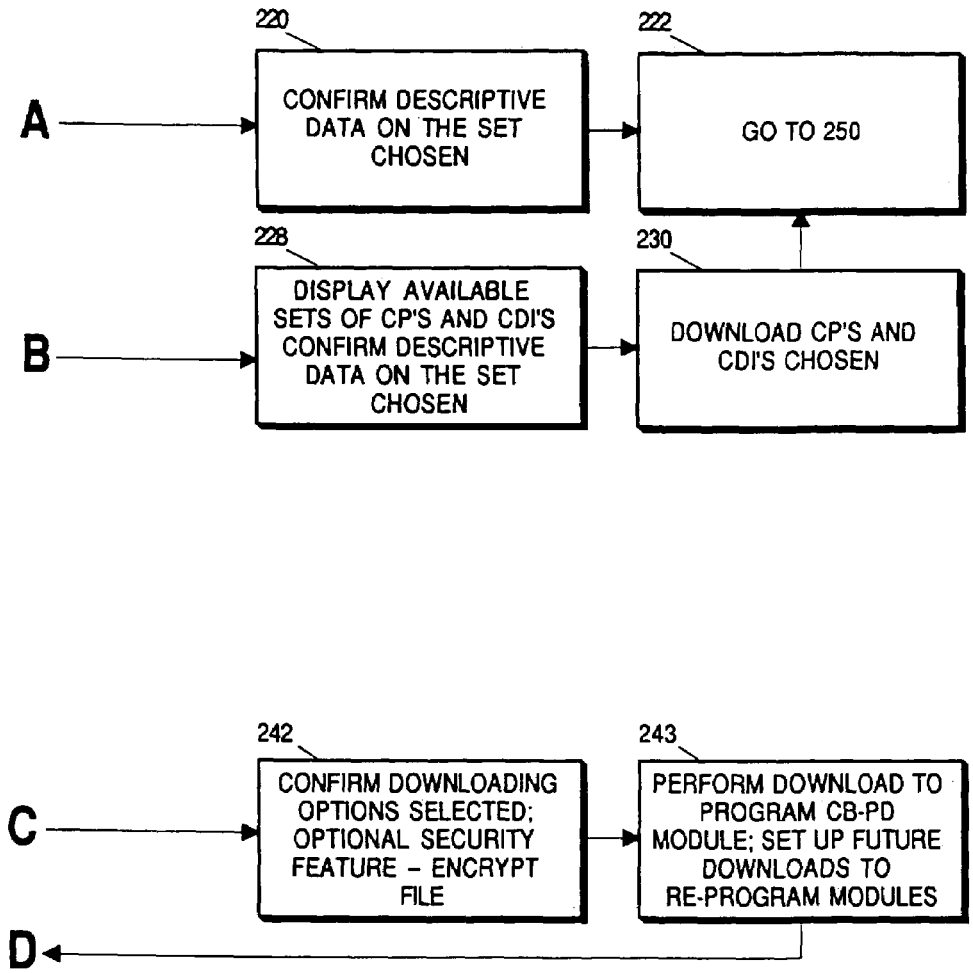

As represented in FIG. 8, the Instrument Design Repository (IDR) is organized to have a number of main functions. These include choosing a local set of Customer Probes (CP) 218 or a local Customer Design Instrument (CDI) 218 which may be accessible without charge or may be purchased from a Professional Expert, choosing a remote set of Customer Probes (CP) 228 or a remote Customer Design Instrument (CDI) 224 (i.e., which are located on a remote computer system and may be purchased from a Professional Expert), choosing the triggers 232 for initiating Development Interactions (DI) with Customers, choosing downloading utilities 238 to program CB-PD Modules, or exiting 244 the IDR.

If the user chooses a local 218 or a remote 224 set of Customer Probes (CP), or a local 218 or a remote 228 Customer Design Instrument (CDI) is chosen, the choice made is confirmed with the user 220, 228 by displaying its descriptive data and giving the user the opportunity to change that data, if appropriate. If the connection is with a remote computer system 226, then the user's choice is downloaded to the user's system 230 before proceeding.

Figure 21:
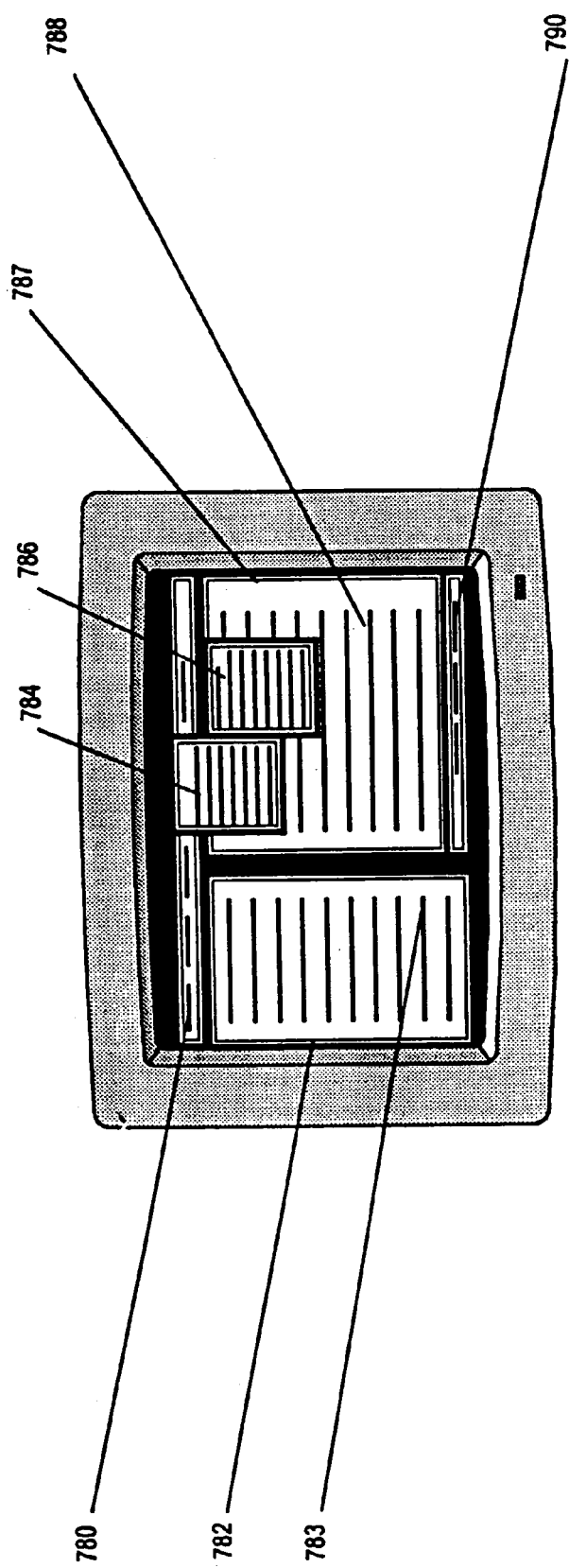
FIGS. 21, 24, 25, 27, 28, 29, 30, 31 and 32 are illustrations of various views of some uses of the invention.

Turning now to FIGS. 9 and 21, after the user selects a set of Customer Probes (CP) or a Customer Design Instrument (CDI), the user may choose the view 252, 78.8. The list of available views is displayed 254, 784, 786 These may include areas such as:

Multiple views open at once 788, including two or more sets of Customer Probes (CP) and/or Customer Design Instruments (CDI), so the user could access additional sources of probes while working, Individual Customer Design Instruments (CDI) 780 (as accessed by a means such as a menu) including instruments that have been used previously, those that have been written by outside professionals, those that have been downloaded from remote computer systems, etc., By types of Probes, such as scale, multiple choice, true/false, short answer, etc.

By product or by product features 782, such as by a specific product like the facsimile machine 70 in FIG. 3, or by a generalizable product feature such as the print quality of the printed output used in a variety of the Vendor's products 84 in FIG. 3, By what the Customer Probes (CP) test for 780, 784 with groupings for interactions about the product's user interface, appeal, utility, effectiveness, efficiency of operation, etc.; or with groupings for interactions about the users' characteristics and needs such as demographics, tasks, personal performance objectives, organizational goals, other products or systems employed to reach those ends., etc.

By the functional area of the organization 780, 784 such as product development, customer support, product management, marketing, sales, training, R&D, etc.

Subroutines are included 254, 780 for adding, modifying and deleting views from the available views To create and display these views, each Customer Probe (CP) may be assigned one or more codes that specifies how it is to be displayed in the respective views. To display by each view, these codes are read and the Customer Probes (CP) are grouped and displayed based on those codes. After the user chooses a view 254, 784, 786 the set of Customer Probes (CP) selected 220, 228 or the Customer Design Instrument (CDI) selected 220, 228 is displayed from the user's viewpoint 256, 788.

The user may then choose a function 258 from the available functions 260, 780. These may include operations like:
- Write Customer Probes,
- Edit Customer Probes,
- Delete Customer Probes,
- Reorder the Probes,
- Print Customer Probes (or the Customer Design Instrument),
- Change descriptive information for the set of Customer Probes (or the Customer Design Instrument),
- Merge two or more sets of Customer Probes (and/or Customer Design Instruments),
- Switch to another set of Customer Probes (or another Customer Design Instrument),
- Change language (for developing Customer Probes and Customer Design Instruments to fit other nations and cultures),
- Electronically mail the set of Customer Probes to one or more Professional Experts for review, rewriting, or other advice,
- Return to main menu, etc.

For each function chosen, display the appropriate sub-choices 262 For example, for Writing, Editing and Deleting Customer Probes, some of the choices may include:
- Multiple choice Probes,
- Scale Probes,
- True/False Probes,
- Checklist Probes,
- Short answer Probes,
- Essay answer Probes,
- Matching Probes, etc.

When performing an operation 264 each entry screen provides an appropriate format for that type of probe to be entered, a preferred reply to be entered (if it will be needed during later analysis of replies), and codes for displaying the Probe from various viewpoints. After opening the desired set of Customer Probes (CP) or Customer Design Instrument (CDI), the user can delete inappropriate probes, add new ones, or modify existing ones Next, the user could move the probes into the order desired.

As another example, for printing or saving a Customer Design Instrument (CDI), some of the operations 264 may include:
- Select Probes,
- Save Customer Design Instrument with just Selected Probes,
- Save Customer Design Instrument with all Probes (archive), etc.

When the file is saved, the Customer Design Instruments (CDI) are linked with the appropriate trigger points to display them and record the Customers' answers. If specific Customer Probes (CP) must be asked individually at specific trigger points, these are linked at this time as well.

At any time, the user may end the current operation 264 and switch 268 to another function 216, 224, 232, 238, 244, 252, 258 or operation 262, 264. If the user wants to switch to another file or function 268, the user is offered the option to save the area being worked on 270.

On the computer screen, one of the possible interfaces is illustrated in FIG. 21. In the left window 782 the triggers 783 are listed. The right window 787 lists Development Interactions 788. On a menu 780 the views 784, 786 may be a drop-down list or any other means of selection or access. The languages in which that particular Development Interaction is available may be indicated, such as at the bottom 790.

One window displays the trigger events in the product 782—the points where the module can be programmed to wake up automatically during use and run a stored (term for interaction) with users 783. The parameters may include characteristics such as the trigger event's frequency (to fit the user's learning curve), its type (error messages; menu commands; icons; buttons or other parts of the user interface; events during use; etc.) and priority (high, medium and low, so the user can control how often dialogs are run and when the user sets an infrequent priority, only high priority dialogs are run).

Another window provides tools to write automated dialogs. It also displays professionally written questions and dialogs 788 that can be selected and attached to specific events FIG. 3.

If triggers 232 in FIG. 8 are chosen, a list of available triggers is displayed 234, 783. These may include a variety of triggers some of which will be described below, but examples include:
- Vendor Initiated Interactions (VII) (at product installation, at Nth use of the product, changes in the rate of use of the product, etc.),
- Customer Initiated Interactions (CII) (interactive evaluations and suggestions, electronic suggestion pad, help button, etc.), and
- Passive Interactions (PI) (diary logs, passive evaluation of comprehension, etc.).

Figure 27:
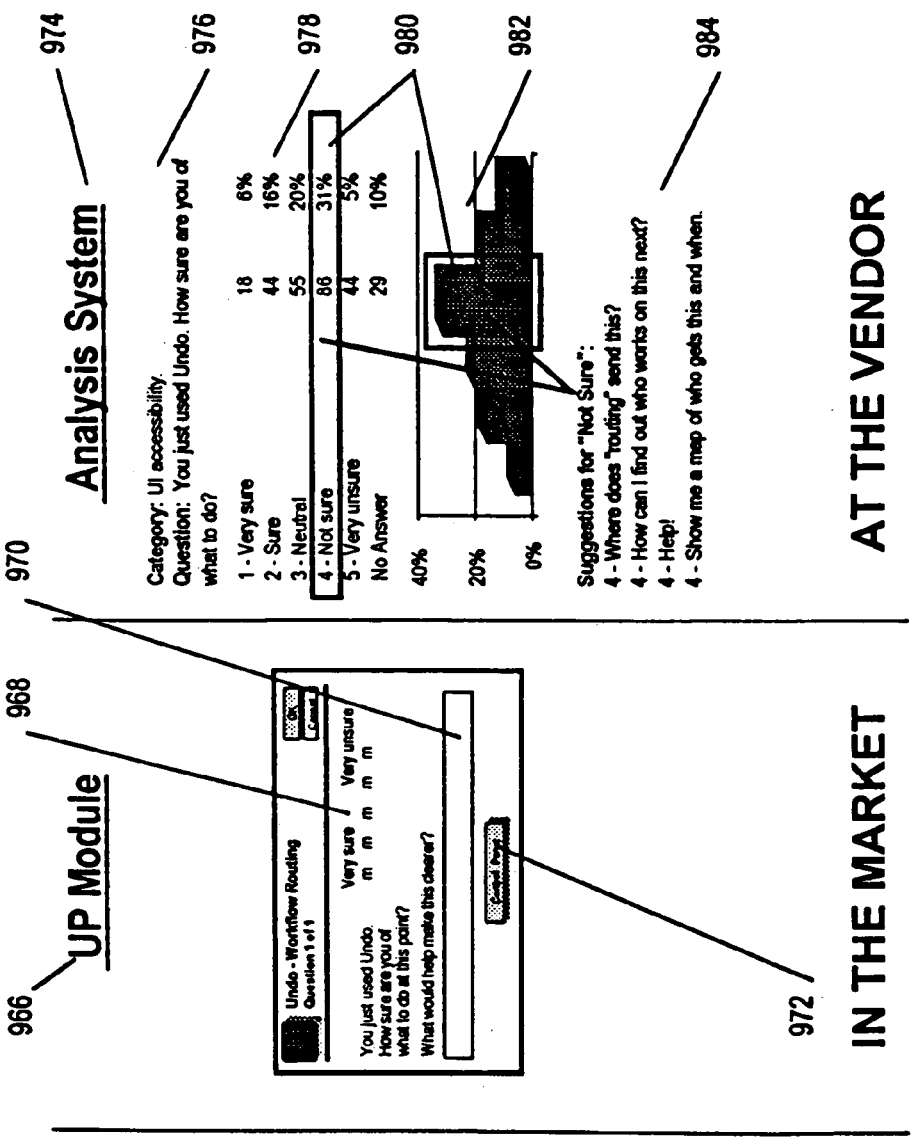

Additional examples include:
- Usability testing 960, 962, 964 in FIG. 27 (An example trigger might be the use of a particular product feature, or any of a set of product features, whose use is immediately followed by the use of "undo," cancel or other means of reversing the action. An example Development Interaction at such a trigger may be based on asking the user how certain he or she is at this point, and what would make the feature(s) clearer.)
- Product launch marketing 1020, 1022, 1024 in FIG. 29 (An example trigger might be the completion of product installation, or in one of its initial uses Example Development Interactions might learn whether the user is the buyer, why the purchase was made, which ad media was bought from, which marketing message(s) prompted the purchase, what are the user's real needs, whether or not the user needs to buy more units of the product, etc.)
- On-line customer support 1050, 1052, 1054 in FIG. 30 (An example trigger might be the user's answering a Development Interaction by confirming that he or she has a problem. An example Development Interaction might be inquiring whether the user would like performance support for this problem the next time this problem is encountered, and if yes, to link the product to the vendor's system to download that support.)
- Conducting transactions through products that employ a CB-PD Module 1080, 1082, 1084 in FIG. 31 (Example triggers might include breakdowns that can be fixed by a service, the availability of new product upgrades for one or more specific product features, when an inventory of disposables used in conjunction with the product reaches a pre-set re-order point, etc. An example Development Interaction might be to offer an on-line purchase opportunity.)
- Etc.

As each trigger is selected 234, 783 the appropriate Customer Design Instrument (CDI) or Development Interaction (DI) is specified to run at that trigger 788. For example, the Vendor may want Customers to help improve the installation method after the first time they use it, and this would involve a completely different Customer Design Instrument (CDI) than a Customer Design Instrument (CDI) focused on improving the product's interface during every-day product use. For a second example, it would also comprise a different Customer Design Instrument (CDI) than a Customer Initiated Interaction (CII) that provides Problem Reports (PR) by means of the Help button.

As another example, a Vendor may want sub-triggers within a single Development Interaction (DI), such as a probe about intentions when the product's use begins, several probes when major product functions are operated, and a final probe about satisfaction when the product's use ends; these could be specified by means of sub-triggers that would be specified either when triggers are specified 234 or when probes are edited 264.

These customized probes may be displayed at the correct points by using clear Instrument Design Repository (IDR) standards that separate them into pre-use, on-task, and post-use categories. This automatically specifies the first and third categories while having to attach only the on-task questions to varying trigger points. Since this reduces the custom programming needs significantly, it is possible to automatically include the triggers for a group pre-use probes, and a group of post-use probes, in virtually every Customer Design Instrument (CDI) as standard sub-routines. The interactive, on-task questions would be displayed by their own standard sub-routine (such as "display probe 14") at the correct time during product use Such a time might be specified by the Customer's pressing a particular function key, by the clock/calendar circuit (10 minutes after starting product use), or by other means.

Subroutines are included 234 for adding, modifying and deleting triggers from the list of available triggers After the user has selected the triggers to include in the specific CB-PD Module being programmed, this list is confirmed 236.

Triggers may be customized to fit many types of product uses such as usage problems, equipment problems, productivity problems, comprehension problems, training problems, needs for on-line performance support, use and effectiveness of on-line performance support, use of disposable supplies, opportunities to conduct on-line transactions, etc.

Figure 22:
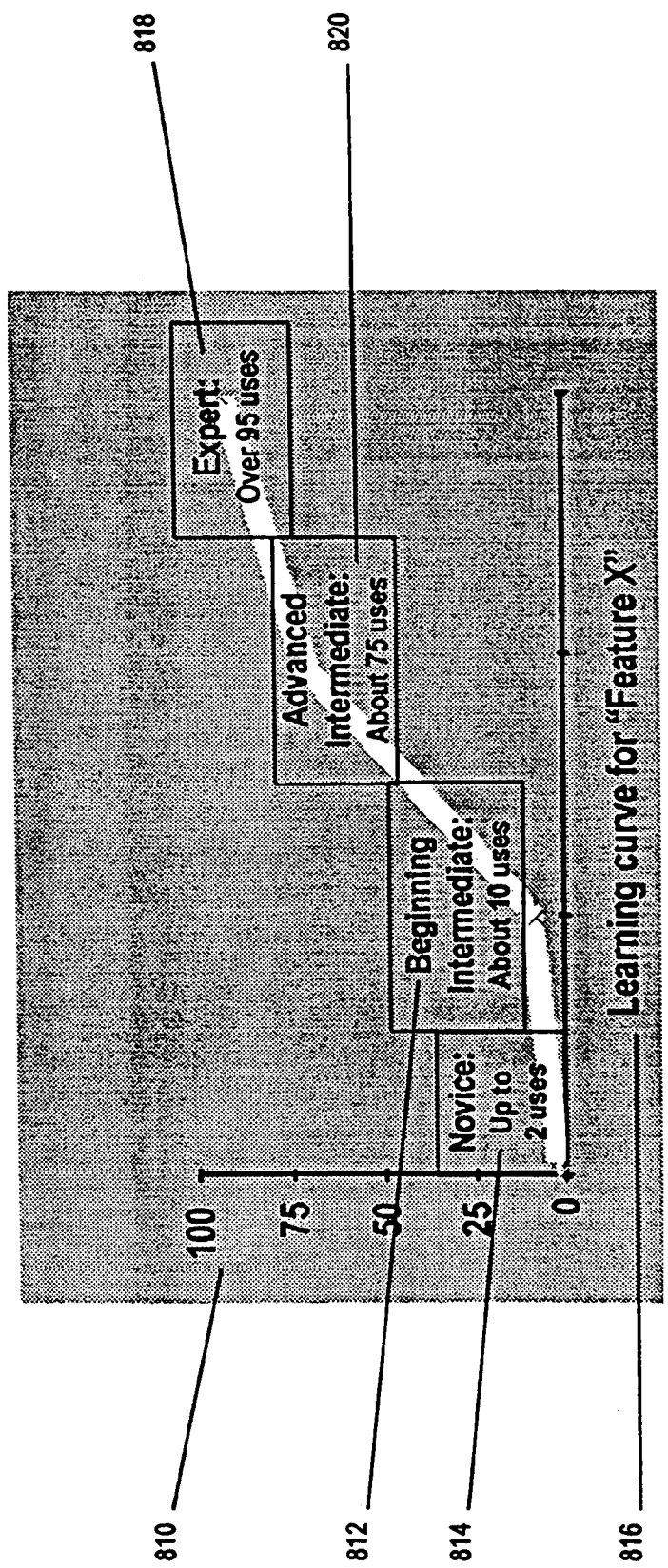
FIGS. 22 and 23 are illustrations of one type of trigger events and a flowchart for displaying relevant interactions triggered by product use.

For one example, FIG. 22 illustrates the expected learning curve for one product feature and the corresponding match of types of questions. A counter is incremented at each occurrence of that same trigger (which may be using a particular product feature, exiting an important new product feature without using it, accessing any one of a set of related but infrequently used features, etc.). The actual triggers occur at specific instances when both the trigger increments the counter, and that counter reaches specific values. At each of those specific values, a different trigger is fired and each are independent of the others (such as on the 2nd, 10th, 70th and 95th use of a feature), as follows:

| # of Uses 810 | Learning/Performance Stage 816 | An appropriate type of Question |
|---|---|---|
| 2 812 | Novice | Is the user interface intuitive? |
| 10 814 | Beginning Intermediate | How well does the user interface and the product fit the users' tasks? |
| 70 820 | Advanced Intermediate | How can the users' productivity and performance be increased? |
| 95 818 | Expert | What new features and product redesign(s) are needed or wanted? |

Any recognizable step, activity, task, error, metric, etc. is available as a trigger, such as time on task or sub-task (which may in turn be sub-divided by the amount of time on task to learn from slow performers which problems cause them to be slow, the fastest performers and how they are able to perform that well, and average performers and the factors that cause average performance to plateau at that level), error rates (which may in turn be sub-divided by the error rate to identify the most frequent errors and what causes them, the areas of product use that have the least errors and what contributes to that, and the areas of product use with average error rates and the factors that cause them), etc Entire other categories of triggers include areas such as metrics that are crucial to organizational performance like productivity, efficiency, effectiveness, the rate at which jobs are learned by new employees (time to proficiency), identification of re-engineering opportunities, etc.

If download utilities 238 in FIG. 8 are chosen, the list of available downloading options is displayed 240. Some of the possible options include:

Initial programming of the CB-PD Module: One of these options 240 provides the means to program CB-PD Modules 243 by means of a Customer Data Reader/Programmer (CDRP) 92 in FIG. 4, by means of a direct link with the Vendor's computer if the CB-PD Module is built into a Customer Directed Product (CDP) such as the facsimile machine 70 in FIG. 3, or by other means.

Re-programming a CB-PD Module: Another of these options 240 provides the means to re-program CB-PD Modules 243 after they have connected with the Vendor's computer and uploaded their Aggregate Customer Desires (ACD) data. This provides the automated ability to update the Customer Design Instruments (CDI) and triggers in specific sets of CB-PD Modules, whether they are located locally or remotely, by means of a Customer Data Reader/Programmer (CDRP) 92 in FIG. 4, by means of a direct link with the Vendor's computer if the CB-PD Module is built into a Customer Directed Product (CDP) such as the facsimile machine 70 in FIG. 3, or by other means.

Set up passive probes 240 such as diary logs, passive evaluations of comprehension, etc (see below).

With all the possible downloading options, the Vendor may encrypt the CDI file(s) 242. This would prevent competitors or interested hackers from accessing, modifying, deleting, or otherwise tampering with these files in the CB-PD Modules.

Related options are also possible, such as "Export to file." This option 240 would provide the means to save this as a downloadable file, so that its downloading, by means of the other downloading options, may be performed or scheduled at another time.

Such an Instrument Design Repository (IDR) may give Vendors the ability to construct Customer Design Instruments (CDI) reasonably quickly, easily and cost effectively based on numerous advantages. For instance, it would provide an on-line database of unbiased and objectively worded Customer Probes (CP) that could be added to or used to replace questions in pre-written Customer Design Instruments (CDI). This enables a CDI to be modified rapidly to meet unique needs simply by adding or deleting specific Probes and noting the specific points in the Development Interaction (DI) which the new Probe would be made. In somewhat greater detail, these functions include:

- It may provide local and/or remote access to pre-constructed Customer Probes (CP) that have been developed and used professionally and are appropriate for immediate use. This provides fast-turnaround for accessing unbiased, non-judgmental probes that help construct valid Customer Design Instruments (CDI).
- It may provide local and/or remote access to pre-constructed Customer Design Instruments (CDI) that have been developed for a specific industry, tested professionally and are appropriate for specific uses. This may provide shorter development times for using or adapting these Instruments for similar uses in the same industries.
- With a common file format for Customer Probes (CP) and Customer Design Instruments (CDI), they could be accessed remotely and copied from one IDR to another. This provides for rapidly spreading professionally developed Customer Probes (CP) and Customer Design Instruments (CDI) from many sources, so that they can be used quickly and productively In short, focused libraries of Customer Probes (CP) and Customer Design Instruments (CDI) may be created, so that they are readily accessible for copying and focusing their use on improving the specific products and services of a Vendor. Thus, an IDR system is a general purpose tool for developing and distributing libraries of Customer Probes (CP) and Customer Design Instruments (CDI), as well as a focused tool for its individual users to employ in developing their concentrated understanding of their Customers and relationships with them.
- Remote access enables product design, usability, marketing and other professionals to write, sell or send professionally developed Customer Probes (CP) and Customer Design Instruments (CDI) to clients. These custom probes, developed by outside professionals, could meet unique one-time needs or gather information to meet the specific decision objectives of a Vendor that sells the Customer Designed Product (CDP).

While an Instrument Design Repository (IDR) helps support the standardizing of Customer Probes across a product line or by product features, which enables cross-cutting comparisons, it also supports customizing the Customer Design Instrument to produce unique learning from each product and from each type of trigger 234 when it is used Standardized probes permit comparisons between products and over time, to identify common strengths, weaknesses and Customer-based suggestions for improvements. By applying similar probes across a product family, the learning generated from one product or market may be generalized to others. Customization enables unique learning based on each specific product or service, and on one product's evolving set of Customer Design Instruments (CDI) which are modified as that product is iteratively improved over time.

It is technically possible to program this Instrument Design Repository (IDR) in a number of ways For example, in addition to the programming process described above, another example includes a windowing system in which window 1 (the window numbers are arbitrary) contained the lists of Customer Probes (CP) and Customer Designed Instruments (CDI), window 2 displayed the content of the one selected, window 3 provided communications to access Instrument Design Repositories (IDR) on other computer systems, or Professional Experts located remotely (either by store-and-forward electronic mail, telephone, video conference, etc.), and window 4 provided the format(s) for writing new custom Probes. The final Customer Designed Instrument could be constructed in a fifth window by clicking on a set of Customer Probes (CP) in window 1 to open it in window 2, then either dragging or copying and pasting the Probes desired from windows 2, 3 and 4 into the final, fifth window, with the option of a Professional Expert providing real-time support or periodic (asynchronous) feedback. There, they could be cut-and-pasted into the appropriate place and sequence.

Development Interactions (DI)

Figure 10A:
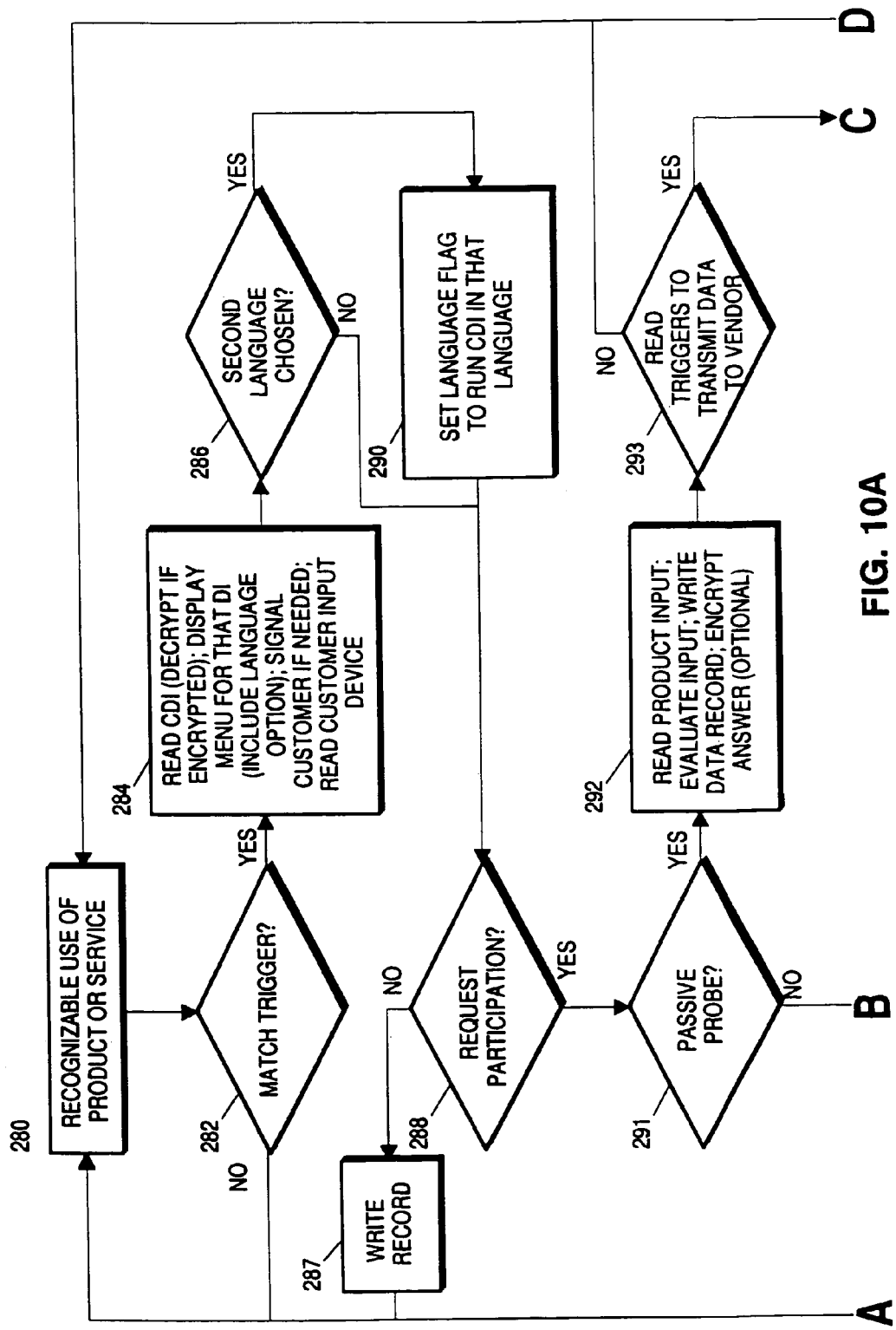
FIG. 10 is a flow chart of Development Interactions (DI).
Figure 10B:
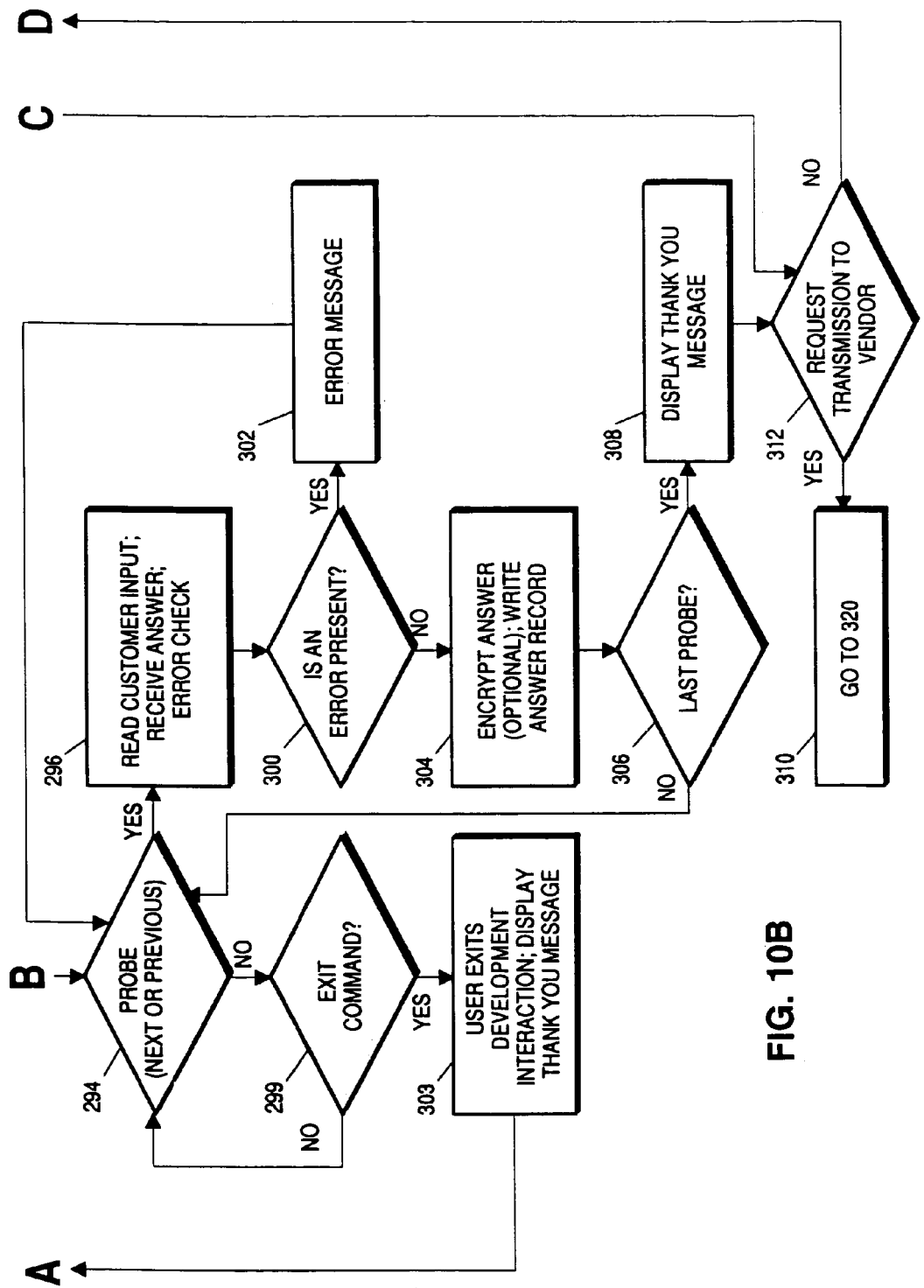

Turning now to the drawing, FIG. 10 illustrates a flow chart of data processing for conducting Development Interactions (DI) by a Customer Directed Product (CDP) by means of its CB-PD Module.

To characterize FIG. 10 in overview, two means are used to illustrate the performance of a Development Interaction (DI):

Vendor Initiated Interactions (VII) are product Development Interactions (DI) that are triggered at specific events determined by the Vendor Examples include:

- Installation (triggers may include at the beginning, during or just after product installation; to test components of the steps involved in installation, such as the user interface and any problems encountered),
- Frequency of use (triggers are based on frequency of use, such as during each Nth use of the product;
- this may be a self-adjusting algorithm that is linked to the clock/calendar circuit, so that it lengthens the time between Vendor Initiated Interactions (VII) if the product is used frequently, and shortens the time between Vendor Initiated Interactions (VII) if the product is only used infrequently, or another approach that may be included and selected by the Vendor), or
- Sudden change in use rate (trigger is based on evaluating the pattern of use by time stamping each use and measuring the actual pattern against a pre-set pattern, or against the pattern during preceding periods; when the actual usage rate speeds up or slows down by more than a set amount or percentage, the CB-PD Module conducts a CDI to inquire about the Customer's reasons for using the product more or less frequently; similarly, triggers may be based on errors or error rates, performance or productivity measures, etc.).

Customer Initiated Interactions (CII) are product Development Interactions (DI) that are triggered by the Customer Examples include:

- Interactive evaluations (a button, function key or other means enables a Customer to initiate a Customer Development Interaction (CDI) whenever desired),
- Electronic Suggestion Pad (ESP) (a button, function key or other means enables the Customer to open an electronic notepad that records and stores Customer suggestions for the Vendor), and
- Help or On-line Customer Support (OCS) (this button, icon or trigger enables the Customer to report problems on-line to a vendor; a variety of uses for an OCS button are possible, such as (1) Problem Reports (PR) inform product designers about Customer problems, (2) OCS Requests provide immediate notices to the Vendor's customer service staff about Customer problems, and (3) receiving interactive Customer Support on-line, with a passive report generated that itemizes what support was needed, so the Vendor gains a clear understanding of Customer problems).

Figure 24:
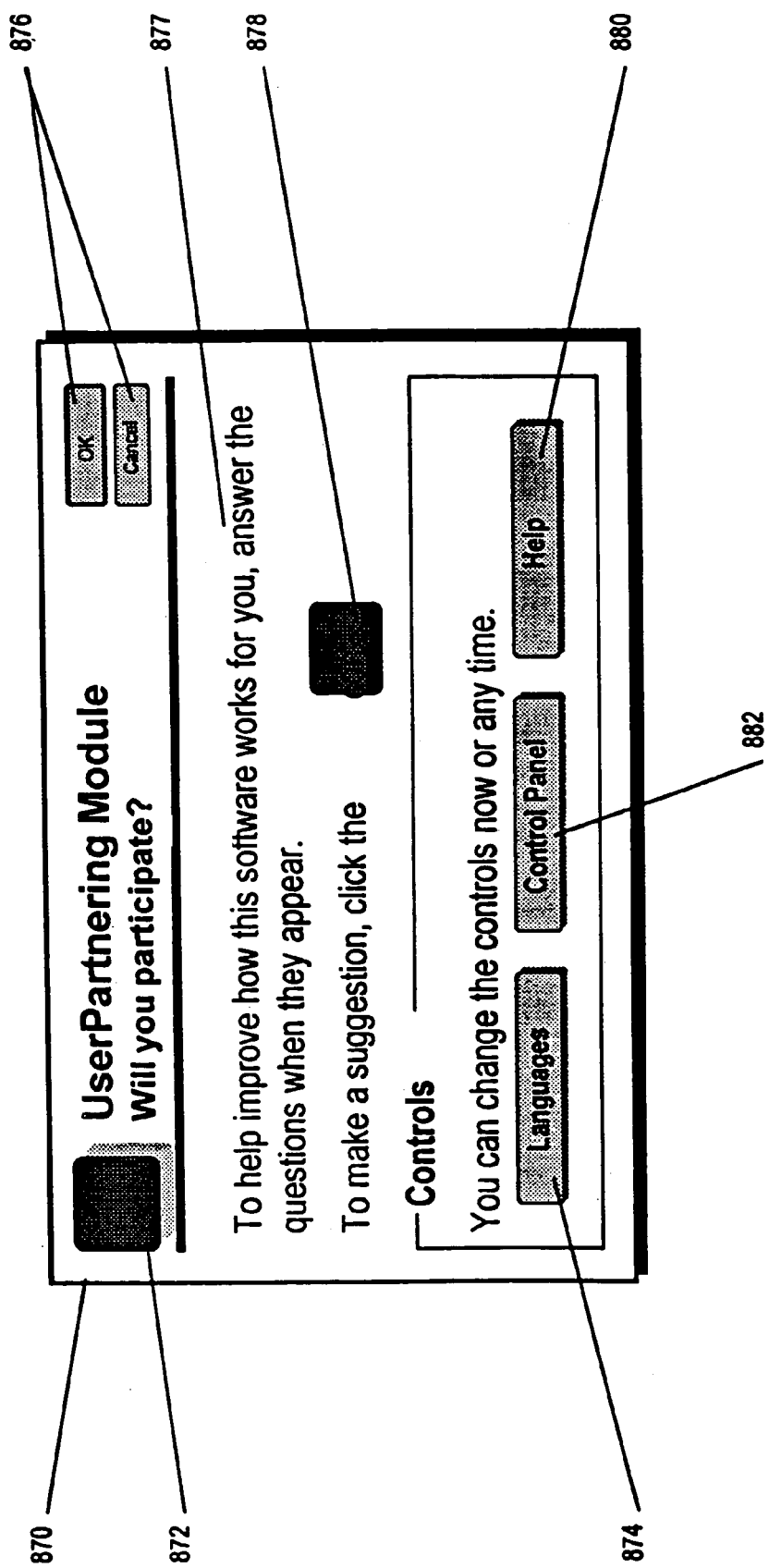

To summarize these two initial types of interactions, in the product CB-PD Modules run the stored Development Interactions (DI). For example, an opening interaction from a software product is illustrated in FIG. 24 870 When a trigger event occurs, the CB-PD Module runs the appropriate Development Interaction 877; along with any identification logo or icon or symbol 872, 878; layout 872; and other components 876. Multi-language capability 874 lets users interact in their language (users can change the CB-PD Module to any available language, simplifying worldwide learning). Product users can also initiate interactions 878, giving them ways to provide feedback to the right person at the vendor. Help may also be available 880, along with the means to control the CB-PD Module 882 in areas such as the frequency of interactions, anonymity and privacy, transmission or sale of the users' data, etc. Whether a user wants "kick back" to vent anger or offer thoughtful suggestions, this gives them a way to talk back quickly—then go back to work.

Additional types of interactions are possible. Some of the options, which indicate the scope of this invention, include:

Passive Interactions (PI):
Diary logs (this is a database that is connected to the clock/calendar circuit and may record information such as when the product is used, how long it is used for, the frequency of actual use while it is turned on, which functions of the product are actually used, etc.)

Passive evaluation of comprehension (this is a database that may record information such as the sequence of keys which produce errors in using the product [by pressing an unworkable sequence of keys or how often a key that aborts or clears a command sequence is pressed], the number of steps actually taken to perform various operations [and whether the Customer used the most efficient method to accomplish that result], etc.)

Customer-based product design: In its broad outline, this invention provides for interactively designing products in ongoing electronic partnerships between Vendors, Distributors and Customers. This includes new abilities to work more closely together by conducting research and improving product design in areas such as:

Customer demographics and profiles
On-task interactive product design by Customers
Active and passive comprehension evaluation of Customer performance
Electronic participation in work flow and logging of functional steps performed
Electronic suggestion pad (ESP)
Post-use Customer Probes
Determination of the what Customer Help and Support are needed Design contributions from experts: If a Vendor would like to set up baseline expectations against which Customer responses can be evaluated, a variety of approaches may be used to automate that process. One of these is to have experts use the Customer Directed Products (CDP) and conduct their own Development Interactions (DI). The data from the experts would be collected and processed as a separate set of Defined Customer Desires (DCD). Once the experts' baseline is established, those views can be compared automatically by computer to the Customers' suggestions.

This can create a set of comparative data that rapidly reveals what the Customers achieved compared to what experts are able to achieve in using the same product: For example, this might help surface the level of product simplicity, Customer support, and other assistance Customers might need to receive the full benefits from the product. Or, if the Vendor had comprehension expectations of what Customers would understand about the product, those could be compared automatically to what the experts understood about the product.

Overall purposes for Development Interactions (DI) include adding to this invention the means for Customers to help improve the products that they use, both systematically and in unique ways, to provides themselves and vendors with advantages such as:

Time and dollar savings in the future: By riding the mass manufacturing curves, the cost of building, programming and maintaining CB-PD Modules, so that Customers to help improve a wider range of Customer Directed Products (CDP), can be lowered over time.

Performance improvements in the future: By riding the learning curve, the abilities of numbers of Vendors and an increasing number of Customers to help improve the products and services they use will increase.

Generalize Customer-based improvements: Using systematic Customer Probes (CP) and Customer Design Instruments (CDI) enables comparisons between the Defined Customer Desires (DCD) over time (between products, between Vendors, between industries, etc.). When specific problems or opportunities are identified, some of these might be generalized to identify related commercial opportunities, or confirm that related problems have been solved.

With the above overview in mind, attention is now directed to FIG. 10, which is a flow chart of Development Interactions (DI) With the CB-PD Module tracking recognizable events 280 (such as when the Customer Directed Product (CDP) is turned on and off, when a particular product feature is used by pressing a particular button, etc.) the Module determines whether or not a particular event matches a trigger 282. These triggers may be for Vendor Initiated Interactions (VII), Customer Initiated Interactions (CII), Passive Interactions, or any other type of Development Interaction (DI).

Triggers: When a trigger is identified, the CB-PD Module reads the appropriate Customer Design Instrument 284 (decrypting it if needed) and displays the opening menu for it 284 if that is appropriate. The Customer is signaled 284 (if warranted by a particular product) by a ring, tone or other means. The menu 284 should be based on a consistently designed opening screen so it is readily identifiable over multiple Development Interactions (DI). This menu may include an option to switch the Development Interactions (DI) to another language 286, and once that selection is made the new language chosen is set as a permanent flag 290. This language flag enables properly translated and culturally appropriate Customer Design Instruments (CDI) 260 in FIG. 9 to be run 284. That language flag remains set until a different language is chosen 286 in a future Development Interaction (DI).

Similarly, users may set other controls to make the CB-PD Module 284, 872 in FIG. 24 a substantially user-controlled device, rather than just a pre-programmed device (see "Control Panel").

Figure 23:
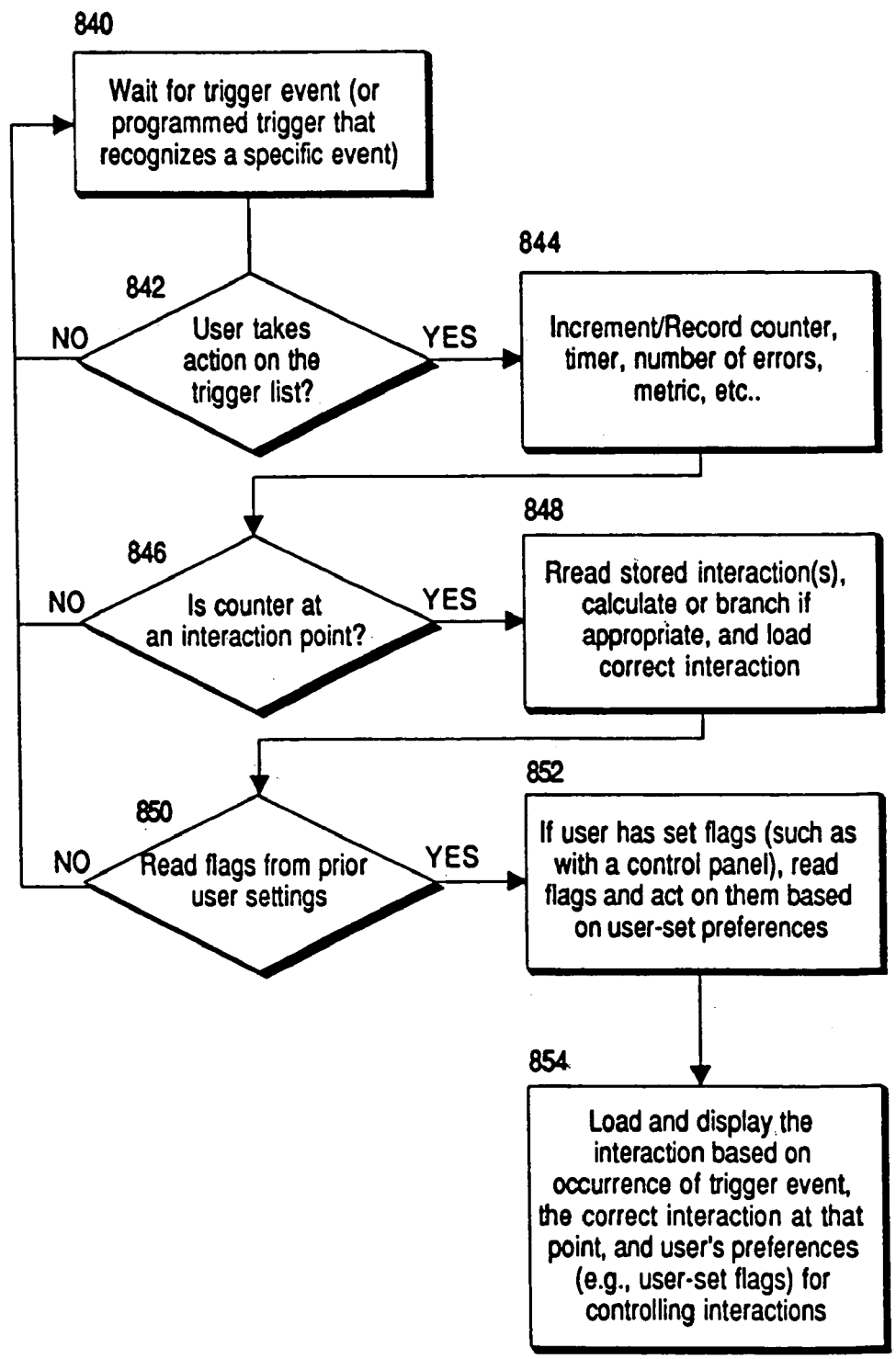

This pattern of triggers is presented in FIG. 23, which illustrates one means of programming the CB-PD Module to recognize trigger events. Two of the possible means for identifying trigger events are illustrated 840 (such as a separate "agent" or shell program that lies in wait and monitors events; or hard-coded triggers in the product which, when a hard-coded event occurs, calls the module to learn if an interaction should be presented to a user). If such an event does not occur 842 then no action is taken, but if such an event does occur 842 then an appropriate metric is incremented 844 based on the particular event. These may come from any of a broad spectrum of recognizable events and the particular status (e.g., count, length of time, number of errors, other metrics, etc.) of that event may determine that an interaction may be called for 846.

If an interaction is not called for 846, then after incrementing the indicator 844, no action is taken 840. If an interaction is called for 846, then the particular interaction is determined 848 (by means such as retrieving the interaction directly from storage; by calculating which interaction is the correct one such as in timed tasks, whereby different interactions may be displayed for those with slow, fast, or average performance levels; by determining the experience level of the user for that product feature, whereby a different interaction occurs for novices, intermediate and advanced users; by branching to the correct interaction, whereby a different interaction may be displayed for those with particular work or roles characteristics, such as for clerks, mid-level managers or senior executives; etc.) and loaded 848.

Figure 29:
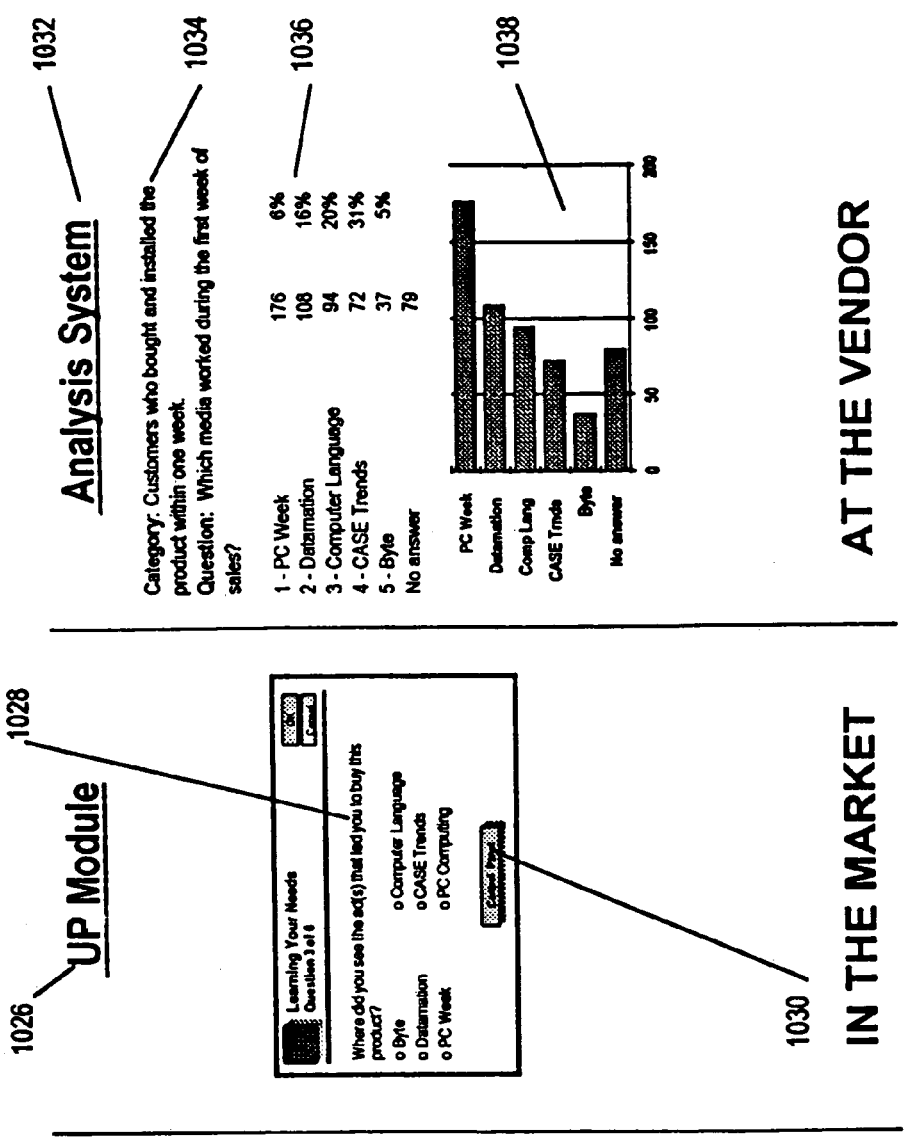
Figure 30:
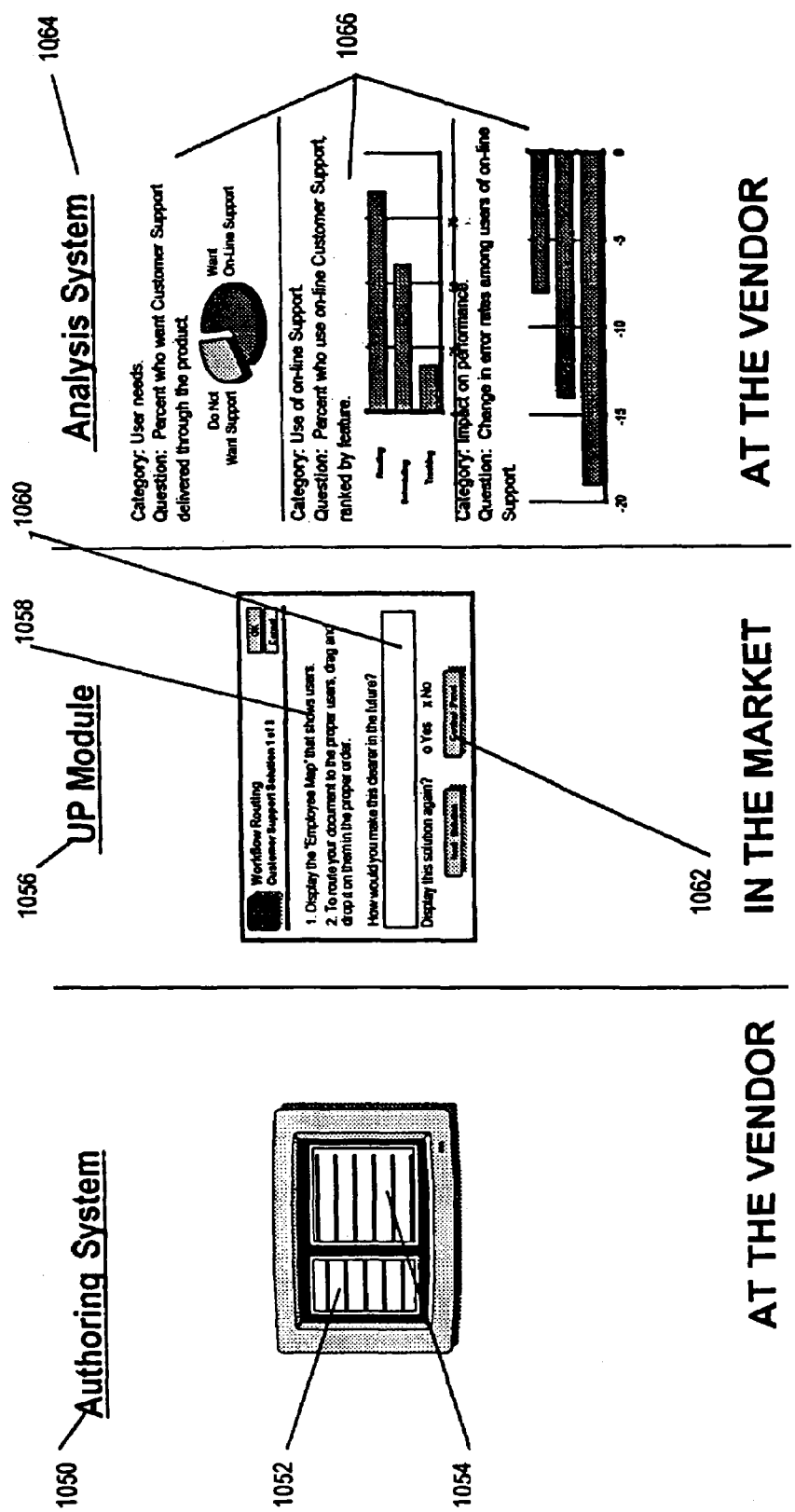
Figure 31:
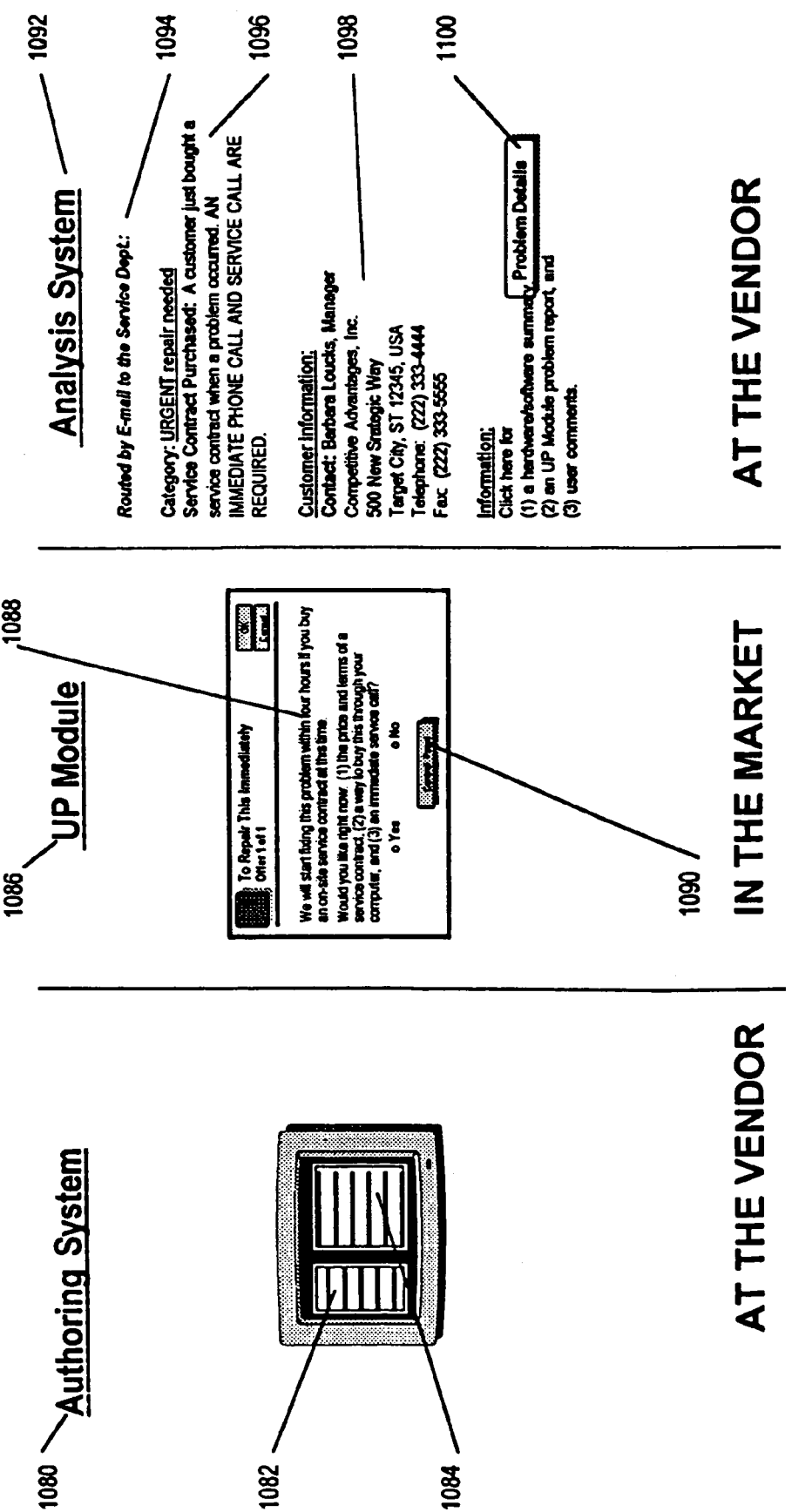

If a stored interaction is loaded 848, its use in an actual interaction is controlled by user-set flags with a means such as a control panel 882 in FIG. 24, 972 in FIG. 27, 1030 in FIG. 29, 1060 in FIG. 30, and 1090 in FIG. 31. Those flags may determine such actions as the language in which to display the interaction; whether the CB-PD Module has been turned off by the user; whether the user wishes to see all the stored interactions, some of them or only the most important ones; and other user-controllable characteristics of such interactions. If no interaction is to be displayed based on those user-set flags 850, then no action is taken 840. If an interaction is to be displayed 850, then the appropriate form and characteristics of that display are adjusted to match the particular characteristics set by the user 852 and the interaction is displayed in that manner 854.

On a more theoretical level, the invention provides a generalizable means to reduce the universe interactions between products and users to the particular events that produce the greatest learning or other value to the vendor, and the greatest learning or other value to the user. A first level 840 identifies a broad spectrum of events that appear promising. A second level 842 reduces those to specific matches that cross a threshold of importance and filter out (1) interactions least likely to add learning or other value, and (2) time and effort spent interacting with a CB-PD Module that is of least importance to users, and (3) excessive data that is likely to be of least value to vendors. A third level 850 permits users to focus the interaction (and the data collected) on the events which they believe are most important for them to provide information to the vendor, which enhances the value of the data received because users have reduced it to that which they have decided they will spend the effort developing and contributing. The net result is that all first level events 842 are marked and appropriate data is recorded 844; at the second level, over time and through learning an iterative model is built based on the reasons why particular events are more valuable than others 846 for interactions and these are the ones acted upon (e.g., current best-practices may be identified from previous uses of the CB-PD Module and these may be downloaded and stored 846, keeping the CB-PD Module able to learn from users in the best new ways identified over time 848); at a third level 850 users pre-filter the events and the available data based on what they believe is worth providing 852; producing a focused data set from the interactions 854 that is more appropriate for analysis and learning from the particular users 850 who provide it.

Participation not required: Development Interactions (DI) should be non-intrusive; no Customer should be required to participate in this or answer any specific question that they don't want to answer. It is recommended that the user interface should be designed so that in each Development Interaction (DI) a Customer may first decide whether or not to participate 288. If a Customer chooses to not participate, record a "declined to participate" response 287.

Similarly, users may set others controls to operate the CB-PD Module 284, 882 in FIG. 24 (such as the frequency of interruption, user privacy and the anonymity of data sent from the product, whether or not the user's data is sent or sold to third parties other than the vendor, etc.).

Doing the Development Interaction (DI): For each Customer Probe 294 receive the customer's answer 296 by reading the appropriate Customer input device(s) 296 for that Customer Directed Product (CDP). Test for errors 300 (such as whether the input key pressed is within the range of acceptable answer keys). If an error is present display an error message 302 (which message may be specific to that type of error, rather than a general error message) then redisplay the previous Probe 294. If an error is not present, the Customer's answer may optionally be encrypted 304. Then write the answer to a data file 304 and determine if there are any more Customer Probes (CP) in the Customer Design Instrument (CDI) 306. If there are more Probes, display the next probe 294. If a Customer chooses to not answer any particular Probe, enter a standardized "no answer code" such as "999" as the answer to that Probe 304. If the Customer engaged in this Development Interaction (DI) before and that data file remains in memory 158 in FIG. 6, do not overwrite the previous data file(s). Append a new Development Interaction (DI) to that file or open a new file for this new DI.

Terminating in the middle: In all Development Interactions (DI), the Customer can terminate a session at any point in time 299 (such as a "Quit" or "Clear" button which may be physical or on a display screen; a voice command; a prompt displayed below the probe; etc.). If the Customer exits a Development Interaction (DI) 303, return to 280 and end the trigger condition 282 that caused the Development Interaction (DI) to commence (preventing running this DI as an endless loop).

Types of probes: A wide variety of Customer Probes (CP) are appropriate 294 Some of them include:

Quantitative Probes

In a quantitative probe (such as a 1- to -5 scale question or a multiple choice question) it is easy to give quantitative answers 296 and check that for errors 300; the Customer can simply press a number on a numeric keypad 296 and the CB-PD Module can determine if the answer is within a specified range. If there are only a few buttons on a product, a designated button may be pressed once for "1", twice for "2," etc., with a display providing feedback on the number provided.

Qualitative Probes

With a qualitative probe (such as asking why a specified product feature is liked or disliked) Customers may need to provide a text answer. There are various ways to handle this, depending on the features in each Customer Directed Product (CDP) Some of them include:

Readily available input devices: In products such as the facsimile machine 70 in FIG. 3, voice input 78 may be used. In products that have a alphabet keyboard, such as various types of information industry products, the product's keyboard may be used. In products where the CB-PD Module 62 in FIG. 2 has a full alphabet keyboard 60, that keyboard may be used.

Limited input devices: Products that have only a keypad or a small number of buttons for input may employ a qualitative approach called a "checklist probe." These resemble multiple choice questions in that the Customer simply enters the number(s) of the item(s) in the checklist that corresponds to the qualitative replies they would have otherwise given. Checklist probes must start with separate Customer probes, a set that is developed by manual means before preparing the Customer Design Instrument for the CB-PD Module. This process generates Customer data that may be converted into a checklist of the kinds of responses appropriate for Customers in particular situations, in response to particular probes. The Customers then only need to check off the response(s) that apply to them. Properly conducted, this process is effective for producing both sufficient and valid information. Thus, checklist probes may be written once a manual qualitative study has been completed and enough qualitative (or text) replies have been received to develop an appropriate checklist. While there are several ways to construct such a checklist probe, one method is to take the qualitative data and divide them into the main categories. Separate them into two lists, one for positive replies, the other for negative. Then rank the lists in descending order from the largest number of Customer replies to the smallest. Finally, compare the two lists side-by-side and make sure that each positive point is matched by a negative one (and vice-versa). This provides the initial checklist with which Customers may reply to that probe by means of a limited input interface.

Since different types of Customer Probes (CP) produce different types of data, the best way to reach a specific decision making objective is to use the types of probes that will produce the type of information needed.

Examples of Probes and Interactions

1. Pre-use Probes

Vendors may want to collect some data about the characteristics of their Customers. This falls into broad classes, such as demographic data, benchmarking, intelligence, etc. This data may be collected 294, 296, 304 independent of the use of a Customer Directed Product (CDP), and one of the appropriate times to collect this may be after the product has been turned on but before its use has begun 282. Furthermore, this data may be collected quickly, primarily by means of multiple choice probes 294. This pre-use interaction would acquaint Customers with the presence of the CB-PD Module, its menus and screen design formats 284, and the process of conducting a Development Interaction (DI) with the product 284, 288, 294, 296, 299, 308.

While pre-use probes have many applications, the gathering of demographic data can be used to determine Customer characteristics such as age, gender, educational level, nationality, primary language, etc. As another example, pre-use probes may also be employed to learn the Customer's use of competing products, their purchase plans for certain classes of products, the quantity they intend to purchase, estimated budgets, etc.

Depending on the nature of the Customer Directed Product (CDP), it may be a product that is generally used by one employee or it may often be used by different employees. Thus, for products that are used primarily by one employee, pre-use probes will only need to be run once; for products used by a number of employees, a few key probes may prove valuable in each Development Interaction (DI).

2. On-task Probes

There is an intrinsic bias to an on-task Development Interaction (DI) because it is conducted while a Customer uses a product. This DI leans toward the utility of the features that are being used at that moment. For example, Customers are able to report many more problems, with more specific descriptions of them, while they are using a product than they would after they finish using the product, and far more than they could a week or a month later.

On-task probes may uncover valuable product design information from any type of use of a product, helping determine what difficulties are present and their severity when they occur. Thus, on-task probes should be used to learn very specific information that is highly valuable to product designers for making improvements; this design partnership helps the Vendor's designers and managers know whether or not the Customers truly understand their products. The primary value is a clearer and closer relationship with Customers at the time they are using a Customer Directed Product (CDP).

When the Customer reaches certain triggers 282 in using the Customer Directed Product (CDP), the CB-PD Module opens the appropriate Customer Design Instrument (CDI) 284. These may be Vendor Initiated Interactions (VII), Customer Initiated Interactions (CII), or any other form of interaction between the Customer Directed Product (CDP) and the Customer. The Development Interaction (DI) then proceeds as described above.

On-task probes may be triggered 282 by major product features used by all customers, or by minor features that only a minority of Customers will use. They may also be triggered by user actions, time on task, or other dynamic activities and measures. When it is desirable to gather data in an area only some Customers will use, such as learning the value of those features to those who do use them, then the use of those features should be the triggers 282 for those on-task probes 294.

The frequency of on-task probes may vary depending on the needs of the product's Vendor and the dynamics of the market for that product. For example, some markets are characterized by "product churning" with frequent introductions of new products. In these cases, both the Vendors and the Customers may want to participate in a more frequent and faster product improvement process, based on a higher frequency of Development Interactions (DI). In other cases, a slower pace may be more appropriate. In addition, the triggers 282 for Vendor Initiated Interactions (VII) may be adjusted within the CB-PD Module by an algorithm that reviews that Customer's willingness to participate 288 in previous Development Interactions, and reduces by some percentage (such as one-fourth or by half) the triggers 282 for conducting Development Interactions (DI).

3. Active and Passive Evaluation of Comprehension and Performance

Since many products must be learned before they can be used well, how long does it take for Customers to learn how to use them? In what sequence are the products actually learned? Do the Customers master the product and become proficient in using it, or merely muddle along? If they only muddle along, when does their learning plateau and what do they fail to learn? These kinds of questions are essential for both Vendors and Customers to answer; being able to gather data that answers them, as this invention could make possible, may produce some of the greatest long-term gains from CB-PD Modules.

If these types of Customer Design Instruments (CDI) 284 are run occasionally, their interactive probes 294 can investigate the Customer's comprehension of the product's features. For an interactive evaluation, ask comprehension and performance probes either during the use of the product 294 or after certain product features have been used 282. This could include many types of probes that ask the Customer to recite facts, give explanations, cite principles, etc. In general, the Customer could be asked to demonstrate his or her learning from using that product.

Both comprehension and performance may also be evaluated passively, without the Customer's involvement, since many products are used interactively. The CB-PD Module computer can be triggered 282 during a particular use of the product, to record passively 291 the number of Customer responses that fall within acceptable ranges 292, the number outside of those ranges 292, and what specific actions were done outside the range of properly using the product 292. Since the CB-PD Module can calculate the ratio between those two numbers, if that comprehension (or performance) ratio falls below an expected level for that product, then that could trigger 293 a message to transmit the CB-PD Module's data to the Vendor 312. This transmission could trigger a customer support service by the Vendor's employees, to assist the Customer in improving the use of the product.

In general, for a passive evaluation, specify triggers 282 (such as the Nth use of the product or employing a particular product feature that would demonstrate Customer understanding or the lack of it), track the product input 292 and compare that with pre-specified acceptable use of the product 292; record the appropriate data 292 and any specific sequences of incorrect product uses 292 that the Vendor wants to know.

4. Electronic Suggestion Pad

An electronic suggestion pad helps a Vendor learn the unanticipated problems and suggestions Customers may have while using a Customer Directed Product (CDP). While this is not expected to provide as large a quantity of Customer input as probes, its quality may be high. It is a side channel for Customers who have something they want to report or contribute, but haven't been questioned specifically on that point. The electronic suggestion pad is purposefully unstructured and free-form so Customers can describe, in the ways that make the most sense to them, their descriptions of problems and their suggestions for the product.

Since the use of an electronic suggestion pad will be contextual, it is suggested that the trigger 282 be customer initiated. When the Customer enters the appropriate key or command 282, a menu is displayed 284 with the electronic suggestion pad as one choice in it 284. When the Customer selects this choice, a passive probe 291 reads the available product data 292 and writes the available information 292 about the Customer's current uses of the product and its configuration. The display then opens a free-form entry area 294, reads the Customer input 296. (such as problems, comments, suggestions, etc.) and writes the input as a record 304 to the electronic suggestion pad's data file. After the Customer exits 299 the electronic suggestion pad, a thank you message is displayed 303.

5. Diary Logs

A diary log provides passive tracking of the use of the product by its Customers. Among other types of valuable information, it could:

Count the number of times a Customer uses a Customer Directed Product (CDP), so that number can be compared to the number of times such a product is actually expected to be used, Report the Customer's performance and comprehension in using some parts of a Customer Directed Product (CDP), Imply, by the areas where problems are passively identified, where the Customer's future needs will be heavy and where they will be weak, Inform the Vendor's managers which investments in new product features are most likely to be valuable to Customers and which are most likely to not be used, Guide product Vendors toward a clear understanding of their products based on how Customers actually use them, and away from developing products and features that are consistently not used, etc.

These types of data are helpful when a Vendor has designed a product to produce certain benefits for its Customers, and needs to know if the Customers used those features. A diary log would inform the Vendor of the proportion that actually used, and did not use, each product feature that can be tracked by a CB-PD Module, where such tracking is turned on.

6. On-line Customer Support (OCS) (User-directed, Interactive "Help System")

An OCS feature in the CB-PD Module enables the Customer to report problems with the product to its vendor. Among others, there are two types of On-line Customer Support (OCS) requests: (1) Problem Reports (PR) inform product designers and Vendor managers about Customer problems, and (2) On-line Customer Support (OCS) Requests may provide immediate notices to the Vendor's customer service staff about Customer problems.

6.A. Problem Reports

Problem Reports (PR) provide the means for a Vendor to improve the design and performance of their product(s), and the customer satisfaction from using them, by means such as:

A log showing that help was accessed 291 and the use of the product 292 when it was accessed, A Customer Design Instrument (CDI) that probes what the Customer's problem is, What the Customer would like in the way of help to solve that problem right away, How the Customer suggests solving it in the future, etc.

These Problem Reports do not solve Customer problems on the spot, but they do let Customers notify Vendors of the help that they need.

6.B. On-line Customer Support (OCS) Requests

On-line Customer Support (OCS) Requests, on the other hand, may be more immediate and responsive. If the Customer Directed Product (CDP) has a means of communications (such as the facsimile machine 70 in FIG. 3 or the CB-PD Module in 120 FIG. 5) the last function, On-line Customer Support (OCS) Requests, may be used to replace some types of initial Customer telephone calls into a Vendor's customer service department. In brief, the Customer issues an On-line Customer Support (OCS) Request 282 (such as by pressing a Help button or command, or by an On-line Customer Support (OCS) button or command). If Help is requested, a menu is displayed 284 with the OCS Request feature as one choice 284. If On-line Customer Support (OCS) is requested then the user interface is more direct. Regardless of the steps involved, when the Customer selects this choice, a passive probe 291 reads the available product data 292 and writes the available information 292 about the Customer's current uses of the product and its configuration. An On-line Customer Support (OCS) Customer Design Instrument (CDI) then provides the first Customer Probe (CP) 294, reads the Customer input 296 and writes the input as a record 304. After the Customer completes the On-line Customer Support (OCS) Request 306 a thank you message is displayed 308.

By pressing a "transmit" function 312, perhaps one with an "urgent transmission" code or phone number, this data is immediately sent 336 to the Vendor's computer. There, if a correct on-line response is available it may be downloaded immediately to the customer's product along with any new trigger event parameters needed (in the event any of them need to be modified, such as the frequency count of interactions before firing as a trigger). The next time that trigger fires (whether Vendor Initiated or Customer Initiated), the On-line Customer Support reply may be displayed to assist the Customer. Alternatively, if there is not an on-line solution, the an appropriate message is sent to the customer based on the action the vendor plans to take, along with any new trigger event parameters needed so the customer receives the message at an appropriate time during use.

If there is not an appropriate on-line solution to download to the customer's product, the urgent transmission code enables the customer's On-line Customer Support (OCS). Request to be routed 336 to the Vendor's customer support staff via its internal E-mail system or by another means. There, a customer support employee may use the On-Line Customer Support (OCS) Request information from this Customer Directed Product (CDP) to research the problem and phone the Customer rapidly, providing early support to Customers if that is desired. That solution may also be placed on-line, ready for downloading the next time a similar On-line Customer Support (OCS) Request arrives at the vendor's computer. Thus, the actual receipt of these requests prompts the evolution of user-appropriate on-line support.

Figure 19:
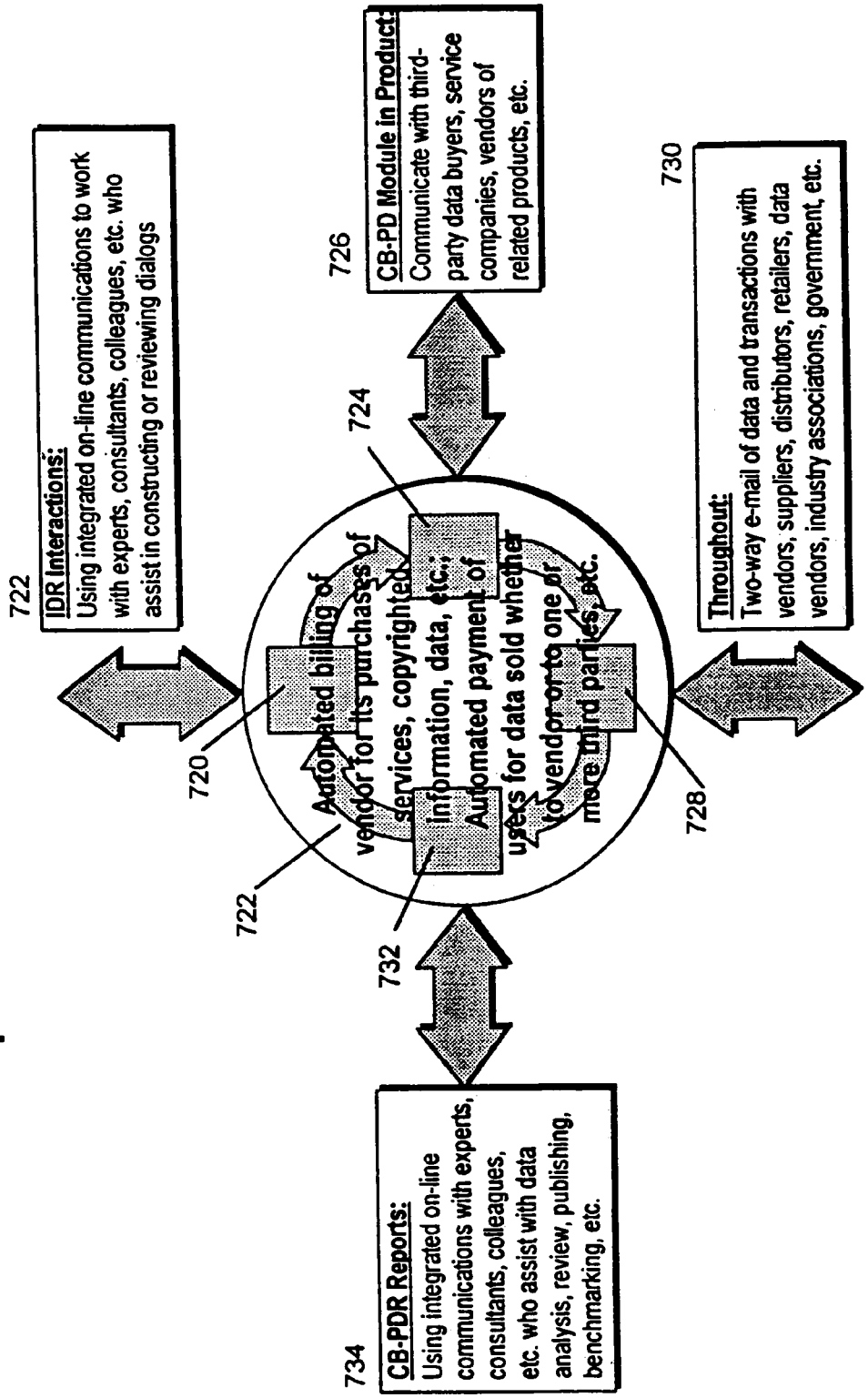
FIG. 19 is an illustration of the invention's open communications, e.g., its digital environment for supporting companies, products and markets.
Figure 20:
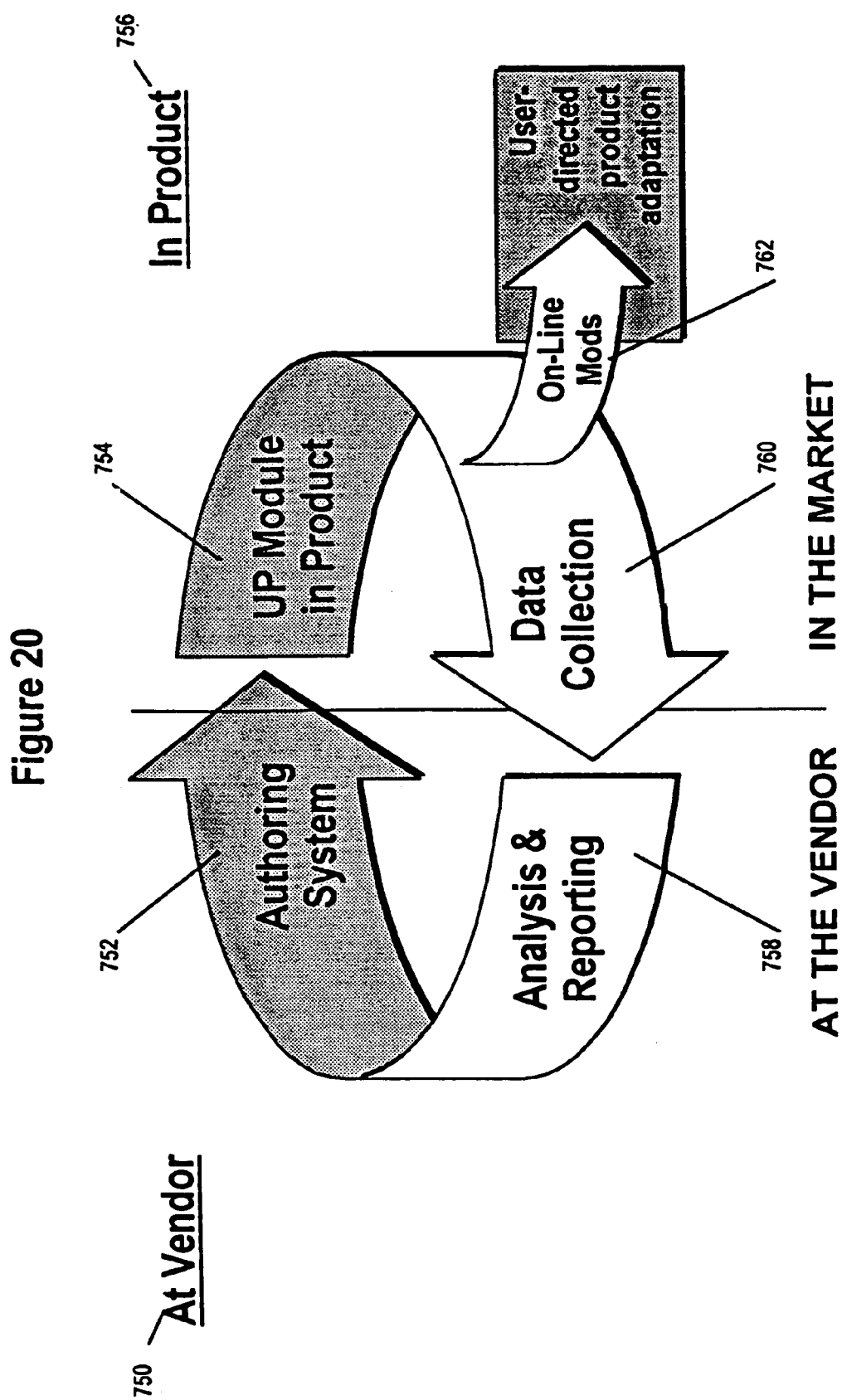

By means of external communications 724, 726, 728 in FIG. 19, such support may be provided by organizations other than the-vendor.

Whether rapidly or over time, this capability and process may lead to one or more dynamically responding systems for supporting a growing number of individual user needs interactively, while users are on-task, using the product, while preserving the full privacy and anonymity of each user (if they choose to exchange these messages without identifying themselves). The net result is the Vendor (or other third-party providers) extends their customer service and training departments right into products located at the point of use throughout the marketplace worldwide, providing the means for Customers to obtain the specific on-task performance support that they require as one of such a product's built-in features.

7. Interactive Services and Transactions

Interactive communications like those described in the On-line Customer Support (OCS) feature may be extended to providing other services and to conducting transactions:

Interactive services: For example, Customers may request a variety of services such as scheduling a product maintenance appointment, requesting that another copy of the product's manual be sent, or asking to have a salesperson contact them about a possible future order Transactions: For example, Customers may conduct transactions such as placing orders for additional products, signing up for an annual service contract on the product, or ordering other products in the Vendor's product line.

If a Customer Directed Product (CDP) has built-in communications (such as the facsimile machine 70 in FIG. 3, the CB-PD Module 120 in FIG. 5, the Customer Data Reader/ Programmer (CDRP) in 92 FIG. 4, or some other means) then interactive services and transactions may be provided directly through a Customer Directed Product (CDP). These interactions may be initiated by either the Customer or the Vendor.

In brief, either the Customer or the Vendor initiates the interaction 282. A menu is displayed 284 with the interactive services feature and/or the transaction feature as choices 284. When the Customer selects either of these choices the appropriate Customer Design Instrument (CDI) is read 284 (of which a wide variety may be stored in Memory 158, with access to them by means of further selection such as by a sub-menu). The CB-PD Module then displays the first Customer Probe (CP) from that interaction 294, reads the Customer input 296 and writes the input as a record 304. After the Customer completes the interaction 306 a thank you message is displayed 308. By pressing a "transmit" function 312, perhaps one with a "special transmission" code or phone number, this data is immediately sent 336 to the Vendor's computer. There, the special transmission code enables the message to be routed 336 to the Vendor's customer support staff via its internal E-mail system. They can be notified of this new Help Request by the E-mail system. There, the appropriate Vendor employee may use the information from this Customer Directed Product (CDP) to respond appropriately and rapidly to their Customer's requests. The net result is the Vendor extends their ability to provide services and sales to their Customers right into its products, and provides the means for its Customers to obtain services and to conduct transactions as one of their product's internal features.

8. Benchmarking Probes

Benchmarking probes provide a flexible tool that may add significant value to the CB-PD Module. These may be used either as a component of a Customer Directed Product (CDP) or separate from it. Benchmarking probes can help assess the ongoing value of the product to the Customer, the Customer's opinions of competing products, and that Customer's specific needs for products in this category in the future. This type of Customer relationship may help determine the success of the Vendor in the marketplace, especially with Customers who have already bought its products, and with Customers who are using "demonstration units" to test the Vendor's products.

Most of the time, when benchmarking probes are employed in conjunction with the use of the product, these would be triggered 282 as pre-use or post-use Development Interactions (DI) 284; they would generally not be on-task probes. For example, benchmarking probes 294 given at the start of the use of a product 282 might help determine what the Customers like about this product 294, what they like most about competing products 294, and what might be improved in this product (in the Vendor's prices, support policies, etc.) to keep their company from purchasing competing products 294.

9. Multi-direction Communications

Once a CB-PD Module is built into a product and has one or more means to communicate with both the Customer and a Vendor, it may also form a communications link between the Customer and others. These links may be Customer initiated or they may be initiated by the third parties. With those communications links, many additional functions may be added, such as any of the above functions provided for other third parties in addition to the product's vendor, the CB-PD Module serving as a communications medium for third parties (for contacts such as providing third-party product support services, conducting market research, delivering marketing pitches, consummating sales transactions, etc.), etc.

If a Customer Directed Product (CDP) has built-in communications (such as the facsimile machine 70 in FIG. 3, the CB-PD Module 120 in FIG. 5, the Customer Data Reader/Programmer (CDRP) in 92 FIG. 4, or some other means) then multi-party communications may be provided through a Customer Directed Product (CDP).

In brief, either the Customer will initiate the interaction 282 or it will be initiated by a third-party; the latter will occur more in Customer Directed Products (CDP) whose design includes two-way communications such as the facsimile machine 70 in FIG. 3. When the Customer initiates it a menu is displayed 284 with the communications feature as a choice 284. When the Customer selects that choice the appropriate communications-oriented Customer Design Instrument (CDI) is read 284 (of which a wide variety from independent third parties may be stored in Memory 158, with access to this variety by means of further selection such as by sub-menus). The CB-PD Module then displays the first Customer Probe (CP) for a communications interaction 294, reads the Customer input 296 and writes the input as a record 304. After the Customer completes the interaction 306 a thank you message is displayed 308. By pressing a "transmit" function 312, perhaps one with a "special transmission" code or phone number, this data is immediately sent 336 to the third party's computer. There, the special transmission code enables the message to be routed 336 to the appropriate employee via its internal E-mail system. The employee could also be notified of this communications by the third party's computer. There, that employee may use the information from this Customer's communication to respond appropriately.

Figure 12A:
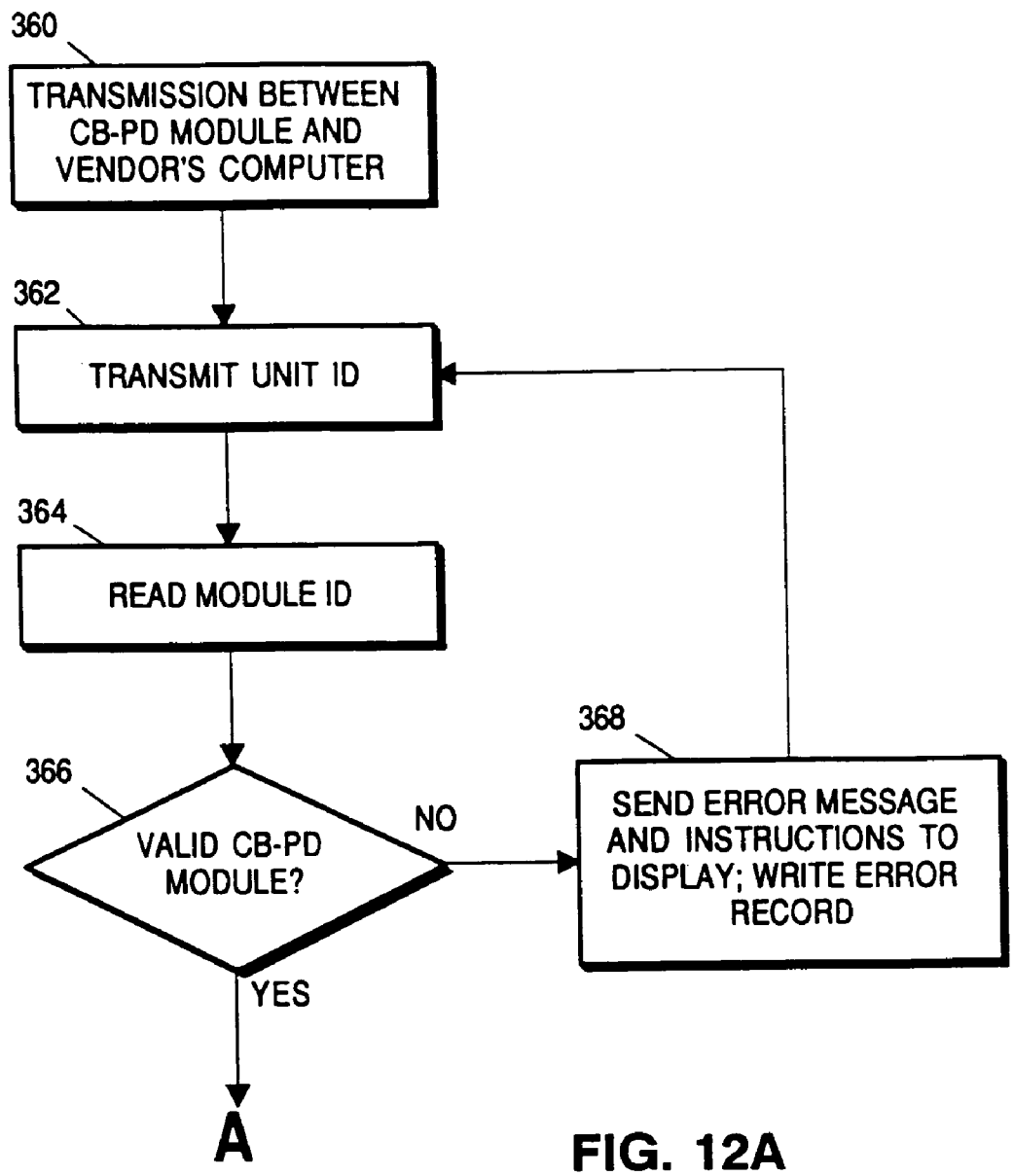
FIG. 12 is a flow chart of the growth of Aggregate Customer Desires (ACD) databases.
Figure 12B:
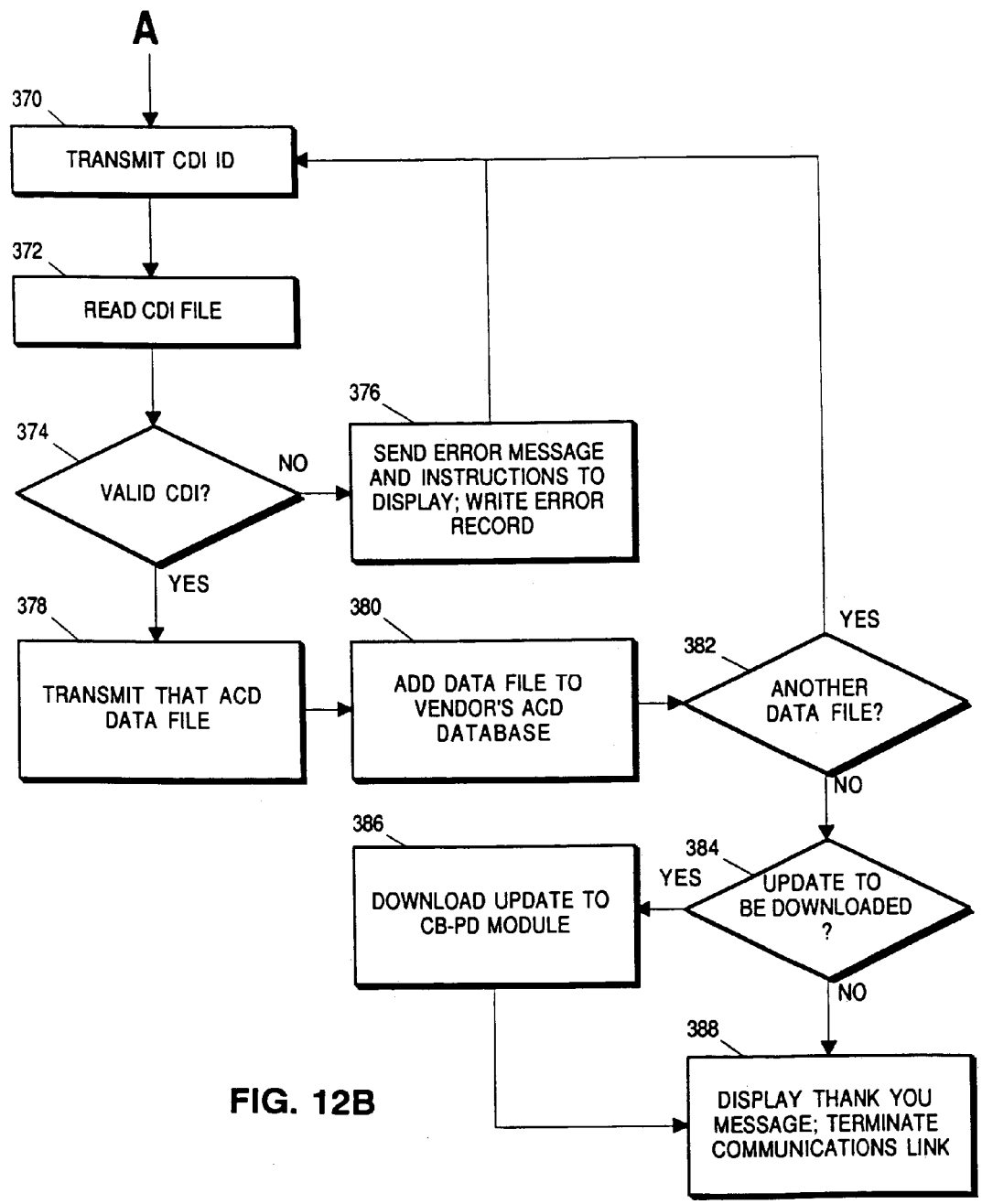

At the time the Customer's computer connects to the third-party computer 360 in FIG. 12, the third-party's computer may download 384, 386 additional Customer Design Interactions (CDI) to the CB-PD Module. With multi-direction communications, these may be employed in the future as Vendor Initiated Interactions (VII) or Customer Initiated Interactions (CII) for any of the purposes that are possible with this invention. The net result is that both the Customer and third-parties extend their ability to provide networked relationships right into the products that Customers buy and use, and provides the means for its Customers to obtain support, services and products as one of the normal features of these Customer Directed Products (CDP).

Control Panel

By providing the means for users to control the CB-PD Module's operation as an open communications device, the Module's potential as a new, "marketplace communications media" is revealed. One of the possible means for user control is a control panel. Examples of how this might be designed include a button bar with user setable parameters for each button, and second a set of graphical tabs with settings under each tab); these alternative designs illustrate that these means may be provided through any combination of physical or graphically illustrated buttons, displays, configuration settings, icons, windows, or other interactive means that enable users to access and direct the operation of such CB-PD Module features as may include: (The specific illustrations, settings and means used to illustrate such features here should not limit the generality of this description of this new "marketplace communications media" and the features it includes.)

Frequency of interactions: User controls to set the frequency of interactions. On one end of the scale, users could choose "no interactions," which turns off the CB-PD Module. For other frequency ratings, employees at the vendor would be asked to rate the importance of each interaction at the time they select or enter it, and for example they could rate questions as most important, important, and least important; then, when users select the frequency with criteria such as only the most important interactions, some interactions and all interactions, the vendor-set flag for each question and the user's flag for the frequency of questions match to determine what will be displayed.

Types of interactions: Similarly, users could set controls covering the areas of the product in which they do or do not want interactions. For example, if there were displayed a sequential list of product features with a check box next to each, a user could mark the box for those features which that user wanted to help improve, and turn off the interactions for the product features with which the user is satisfied.

Sending data: In general, users should always be notified and asked permission before data is sent from a CB-PD Module. Data should not be sent anywhere by a product if users do not want it sent. While exceptions are technically possible, this general business rule helps provide users with privacy and control over their information. The main business exception is if an employee is working at a job, using the employer's equipment, and is asked to engage in these interactions as part of the job to improve how the job might be done; in that case, users may interact with individual questions in any way they choose, but employers have the right to use this internal business process and performance data like any of their other data.

Privacy: Users may also have a slider, buttons, or other means to determine the privacy of the data that they choose to send, such as: total privacy (keeps all data anonymous and permits two-way interactive messaging, such as on-line customer service, without identifying the user), support desk privacy (keeps all data private except messages marked as urgent for direct and personal support desk response), public information for vendor only (all the user's data is identified to the vendor only), anonymous information for sale (user is willing to sell data but it is not identified who the user is), and public information (user is willing to sell data with the particular user identified). If the user is willing to identify himself or herself, then that ID information could be recorded when this control is first set, or (at the user's option) entered each time any data is sent that requires the user to be identified.

"Selling My Data": With open communications to and from third parties, users may receive questions from anyone with whom they choose to work or do business, and sell their interaction-generated information to them. Controls that enable this may be a series of options (such as check boxes, buttons, sliders, etc.) that offer any of a spectrum of choices (such as sell to anyone, sell only for product upgrade, sell only for product upgrade discounts, sell to all my vendors, sell only to selected vendors [with a way to select vendors]). Users might also have a means to set acceptable prices for their data (such as a slider/entry field that sets a floor level at which the user is willing to sell the data and all amounts above that).

Third-party communications: With third party communications, users may receive questions from anyone with whom they choose to work or do business, and send their interaction-generated information to them. This could work in a number of ways, such as a manner that parallels selling data but without controls for setting prices.

Language: Users may select their preferred language, such as English, French, Spanish, Japanese, etc. In general, only those languages currently downloaded and available in that product's particular CB-PD Module should be offered as a user-selectable option.

Help: Since the CB-PD Module has its own on-line help system, users should be able to configure it to how they want it to operate. Some options might include instructions always on-screen, traditional do-nothing help unless asked, electronic performance support, or a user-configurable orientation for the Module's help system such as "how-to help" or "what is it" help.

Customer Initiated Interactions selection and priority: In products that may permit user-configuration, so that users may request as particular key, button, icon or other interface device that they prefer to use to start Customer Initiated Interactions (CII), this would let them (1) select the interface component they would like to use to start a CII (such as which button, icon, key, etc.), and (2) prioritize its action (such as the first press of the key brings up the CB-PD Module's CII, while the second press of the key brings up the product's normal function; or vice-versa). This would enable users to redefine a component of the product interface that they do not frequently or normally use (such as the F2 key on a computer keyboard) for this purpose, as well as set its priority to the method of operation that they prefer.

On-Line customer support (includes Help Desks): In addition to a product vendor's built-in help, it is possible to have the CB-PD Module respond and point user help requests to two or more on-line help systems. This outcome could be configurable in this one area, or it could evolve as a dynamic relationship between the user and the respective help systems. For example, when the user requests help during product user the user could be directed by CB-PD Module interactions to the appropriate parts of two or more on-line help systems. Follow-up interactions would learn which help system the user prefers in that problem area, why, and which help system the user wants for future problems in that area. Over time, the user would receive that combination of help systems which proved most effective. In addition, the publishers of other help systems could employ the CB-PD Module's open communications to offer free on-line samples of their help system(s) for sale, which users would try during actual product use; users might then buy the additional help systems that they like through the CB-PD Module, by conducting direct transactions with those vendors.

Professional support: In areas where exceptional performance is desired, users may want outside professionals to download interactions that determine patterns of product use, upload and analyze the data, then make appropriate recommendations either off-line through consultations or on-line through the CB-PD Module in the product. This enables organizations to obtain the best support available to enhance user performance during actual product use, whether the professional support is internal to the company or an outside consultant.

Additional examples include:

Usability testing 966, 968, 970, 972 in FIG. 27 (An example Development Interaction might be, "You just used Undo or Cancel. How sure are you of what to do at this point?" The user's reply is a 1 to 5 scale with 1 as sure and 5 as unsure, followed by the prompt, "What would help make this clearer?" with a freeform text entry field.)

Product launch marketing 1026, 1028, 1030 in FIG. 29 (An example Development Interaction could be, "Where did you see the advertisement(s) that led you to buy this product?" The user could check all the media that apply.)

On-line customer support 1056, 1058, 1060, 1062 in FIG. 30 (Instead of a Development Interaction, what could be displayed is a problem solution, training, help, or electronic performance support such as, "To use the work routing feature: (1) Display the Employee Map that shows your work group. (2) To route your document to the proper users, drag and drop it on them in the order they should receive it." That would be followed by the prompt, "How could you make this clearer?" with a freeform text entry field.)

Conducting transactions 1086, 1088, 1090 in FIG. 31 (Instead of a Development Interaction, what could be displayed is an offer specific to the user's immediate need such as, "We will start fixing this problem within six hours if you buy an on-site service contract at this time. Would you like right now: (1) the price and terms of a service contract, (2) a way to buy this through your computer, and (3) an immediate service call?" The reply is Yes or No, and if Yes is selected the appropriate forms are displayed for the user to fill in, including fields for any company authorizations and/or purchase order numbers, if needed.)

Etc.

Summary: A Customer Design System FIG. 1 may be a new way of viewing the relationships and market mechanisms that connect Vendors who sell products and Customers who buy and use them. This invention is potentially a complete system that includes explicit apparatuses and methods to bring Vendors, Distributors and Customers into a new type of design and performance partnership.

This Customer Design System (CDS) invention may be viewed as a new interactive communications media for marketplaces, through which Customers can develop and describe their conception of how each Customer Directed Product (CDP) should better satisfy their needs. Customers make their contributions when their conclusions from using (or testing) a product are transmitted back to Vendors, and incorporated into the products to improve them and make them more applicable or useful for Customer purposes. With this invention incorporated into certain products, if Customers find those products to be wanting in certain important respects, they can do something about it. They can individually help improve it. Thus, product design and improvement becomes less of a private activity carried out primarily by Vendors. Product design and development is thrust into the Customer's domain. The Customers gain new abilities that may prove enormously valuable to them, which is the ability to shape the design and quality of the products that they use.

Transmission and Security Procedures

CB-PD modules should generally communicate via generic e-mail (such as X.400) to provide the widest possible third-party communications. The connections are straightforward on a corporate network. Outside the company VANs (value added networks) provide store-and-forward messaging, and specialized transmissions like wireless communications. The telephone provides the biggest network. Plug one end of a standard phone cord into the wall and the other in the UP Module in a product (it's even easier in a computer with a modem or a network connection). Automated communications are set by the user as urgent (immediate) or periodic (the default; a minute or two for each user and product every few weeks or months—you decide how often).

These communications are two-way. When user data is uploaded, new interactions are downloaded to the UP Module in the product. This makes learning continuous, since an error message that triggered a question one time could be reset to trigger a customer support dialog the next. In other words, UP Modules may learn about problems and then provide an automated system to solve them inside the product, lowering the cost of training and telephone support.

Figure 11A:
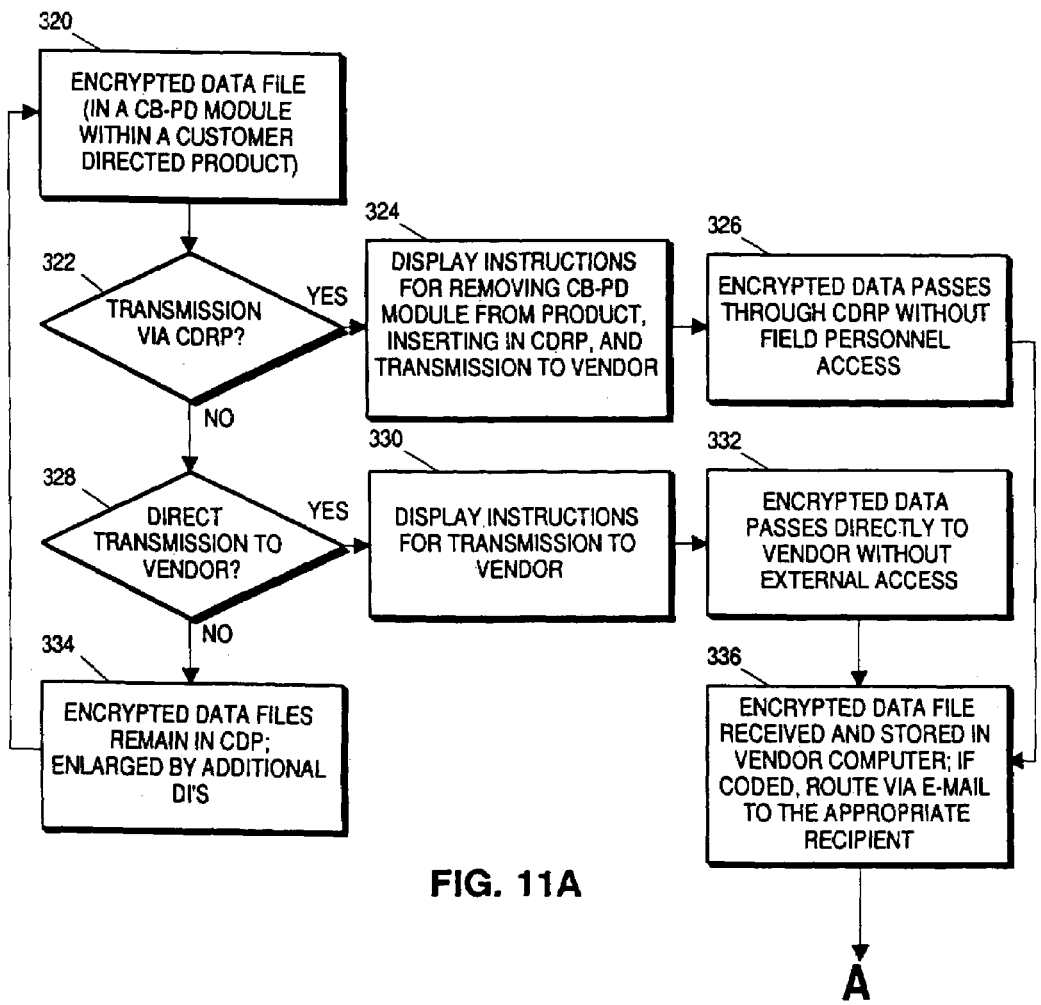
FIG. 11 is a flow chart of transmission with optional security procedures.
Figure 11B:
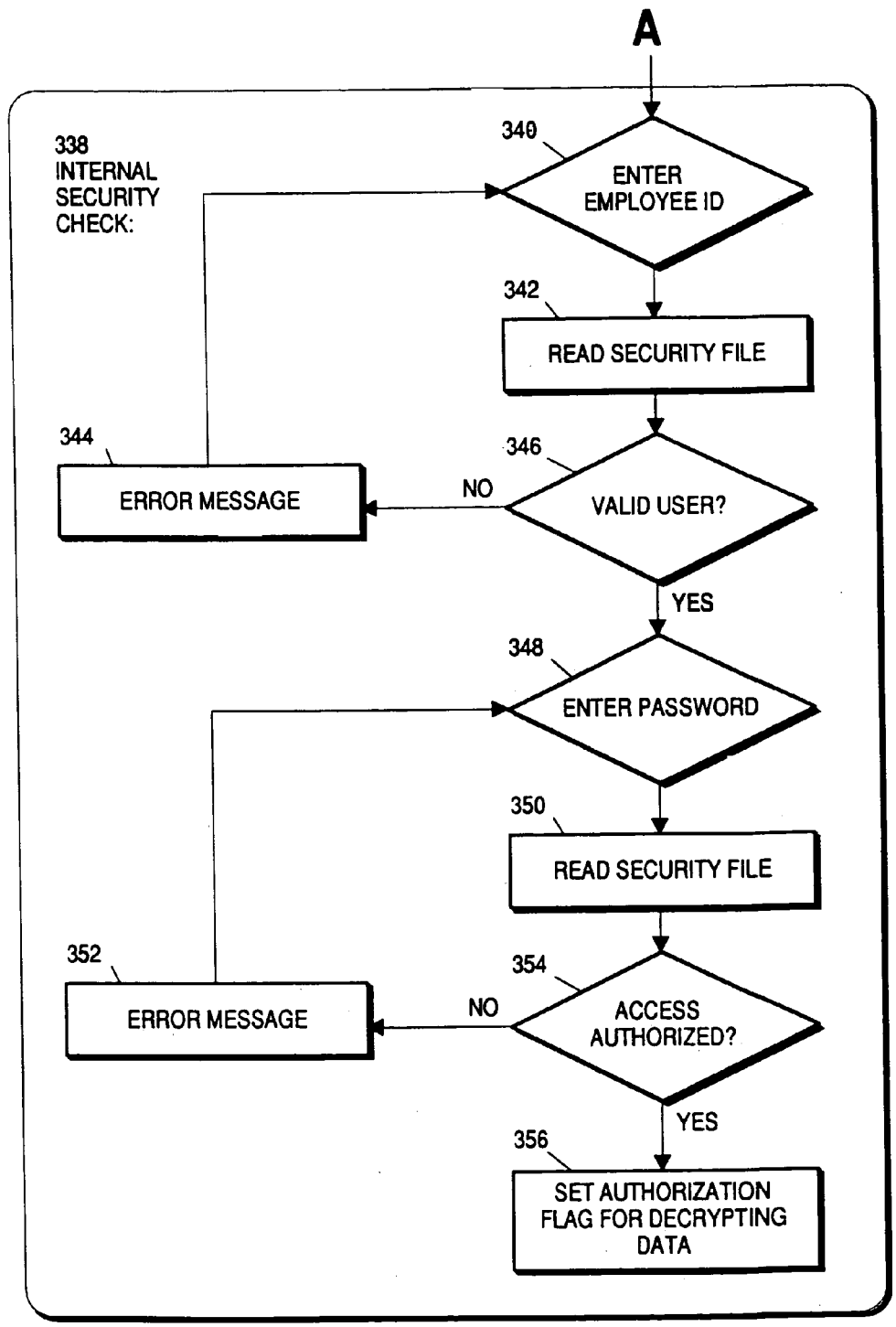

Turning to FIG. 11, transmission takes place by means already described. Once there are one or more Aggregate Customer Desires (ACD) data files in memory 320, when an appropriate time occurs to transmit this data to the Vendor 293, 312 the Customer takes the appropriate step for the particular configuration of the CB-PD Module in a Customer Directed Product (CDP). Some examples of the configurations possible include the facsimile machine 70 in FIG. 3, the CB-PD Module 120 in FIG. 5 and the Customer Data Reader/Programmer (CDRP) 92 in FIG. 4.

If the Customer will transmit directly to the Vendor 328, the transmission may be as simple as pressing a "send" function key. The CB-PD Module may contain all necessary phone numbers and procedures for a fully automated process 332 of sending the data to the Vendor's computer. Or, if the Customer needs to take certain steps, those are displayed 330 so the Customer may follow them (such as removing the CB-PD Module from the product and plugging it into a phone line 126 in FIG. 5).

If the Customer will connect the CB-PD Module to a Customer Data Reader/Programmer (CDRP) 328 and 104 in FIG. 4, those instructions are displayed 324 and the data is transmitted to the Vendor's computer 326.

For two-way messaging, protocols may include some means of error correction and validation (such as a checksum, acknowledgment, etc. to confirm messages sent in either direction), to enable retransmission of inaccurately received messages and to confirm receipt of accurate ones. Similarly, to support packet networks and third-party store-and-forward networks, protocols may include appropriate interfaces to such packet and third-party VANs (value-added networks). In some cases, protocols may be "hard wired" to use a particular communications network exclusively, while in other cases this information may be downloaded periodically to the CB-PDR Module in the product.

If the Customer does not want to transmit the Aggregate Customer Desires (ACD) data to the Vendor when requested 334, then these data files are simply retained 320 in the CB-PD Module's memory 158 in FIG. 6 until they are transmitted.

Optionally, the stored Aggregate Customer Desires (ACD) data may be encrypted. This protects it from theft, tampering, or other types of interference or damage. For example, if a standardized CB-PD Module were added to a variety of electronic products, it could become routine for a third-party service and repair business to remove them from those products 322, 324, insert them into a Customer Data Reader/Programmer (CDRP) and press a function key to transmit the data to the appropriate Vendor 326 (and the Vendor's computer would update the CB-PD Module while it was on-line). For another example, if multi-direction communications are possible with a CB-PD Module, then multiple third-parties may be able to establish communications links with the CB-PD Module. In those and in other types of situations, it may be desirable to encrypt the Aggregate Customer Desires (ACD) data, to prevent the CB-PD Modules from being read and their data sold to competitors.

With an encrypted data file 320, it would pass through the Customer Data Reader/Programmer (CDRP) in its encrypted format 326, or be transmitted directly to the Vendor's computer in its encrypted format 332. In neither case would there be any external access to a decrypted data file, or to the security keys or security procedures that would decrypt a data file. The ability to decrypt the Aggregate Customer Data (ACD) 338 would be retained entirely inside the Vendor's computer, and internal security procedures (such as those in 340-356 inclusive) could be used to protect access there, as well.

Overall functionality: The flow charts in FIGS. 10 and 11 do not describe all steps and all options since those skilled in the relevant art can readily understand the method used for developing an apparatus and methods to place into products the ability for Vendors to interact directly with Customers, perform quantitative and qualitative inquiries, providing interactive services and transactions, and to conduct the other activities that may be possible for a Customer Directed Product. An indication of the functionality of the overall Customer-Vendor partnership that may be developed by means of this invention can be obtained from the following sample of the following types of activities, providing Customers with new means to direct the design and evolution of their products:

(a) Inquiry Functions: How is usage going, what is the usage pattern, how does the customer evaluate the product and the Vendor's related services or support, etc.

(b) Reporting Function: What happened, what went wrong (or right), why that occurred, etc.

(c) Suggestion Function: What Customers would prefer, how they would design it, what would avoid the problem(s), what would meet their needs better, etc.

(d) On-line Customer Support (OCS) Function: What type(s) of On-line Customer Support (OCS) they want, how the Vendor might provide it to them, what their needs are for On-line Customer Support (OCS) at that moment so they can be met rapidly by the Vendor, etc.

(e) Interactive Services Function: What types of information and services could be built into the CB-PD Module, what problems it could direct them to avoid, what problems could be corrected, what specific advantages they might gain from that information, what specific accomplishments they might make with that information, "what if" opportunities for simulations in using the product in certain ways ("try before using"), training exercises that might be included in the CB-PD Module, services that can be delivered by the Vendor, schedule activities with Vendor employees, etc.

(f) Transaction Function: Requests to purchase more of that product, request to purchase other products from that Vendor, schedule the location of delivery, schedule the date and time of delivery, request the purchase of one or more services from the Vendor (such as purchasing maintenance contracts, support services and ancillary services), etc.

(g) Broader Communications Functions: Once a CB-PD Module is built into a product and has the capacity to communicate with both the Customer and with a Vendor, it may also form a communications link between the Customer and others. With those communications links, many additional functions may be added, such as any of the above functions provided for other third parties in addition to the product's vendor, etc.

Customer-Based Product Design Reports (CB-PDR)

Customer-Based Product Design Reporting (CB-PDR) is an automated, structured system that analyzes and presents the Defined Customer Desires (DCD).

At the vendor, user data is stored in one or more databases. Automated reports provide information on demand (see FIG. 4). This reporting system is both canned (pre-written), customized and extensible for support by outside professionals. The basic system is like an EIS (executive information system) which provides high-level summaries (sorted, for example, from the most serious to the least serious problems). User may select items to "drill down" and see details of actual user experiences FIG. 25 906, 908, 910 or any of these detail levels of data may be displayed on-screen automatically. Reports can also be varied in many ways, such as displaying data over time to show which problems have been solved and which have not; such as sorting user suggestions by those who have particular problems (e.g., by the most valuable customers) by the severity of the problem(s) in each category; etc. Because some user messages are urgent, this database should pass messages to the vendor's e-mail system or to some system of alerts for appropriate responses. Because the message types are tagged during user interactions, they could automatically identify (whether for automated routing or notification) the appropriate group for response (such as problems for customer support, leads for sales, transactions for order entry, etc.). The messages could also be combined with other information prior to distribution or notification (such as sorting sales leads by zip code for distribution to the correct sales people, adding full customer contact and contract information to requests for support or service, etc.).

Figure 13:
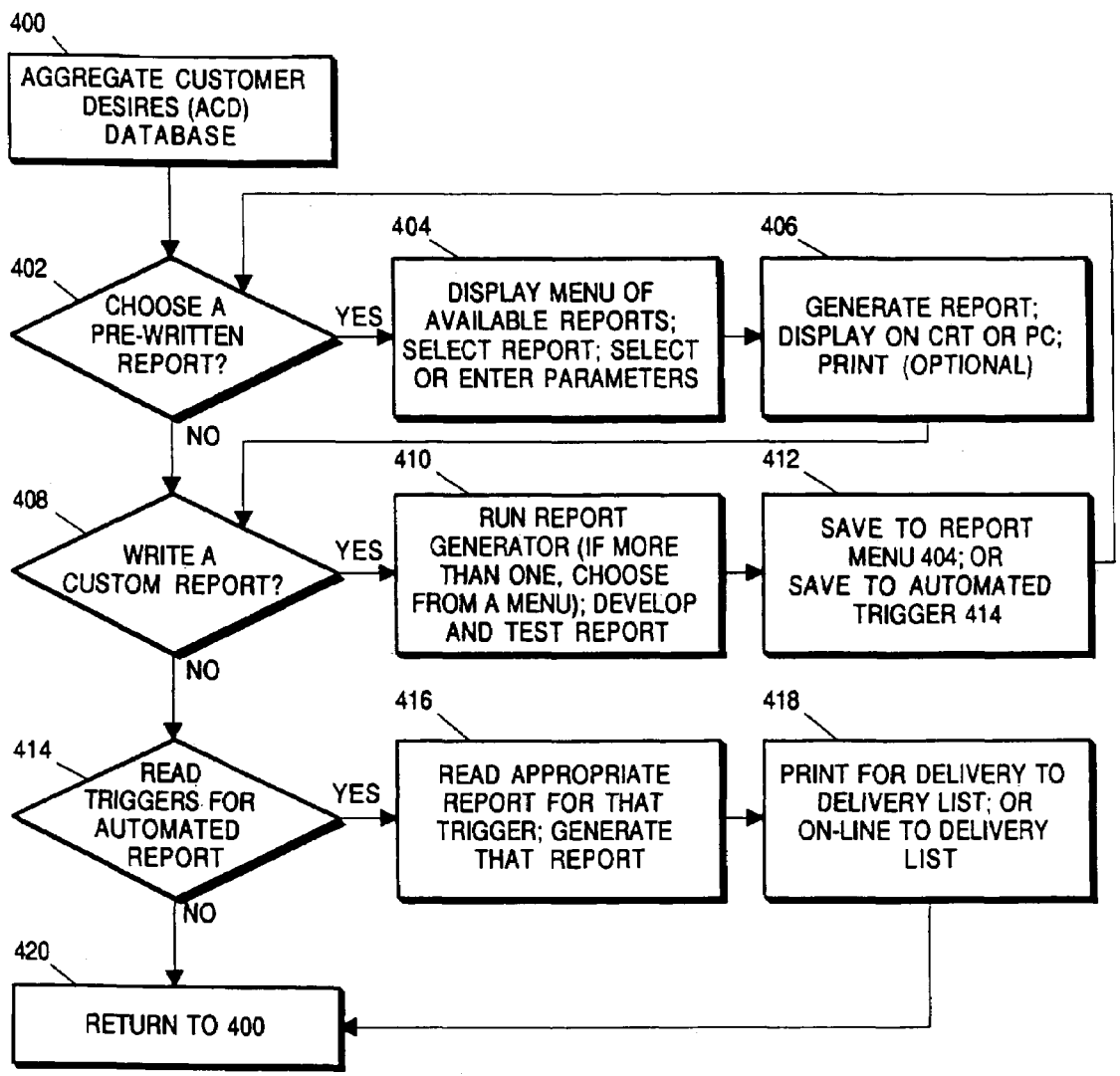
FIG. 13 is a flow chart of a Customer-Based Product Design Report (CB-PDR) system.

The CB-PDR is illustrated in FIGS. 12 and 13 inclusive. The system includes one or more computers at the Vendor 660 in FIG. 17 having an input via telephone 116 in FIG. 4 or other means for receiving Aggregate Customer Desires (ACD) data 378. A procedure is used to determine that this communications is valid and satisfies the operative criteria regarding CB-PD Module identification, product identification, Customer Design Instrument (CDI) identification, etc.

In one such means for determining that this is a valid communication, the transmission of incoming ACD data 360, 378 are first validated by examining the CB-PD Module's ID 362, 364, 366, 368 to assure that this is an authentic CB-PD Module. If not, a message is sent to the transmitting means 368 (such as a Customer Data Reader/Programmer or a CB-PD Module) and an error record is written 368 in a file in the Vendor's computer. The specific Customer Data Instrument (CDI) is then validated by examining its ID 370, 372, 374, 376 to assure that this is an authentic CDI. If not, a message is sent to the transmitting means 368 and an error record is written 368 in a file in the Vendor's computer. Similar processes and checkpoints may be instituted for validating any component of the data file, data elements, etc.

Data validation and transmission may occur in any order. In one such method, after validation 362–376 inclusive, the Aggregate Customer Data File (ACD) is transmitted 378 and appended or merged into the Vendor's Aggregate Customer Data (ACD) database 380. If there is another data file in the CB-PD Module 382, its Customer Design Instrument (CDI) ID is validated as described above 370–376 inclusive. If the CDI is valid the data file is transmitted 378. If there are not any more data files to transmit, the CB-PD Module is updated 384, 386. The updating 386 may include downloading actions described above 238, 240, 242, 243 in FIG. 8 and deleting from the CB-PD Module's memory the data files transmitted to the Vendor's computer 386. It may also include other functions such as reading the CB-PD Module's clock/calendar and re-setting it if it is not correct, reading the Module's transmission procedures and updating them if they have changed (such as switching to a new communications vendor, etc. After the CB-PD Module is updated, a thank you message is displayed for the Customer 388 and the communications link is terminated 388.

When entered in the Vendor's computer(s) 116 in FIG. 4, the Aggregate Customer Desires (ACD) data is stored as part of one or more ACD databases in a format that allows the particular data from each particular Customer Design Instrument (CDI) to be addressed and extracted to produce its own Customer-Based Product Design Report (CB-PDR); and by a format that allows the data from user-selected groups of Customer Design Instruments (CDI) to be collected and merged to produce integrated Customer-Based Product Design Reports (CB-PDR) that report the data from the same Customer Probes (CP) used in different Customer Design Instruments (CDI). This permits the analysis and reporting of Customer data by product, by common product features across a product line, etc.

A variety of methods of maintaining a database(s) and reporting from it (them) are well known. In maintaining a database three of the options include (1) a particular vendor constructs and expands its database(s) as it expands its use of the invention, (2) a particular vendor designs its database(s) in detail up front so that, over time, the data collected forms an integrated set that may be combined through various means and/or compared through various types of reports, (3) one or more groups of vendors, support professionals, etc. operates with systematic and interoperable data definitions and compatible data file structures so they are able to exchange and use data throughout a larger digital environment, where the digital environment is explicitly designed to support the efficient operation of markets, product development, organizational performance, and (4) etc.

While the incorporation of many database features in the invention are well known and understood by practitioners, the third option will be elaborated upon here. This is the development of a unique "digital knowledge environment" to provide broad access to CB-PD Module data and supportive professional know-how for improving products, markets, organizational performance, etc.

In this case FIG. 19 an integrated set of data structures provide a compatible architecture for integrated activities such as (1) authoring or selecting interactions 720, 722; (2) running interactions in real-time during product use 724, 726; (3) user-set preferences for controlling CB-PD Module interactions and communications 724; (4) open transmission of data from interactions, and new interactions, between vendors and products and between products (and their users) and appropriate third-parties 728, 730; (5) storing the data in accessible databases 732, 734; (6) enabling the transmission of interactions and data throughout vendor organizations and between vendors and third-parties 732, 734; (7) etc.

To illustrate this option two examples will be cited. First are some types and examples of fields possible for headers for sets of interactions:

Fields that identify the company and product, such as: (1) Industry (4-digit SIC-based), (2) Sub-group in an industry (various classification schemes are available, such as a 2-digit appendage to make the standard SIC code fine-grained), (3) Company (name or code), (4) Business unit or division of the company (name or code) (5) Country, region or continent (name or code), (6) Product (name or code), (7) Product release number or version (name or code), (8) ID number for a particular unit of the product (such as the product's serial number), (9) Etc.

Fields that identify a particular set of interactions, such as (1) if all current interactions are grouped into one set, a set identifier (name or code), (2) if multiple sets of interactions are downloaded into one product by different groups within a vendor organization (such as by functional areas like product design, marketing, customer support, training, etc.) then a separate identifier for each set of interactions (name or code), (3) Etc.

Fields that identify the key dates for that set of interactions, such as: (1) The date a set of interactions is stored by the authoring system for downloading to the CB-PD Module, (2) The date a particular set of interactions actually begins downloading to products in the marketplace, (3) The date that the corresponding data set is uploaded from a particular product's CB-PD Module, (4) The date that the last data from that set of interactions is uploaded from a CB-PD Module, (5) Etc.

Fields that set the frequency at which a product's CB-PD Module uploads data and downloads new interactions, such as: (1) Which of the available frequency-of-contact methods is employed, including (2) Contact by calendar date (after a specific date), (3) Contact by number of days (e.g., starting in 60 days), (4) Contact by number of times the product is used (e.g., after 75 uses), (5) Contact by number of times a particular feature is used (e.g., after using the product in a particular way 40 times), (6) Etc.

Fields that set encryption flags and determine the level of security, such as: (1) Encrypt stored interactions and decrypt before displaying to user (on/off), (2) Encrypt user data prior to storage (on/off), (3) Encrypt communications messages prior to transmission (on/off), (4) Encrypt triggers and code employed to run Module when product is off and decrypt when product is turned on (Qn/off), (5) Etc.

Second are some of the fields possible for single Development Interaction:

Fields that identify the type of interaction, such as: (1) 1–5 scale question (user selects one answer from a 1–5 scale), (2) Exclusive answer question (user selects one answer from a list of possible answers, (3) Checklist question (user selects multiple answers from a list of possible answers), (4) Yes/No question (user answers yes or no), (5) Audio playback (an audio message is played for the user, with or without audio recording of the user's reply), (6) Pictorial display (a still or moving video visual communication with the user, with or without simultaneous audio playback, and with or without recording of the user's reply by means of audio, still-frame video, moving video or a combination of these means), (7) Comments or suggestions question (user may enter freeform replies in any single media or combination of media such as text, audio, still-frame video, moving video, by attaching a separate document or product component indicator to the reply, etc.), (8) Etc. Such interactions may be combined in one larger interaction, for example by opening with an Exclusive Answer question (to determine the user's explicit preference) followed by a checklist question (to determine the user's most important reasons for selecting that previous answer) with the checklist question incorporating a Comments and Suggestions question (so the user may enter additional important reasons for the reply which were not provided on that list), and the interaction concluded by a larger Comments and Suggestions question (so the user may offer additional explanations and suggestions to solve the overall problem).

Fields that provide pointers to related interactions, actions, constructs and data in other components of the invention (by means such as naming conventions, names, codes, unique algorithms, etc.): For an example of some possible relationships (1) a 1–5 Scale question may be stored in the IDR database in its particular format, (2) displayed appropriately to a user while constructing a set of interactions for a particular CB-PD Module, (3) stored with an appropriate data file format and other interactions in a complete set ready for downloading upon connection to the appropriate product, (4) transmitted and downloaded into the CB-PD Module, (5) attached to the appropriate trigger in the CB-PD Module, awaiting the appropriate event during use of the product, (6) loaded and displayed at the correct time to the product's user, (7) have the user's data validated and stored accurately by the CB-PD Module, (8) the user's data transmitted and uploaded to the vendor's CB-PDR database, (9) validated before merging the data into the database, (10) analyzed based on the type of question asked, (11) the analysis displayed in the format preferred by the viewing user, (12) sets of questions or sets of data transferred and sent to third-parties for assistance of various kinds, (13) etc. These parallel structures and pointers to their parallels in other components of the invention may be embedded within any of the components of the invention so that users (whether at the vendor, a product's user or an outside third party) may view and act upon any interaction or data without having to deal with the underlying data storage structure, technical architecture, pointers to other components of this invention, etc. In other words, the invention may be constructed so that users are shielded from its internal operation and may deal with an easy to use interface.

The following illustrates fields that may be employed to record a particular type of interaction (an Exclusive Answer question) and a user's replies in the CB-PD Module component of the invention: (1) Feature in the product (name of the feature or portion of the product to which the interaction applies), (2) Trigger event (the specific trigger event or condition that prompts the interaction), (3) Question type (this is specific to the field of the question, such as "usability—navigation question", "market research—demographic question," etc.), (4) Interaction text (the text of the interaction, such as the text of a question that is asked), (5) Answer Text 1 (the text of the first answer to the question), (6) Answer Data 1 (the user's reply to the first possible answer in this question; in an exclusive answer question the reply to each possible answer is yes or no—only one answer is Yes while all others are No—this may be indicated by recording yes or no in the data file, or by a code such as 0=No, 1=Yes) (7) Answer Text 2 (the text of the second answer to the question), (8) Answer Data 2 (the user's reply to the second possible answer in this question), (9) Answer Text N (the text of each possible answer may be entered as a field), (10) Answer Data N (the user's reply to each possible answer is entered in a field).

For reporting, three options are illustrated in FIG. 13, with the first two being Employee Initiated Reports (EIR) and the last being System Initiated Reports (SIR). The first is to choose a pre-written report 402. If an employee chooses to run a pre-written report 402 a menu of available reports is displayed 404. When the employee selects a report 404 there is an opportunity to accept its defaults or to change its parameters 404. One range of selection parameters may focus on the type of data to be included in the report, such as the specific Customer Directed Product(CDP), Customer Design Instrument (CDI), product feature(s), groups of any of these, etc. Another range of selection parameters may limit-or focus the data selected in the first range, such as the time period covered in the report, the countries or region of the world covered, the source languages in which the data was reported, etc. After the appropriate parameters are entered 404 the report is run 406 and the finished report is displayed on the employee's screen or printed 406 as the employee chooses. If desired, the destination(s) of those reports may be external to the company, and include third-party professionals, business partners, advertising agencies, attorneys, product distributors, manufacturer's representatives (i.e., external sales forces), retailers, trade associations, etc. With a compatible database(s) and analysis software, any of those may be able to receive one or more data files to run their own analyses, which may include merging the received data with data from other sources to generate comparison reports, trend reports, forecasts, simulations, recommendations, etc.

If an employee chooses to create a custom or a new report 408 the database's report generator is run 410. If there are a number of report generators on the system, however, the employee may be presented with a menu of available choices 410. Once a report generator has been selected, the employee develops and tests the report 410. After the report is developed and tested 410 the report is saved 412 to the menu of available reports 404 or to the automated triggers 414 that run pre-written reports automatically.

In addition, automated triggers may be set up to run and deliver System Initiated Reports (SIR) automatically 414. In this case, when a trigger (such as a date, time, number of records in the Aggregate Customer Desires (ACD) database, etc.) 414 is reached, the report appropriate for that trigger is read 416 (such as for a particular Customer Directed Product (CDP) or other report parameters as described above) and the report is run 416. After the report is run 418 it is automatically sent on-line to a pre-set delivery list 418 (such as via E-mail or other delivery means), or it is printed automatically for physical delivery to a delivery list 418. These delivery lists may be internal to a single location such as a corporate headquarters, it may be multi-location such as to appropriate managers throughout a multi-national corporation, it may include third-parties such as OEM or components suppliers who participate in designing future product improvements, etc.

Interactive, Event-Driven Alerts and Reports

To lower costs systematically, it is helpful to automate as much of the calculation and reporting of the Customer-Based Product Design Reports (CB-PDR) as possible. If a standard data file format is used, various types of pre-written or automated reports may be run (using either pre-packaged report generators or custom reporting software). Automating this reporting system lowers the cost, accelerates the turn-around and may provide on-demand reporting of Defined Customer Desires (DCD) in real-time from this Customer Design System (CDS).

To provide organizations and markets with expanded capabilities to respond to changing external and internal conditions, many types of performance objectives, individual requests, group requirements, etc., the invention provides for more than cost savings, however.

The present invention also includes interactive, event-driven problem or report notification. These are (1) based on CB-PD Module interactions, (2) include the varied reporting approaches known as well as those described above, plus (3) users are notified of particular problems or prompted to run particular reports by dynamic alerts that are sent at pre-specified triggers to those responsible for solving particular types of problems, so those people are automatically informed when particular problems, opportunities or conditions occur.

In such an interactive, event-driven system the triggers may be any condition measurable by the analysis system. These range from small problems (such as the frequency of errors while using a particular product feature), to important single issues (such as the occurrence of life-threatening alarm conditions during the use of a medical device), to customer-wide opportunities (such as the frequency of solvable user problems at a corporate customer who has made a major or volume purchase but not bought a maintenance contract), to market-wide product crises (such as why a new product launch is generating trial purchases but not repeat orders), etc.

In this case a trigger may be pre-set by recording and having the analysis system act upon parameters such as:

The frequency for analyzing the data for the presence of trigger conditions (such as hourly, daily, weekly, a list of particular dates, the time of day on any of these dates, etc.), The particular data items to analyze (such as the spectrum questions and data exemplified by the above illustrations), The data levels which comprise a threshold to issue an alert (such as, in the medical device, two or more life-threatening conditions for each 1,000 units that send in reports), The person who is to be notified of the report (a list of one or more individuals), The content of the alert notification (the specific text, message, prompt to run a particular report, etc. used to notify those receiving the alert), Etc.

As in many electronic mail systems, the issuance of messages may be logged in a manner that allows the system to record such information as the person(s) to whom the alert was sent, the date and time each alert was sent, the person(s) who actually responded to the alert, the date and time each person actually viewed that report, etc. By means of these recorded logs, it becomes possible to use manual or automated methods to track and evaluate such areas as the effectiveness of this system for identifying and responding to crucial events, the capabilities and responsiveness of the individuals responsible for solving or handling those kinds of problems, the capacity of the organization to identify the events critical for its success and to notify the correct employees to respond rapidly and appropriately, etc. By recursively applying this invention to its own dynamic systems, this tracking system may by continuously evaluated and improved by means of all of the CB-PD Modules systems and features, including automated interactive, event-driven reports on its own functioning or operation.

Similarly, it will help lower costs and raise the comprehension by recipients if the format for presenting the Defined Customer Desires (DCD) is automated and standardized. While many formats are possible, two reporting formats have been designed for rapid reading and comprehension. Turning to the illustration in FIG. 14, the first format includes the number and name of the probe 430 and the precise wording of that probe 432. A quantitative section provides the Customer responses in the most comprehensible numeric formats, including the choices the Customers could select for their answer 434 (including "no answer" as a reply), the percentage of the Customers who replied with each choice 436 and the exact number of Customers who replied with each choice 438. A graphic section provides a graph of the Customer replies 440 that includes a percentage or numerical scale appropriate for the replies 442, a clear and simple graphic display of the Customer replies 444 and clear labels 446 that match the choices reported in the numeric section 434. A text section provides the Customer's text replies 448, including the precise wording of the probe which produced those replies 450. The Customer replies 452 should be sorted and segregated to fit the choices in the numeric section 434 and the graph labels in the graph section 446 so that the reader can understand the problems and concerns of each group of Customer responses 452. This ranking should include the text comments from Customers who did not respond to any other portion(s) of the probe 454.

With such a format for a Customer-Based Product Design Report (CB-PDR), the quantitative findings 436, 438, 440 are automatically totaled and presented in a format whose meaning is easily understood. The qualitative findings 448 are sorted and presented to match each graph and numerical table so detailed Customer-based insights are presented to explain every conclusion. These Customer-based reports can alter the views of product designers, product managers, marketing executives, senior managers and others. In a few minutes on a regular basis (such as each month; faster or slower cycle times are possible, depending on the need for this information) they can gain a vital new perspective: the view through the eyes of their Customers, while they were using their products.

Such user tested, standardized and comprehensible formats provide each reader with the means to understand these reports quickly in their own cognitive styles. Pictorial readers (such as many designers) can scan graphs 440, quantitative readers (such as many financial managers) may use percentages 436 and/or raw numbers 438, while analytical readers (such as some general managers) may skim Customer comments 448 in the problem areas. The specific Customer comments 452 help improve the products, and may offer suggestions for what Customers need, such as "Too many numbers to manipulate." Each reader also has the other forms of data 436, 438, 440, 452 immediately available to help answer questions. Thus, a Customer-Based Product Design Report (CB-PDR) in this format may be read very quickly but still yield a great deal of understanding, regardless of the reader's cognitive preferences.

Figure 25:
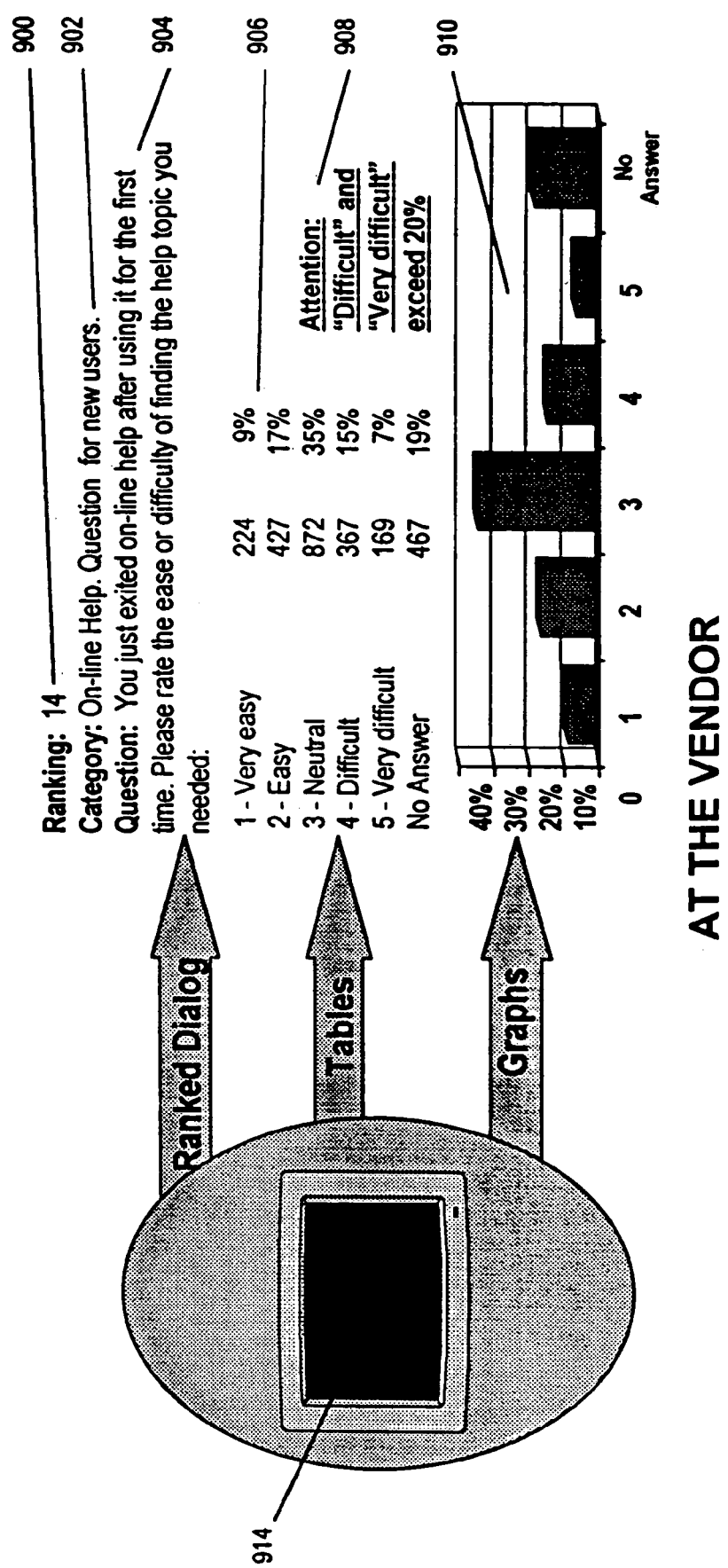

These formatted reports may also be accessed and displayed on computer screens in many parts of one or more organizations. FIG. 25 illustrates one means of access such as by a ranking 900. On the screen, the same or similar components may be displayed in this or in other tested and standardized report formats 902, 904, 906, 908, 910 in FIG. 25; 976, 978, 982, 984 in FIG. 27; 1034, 1036, 1038 in FIG. 29; 1064, 1066 in FIG. 30. Where additional detail is desired during on-screen viewing, various display and access means may be employed such as "drilling down" to successive levels of detail and information 980 in FIG. 27.

In automating such a format, some additional points may help:

When running a series of Customer Design Instruments (CDI) over time, the earlier sets of Defined Customer Desires (DCD) may produce certain types of baselines against which to evaluate later findings. This may help determine whether the Customers' desired improvements have been achieved, or whether previously noted problems remain. It is generally possible to automate the identification of positive or negative changes in Customer attitudes, particularly when it is done by comparing quantitative responses to the same probe longitudinally (i.e., over time). This may be done by means of exception reports, custom reports that focus on specific customer-reported problems, etc.

There are exceptions to this format, such as when a probe has only two choices 434 (such as a yes/no or a true/false question) so that the graph 440 may be eliminated.

When percentages 436 are calculated, they could be based on the total number of Customers that responded to the Customer Design Instrument (CDI), including those that did not answer that particular probe. For example, in FIG. 14 a total of 3,513 Customers responded, but that number included 191 that did not answer probe #12 430. If all percentages reported 436 are based on that total number (3,513 in FIG. 14) and the number and percentage of participants who did not answer each question is also reported, the reader gains a clear and unambiguous idea of the number and percentage of respondents who answered each question in each way.

When a checklist probe is reported, the percentage 436 and number 438 of replies should be placed next to each item in the checklist, and the checklist should be sorted and printed in descending order.

For reporting passive probes 291, 292 in FIG. 10, an automated analysis of the CB-PD Module's diary log may utilize forms like:

Method 1—A table: Employ a matrix table in which each row is a product feature and each column is a particular type of use of that feature; then each row and column intersection becomes a counter. Each time a Customer uses a particular product feature in a particular way, increment that counter by one. For display or reporting, sort this table with the most used product feature in the top row (this sort may be by the number of times each product feature was used or by the percentage of Customers who used that product feature, whichever is most meaningful for each particular product). In addition to the counter in each row and column intersection, additional information may be reported in that space (for example, the number or percentage of Customers who accessed that product feature and used it in that particular way, the total number of minutes it was used or [by dividing it by the number of times it was used] the average number of minutes it was used in each time it was used). If the software and printer can automate each box's shading, the individual intersection boxes may be shaded from dark to light, depending on the frequency of use, total number of uses, etc. To integrate such a diary log display with Defined Customer Data (DCD) from Development Interactions (DI), the shading of the individual boxes could be based on Customer satisfaction/dissatisfaction data, or some other measure that will help graphically display the Customer's views of each feature of that product.

Method 2—A graph: A variety of options are possible. One approach is a bar graph with the bars extending to the right. The data should be sorted so the most used feature is the top bar (sorted by some clear measure such as the number of times that product feature was used, or by the percentage of Customers who used that feature, whichever is most meaningful for that product) and the product's features are displayed in descending order. The left axis could list the name of each product feature (or each major area or type of service, if this graph illustrates a service). The top horizontal axis could be the number or percentage of Customers, while the bottom horizontal axis could be the number or percentage of times the product feature was used, the number of minutes it was used or the average number of minutes per use, etc. The graph's bars extend to the right, with two bars per product feature (the top bar contains the data for the top horizontal axis, such as the percentage of Customers who use this product feature, while the bottom bar contains the data for the bottom horizontal axis, such as the average number of minutes per use).

Method 3—A dynamic representation of the product interface: This method is applicable to a variety of metrics (numerical counts of frequency of use, time-on-task or time-on-sub-task, counts of number of tasks completed, productivity measures, longitudinal studies of various metrics over time, etc.). To generate this report, take the set of the metrics to be reported and divide it into equal sub-sets such as quintiles (each 20% is one quintile). Assign each quintile a distinct color. Then re-display the interface, but before displaying it re-assign the color of each component of the interface based upon its quintile. This yields a dynamic, color display of the interface that shows each component of the interface based on its quintile. If the product is physical and not software (such as a medical device or a piece of construction equipment), a graphical representation of the product can be created in software to produce this report on a color monitor. Through these means, the interface itself becomes the reporting medium and a variety of information can be obtained simply by observing the users' real patterns of using it, and the results they obtain by those patterns.

When any of such methods are used to display data from passive probes (i.e., a table or a graph), if any related data is reported with it, the related data should be sorted and reported in the same order as the data in the table or the graph.

Such a Customer-Based Product Design Report (CB-PDR) system may automate the reporting of Defined Customer Desires (DCD) that reflect the valuable, real-world views of a Vendor's Customers. This reporting system is one of the components of this invention which assist in consolidating, presenting and clarifying the Customers' needs and requests for improvements in products and services for managers, product designers and other relevant employees, distributors, consultants, suppliers, etc. Some of the resulting advantages include helping the recipients of these Customer-Based Product Design Reports (CB-PDR) improve management results such as:

Using rapid Customer feedback to continuously accelerate (1) the identification of the potentially most valuable product improvements and (2) fixing the most pressing problems, to overcome delays in product improvement competition, while producing more valuable improvements and product quality than competitors can achieve, Reducing the cost of the combination of in-depth customer understanding and close relationships with customers, and minimizing operating costs by setting budget priorities based on what Customers would like to receive (which eliminates unnecessary expenses), Transferring clearly Defined Customer Desires (DCD) between product designers, by identifying specific problems and improvement opportunities for specific products and transmitting that immediately by computer to designers and mangers of different but related products and services, Improving the management of multiple product designers and the resulting product lines, since products and services can be understood both individually and in categories, so that a clear management overview may be developed of actual performance in the marketplace—from the Customer's point of view, In the future, the Customer-Based Product Design Reports (CB-PDR) may help lead to continuous improvements in performance such as:

Assisting in extending what Customers prize most into entirely new products and into brand extensions of current products, Developing and supporting a unified corporate culture of superb performance through a focused process of Customer responsiveness and product quality (even if individual products are created and marketed by independent teams, separate business units, etc.), Within a generation or so, making it routine for certain classes of products to include this invention's idea, a two-way communications network for continual Customer direction, as a normal feature of these products, to involve Customers in an evolving partnership with Vendors. While this is a new invention today, at some time such two-way partnerships may become a normal expectation of Customers.

Protecting Personal Privacy and Market Integrity

One key to making a networked product (and networked marketplaces) work today is to step ahead of lawmakers to declare initial "principles" for networked marketplaces. For example, a key UP Module principle is "the individual's data and privacy are sovereign," which means that the data of individuals belongs to them until they choose to send it out; that dialogs are user-controlled so they can turn interactions off or control their frequency; and more. This is one value of a patent, to build privacy safeguards into the use of this invention, so that licensees are required to use this technology responsibly.

Part of this invention is an explicit solution that is based on applying the invention recursively to itself. Similarly, another use of the present invention may be to apply it to other technologies that threaten privacy, for the primary purpose of safeguarding privacy instead of for the other purposes described for the invention. This meta-capacity, to enable users to utilize information-based systems themselves to confirm their appropriate use from a privacy and ethics viewpoint, is potentially important and valuable to many technology-based products and services.

In addition, this solution may enable the rapid evolution of this invention's (or society's) principles for effectively protecting personal privacy and confidentiality, based on the self-expressed needs and views of those affected. In other words, the invention creates a self-correcting "digital knowledge environment" that may assist in advancing society's abilities to rapidly determine how privacy and confidentiality should operate in an information age, along with built-in systems to enforce those determinations. This new dynamically self-adjusting privacy-enforcing environment potentially includes millions of people who are increasingly monitored and analyzed by multiple types of data recording systems that are used in supplying them with products and services. This need for protection is increasing rapidly as these data recording systems gain interoperable communications and networking capabilities, and as they are integrated into larger control systems for automated identification of individuals, organizations and groups as commercial targets, propaganda targets and other kinds of targets.

As society undergoes this revolutionary expansion of access to personal and confidential information, how might technical systems themselves be applied to stopping, controlling, or limiting unethical access to and use of this information? This invention has a spectrum of explicit strategies that are built into the design of the technology, its operation, or its licensing. Some of these strategies include:

The operation of each product's CB-PD Module is user-controlled. Making every interaction user-controlled means everyone can choose not to participate in providing any data they do not want to give.

Before an upload is initiated, no data is communicated by a product until it is explicitly permitted. The operating rule is that users own their own data until they choose to release it.

Users may choose to send out product data but remain anonymous (by not participating in interactions that describe themselves, such as the number of computers that they own or the number of children in their families, anonymous users may even withhold data that can be used to categorized them). Thus, customers may tell vendors only the problems they have with a product, and vendors can download on-line customer support (OCS) and other responses such as upgrade offers without knowing who are their customers.

The licensing of this technology incorporates an explicit privacy and customer protection policy, to protect both the privacy of individuals and the integrity of markets. The violation of this policy may result in a licensee being counseled, put on probation, suspended, withdrawn or revoked.

Figure 26:
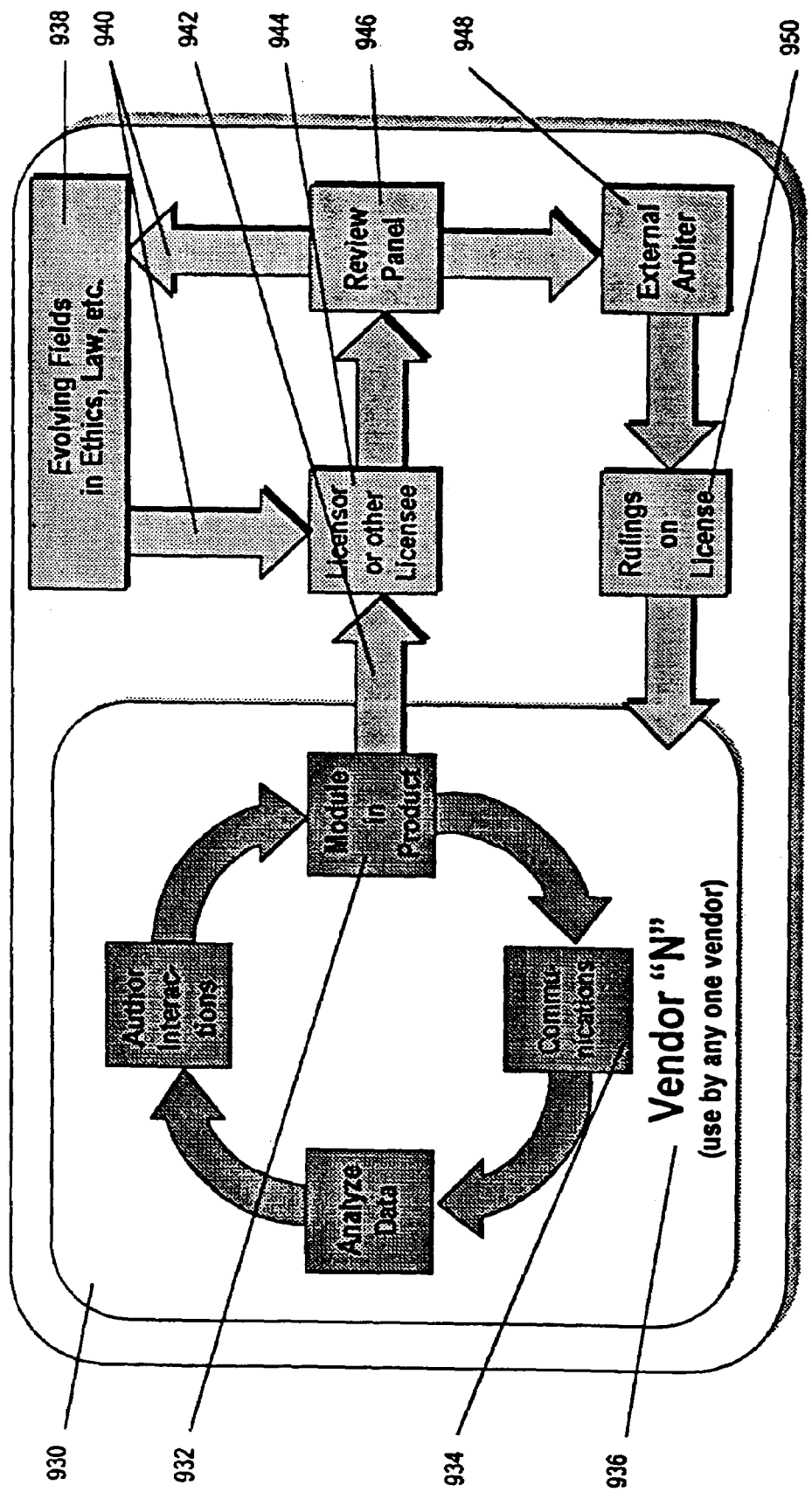
FIG. 26 is an illustration of the invention's systems for protecting privacy, confidentiality and market integrity.

Turning to FIG. 26, a Customer Design System (CDS) is recursive and capable of meta-levels of operation. This figure shows one of the types of recursiveness possible, for the protection of customer privacy and market integrity. At this meta-level of operation, just as a Customer Design System (CDS) provides feedback on a product 932, the invention may also provide feedback on itself 930. Customers may employ the CB-PD Module in a product 932 whether during a Vendor Initiated Interaction (VII), a Customer Initiated Interaction (CII), by various means including accessing its user controls 882 in FIG. 24, etc. to report problems and concerns with how their privacy or confidentiality may be misused or abused.

When the user data is uploaded 934, the information that concerns potential privacy problems could be sent to the licensor of UP Module technology or to another authorized group 942, 944 instead of the vendor 936 or in addition to the vendor. If those interactions appear to exceed the bounds of the current privacy policies instituted for ethical. Customer Design System (CDS) operation 944, they would be communicated to independent investigators 946 who review suspected abuses. If the independent investigators 946 find cause, they employ independent arbitrators 948 to decide if the licenses of violators should be altered by means such as required consulting, requirements to follow specific guidelines explicitly, probation, suspension, withdrawal, revocation, etc. 950.

At the same time, those who write the technology's privacy ethics 944 and the independent investigators 946 might participate in larger societal and global discussions, conferences, industry or government policy boards, think tanks, etc. 938, and this participation 940 may be personal, anecdotal or with on-line data sharing enabled by this invention's digital environment to provide those external bodies with active current examples that help them contribute to the resolution of specific problems. With open publication and transmission of final rulings by independent arbiters 948, 950 these independent bodies 938 may also contribute to the adaptation of the privacy policies to protect customers, users and markets in previously unforeseen areas. The results from those who are active in these larger arenas 938 help inform the adaptation or re-writing of this invention's privacy policies 944 and their enforcement 946, 948, 950.

For example, if users feel that a particular product uses CB-PD Module interactions 932 in intrusive ways (interactions that can't be turned off), unethical ways (data collection that may violate personal privacy) or stupid ways (asking questions that don't make sense), they can initiate a meta-interaction about that 932, 942, 944.

For a second example, in a product that does not include a CB-PD Module, a specialized and focused CB-PD Module or sub-system 932 may be built into the product or attached to it to incorporate this type of privacy protecting communications and meta-system without providing this invention's two-way communications for the product's vendor 930, 934, 936 (e.g., without enabling customers to communicate with the vendor, yet enabling them to communicate solely to an external group about their privacy, confidentiality and other concerns such as that technology-based product's intrusiveness; ethical uses; acquisition of personal, private or confidential information; or other areas such as the uses to which those observed do not want their information applied).

For a third example, there may be exceptions to this privacy framework. One possible exception is when employees work at their employers' computers. Their data belongs to their employer and the employer may upload it and use it without requesting the employee's permission. That company, however, has its own full privacy rights for the products that it buys from the outside, such as spreadsheet software. The company and its employees would choose whether or not to participate in interactions, or upload data to, through the products it buys from outside vendors.

One of the factors in this meta-system is the application of the invention's unique "digital knowledge environment" to the meta-questions of the ethical application of one or more technologies throughout societies and markets. Unlike most discussions in these areas (which proceed from the use of new technologies to the recognition of possible problems to the initial discussion to a "it's too late and very difficult to do anything" conclusion), the fundamental principle of this technology is to pro-actively tackle these questions by contributing in areas such as its own market-wide technology, its unique "digital knowledge environment" and its ability to electronically transmit data to reviewers of many types to achieve the best possible resolution of both specific and general questions at any point in time, etc.—and then incorporate those into explicit policies that begin very early in the life cycle of this technology, and are requirements for licensed users of the invention.

Another factor is the financial independence of the review panel 946, the arbiter(s) 948 and those participating in the advancing discussions of these fields of ethics and practice 938. Since the licensor 944 has a financial conflict of interest that could produce a bias to not take action against offending vendors 936 that would reduce revenues from them, this meta-system is explicitly designed to circumvent that financial conflict of interest by placing all investigations, reviews, discussions and actions 946, 948, 950, 938 in the hands of those who do not have a financial interest in the outcome of their decisions 946, 948. At the same time, the licensor 944 remains a gate-keeper for communicating privacy and other problems to the review panel 946 and for formulating the specific ethical principles used to make those decisions 944, and for constructing the ethical guidelines that licensees are required to follow 936 and reviewers and arbiters are required to enforce 946, 948. This is to provide the licensor time to work with and notify vendors at the early stage of problem identification so it may avoid the difficulties and complexities of informal or formal reviews 9465, both to correct specific instances and to attempt to identify and eliminate entire classes of new problems as they arise 944. If it turns out that even this role compromises the licensor 944 because of its financial interests, provision has been made for assigning or licensing this meta-gate-keeping function and ethical rules construction function to a third-party 944.

Similar meta-systems 932, 944, 946, 938, 948, 950 could be employed by trade, industry or professional associations, though they may choose very different sequences and arrangements. The basic principle is that many types of products and services may "wake up" to provide meta-communications channels about improper and unethical uses of them. Since any group might develop its own "symbol of personal protection" to put on products to certify that this product and company protect customer privacy and confidentiality, it is likely that some symbols would offer weak protection yet look as authentic as a symbol that provides strong protection.

It is therefore possible that uniform standards could be developed 938, 944, 946 and represented by a unique trademarked "symbol of personal protection." Any company in a particular industry (as granted by its industry's association) or in any industry (as granted by an independent standards body) could qualify for the use of this standard "symbol of personal protection" in its product labeling, advertising and marketing. Regardless of the granting system (by individual trade associations, by a single symbol-granting authority, by government or other politically certified regulators, etc.), and regardless how abuses are reviewed and arbited 932, 944, 946, 948, 950 systems made possible by the present invention may accelerate and expand society's abilities to set ethical guidelines for the appropriate use of technology-based products and companies 938, 944. The results in those industries may not be in law; they may be only public censure, negative publicity, withdrawal of the use of a "symbol of personal protection," or suspension of the offending organization from its industry association(s). In today's high-visibility, immediate financial-results environment, those and similar penalties are often taken seriously and avoided if possible.

In addition, the data from this meta-system (whether in the one technology of this invention or in multiple technologies) may be added to (or used to construct) publicly reported 938 collections of data on privacy and technology, problem analyses, problem resolutions, individual case histories, trend reports, transcripts of hearings, conference proceedings, filings with regulatory bodies and/or law enforcement agencies, etc. The data produced from such a "digital knowledge environment" may reveal and in some cases lead to the confirmation of what may become societally adopted principles employed to protect the privacy and confidentiality of individuals, groups, corporations or organizations that are increasingly under the data gathering scrutiny of the technology-based products, services and systems that they use. Such a "privacy protecting knowledge environment" may contribute to society's codifying appropriate practices in the areas of digital privacy, personal protection, data protection, computer security, etc. 938. As one of the applications of the present invention, this would be a gratifying contribution indeed.

Recursive Uses

Just as the present invention can be used to construct a meta-application in Protecting Personal Privacy and Market Integrity, a similarly robust meta-application may be established for the module to improve its own operation, performance, and contributions to the organizations that use it in their products and in their internal information infrastructures. The invention's many features and uses, including support systems such as on-line customer service, may be employed recursively. Furthermore, these recursive meta-applications do not take place at just one meta-level, since the following list illustrates how the application of recursiveness may be scaled to multiple meta-levels that each improve this technology's performance at a new level of complexity and operation:

- The use and performance of a CB-PD Module in a particular product (by adding CB-PD Module interactions with users of the Instrument Design Repository (IDR), Development Interactions (DI), transmission and communications, Customer-Based Product Design Reports (CB-PDR), etc.; to learn their needs, problems in using the invention, suggested improvements, etc., and to report that as meta-data),
- The effectiveness of this invention in improving any of its contributions between an organization and its customers throughout a marketplace (by adding CB-PD Module interactions at decision points where any type of user is determining how to alter their relationship with the other party(ies) in a transaction, to learn how this invention helps, hinders or may be expanded as a communications media between the parties to improve their combined abilities to work together in ways that achieve their objectives, and to report that as meta-data), The efficiency of entire markets (by means such as discovering specific inefficiencies and market problems through customer interactions, reporting them as a meta-communications or shared meta-data and iteratively exploring those inefficiencies with representative customers to determine their magnitude and impact, then to use the invention's "digital knowledge environment" with both vendors and customers to formulate improved processes and architectures, followed by in-product trials prompted by CB-PD Module interactions to field test solutions prior to scaled up roll-outs),
Etc.

Since it has been demonstrated that recursive uses at the meta-level are available for (1) Protecting Personal Privacy and Market Integrity FIG. 26 and (2) improving the performance of and contributions from this invention (just above), then it is obvious that recursive meta-uses are a part of this invention that may be employed along any dimension of this invention's application. By considering the Ramifications, Environments, and Specialized Other Uses (described below) of this CB-PDS system, examples will be seen of still other aspects of this invention. (For example, there are possible contributions to some of society's operating and performance goals, to which this invention may contribute, by fostering improvements in areas such as the efficiency of markets, the performance of entire categories of products, higher levels of customer satisfaction, the convergence of vendors with the values and preferences of consumers, the nature of free-market economic relationships, the relative market shares of global enterprises with humanly supportive vs predatory attitudes, etc.). Just as with applications already discussed, these further applications may also be employed recursively as a part of this invention, at meta-levels of operation, to provide further benefits to their users and to society.

Built-in Payment System

The present invention's "digital knowledge environment" is designed to expand the ability for anyone in Anycity, Anystate, Anycountry to receive assistance in researching, understanding and serving Customers. In practice, the development of such a new digital environment requires the ability to conduct transactions by means of the components in the invention, so that the various participants in this environment may be paid for services, know-how, knowledge and products that that they sell through it. Therefore, integrated on-line billing and payment systems for commercial uses of the invention's "digital knowledge environment" are features that comprise this invention.

Turning now to FIG. 19, the invention's open communications, transactions and payment systems enables third-party professionals and knowledge vendors (such as publishers, authors and consultants) to sell their know-how, services and products through this digital environment, by means of (1) the computers on users desks and (2) the CB-PD Modules in products (the openness of communications by CB-PD Modules may be determined by many of the licensed vendors):

The invention as a whole 720, 724, 728, 732: Access local or remotely located lists of experts, consultants and services that may assist with the use of the invention, a particular component of the invention (such as the Instrument Design Repository), a particular use of the invention (such as learning employee needs and attitudes during specific work tasks), etc.; contact one or more of those experts on-line to plan and implement a working relationship; execute work by means of features of the invention; bill and pay for those services by conducting on-line transactions; etc.

Instrument Design Repository (IDR): On-line communications 722 may be integrated into the Instrument Design Repository (IDR) 720 in such a manner that employees in organizations may send their work with the IDR on-line to third-parties inside or outside of their organization for independently provided services; may jointly engage in design and planning sessions on either or both computers; may purchase printed, on-line, or other published know-how by transactions directly through their computer; or engage in other types of working relationships and purchases such as:
(1) access remote data bases of interactions to examine, purchase and download appropriate ones 702,
(2) access remotely located experts to jointly engage in a design sessions on either or both computers 722,
(3) electronically select sets of interactions to electronically mail to specific experts for independent review, revision, augmentation, implementation planning, etc.; then receive their revisions electronically and review them by means of the Instrument Design Repository (IDR) systems and controls 720, 722, 724,
(4) electronically delegate the authoring of interactions, tools to assist in employing or automating this component of the invention, models or simulations, product field trials, etc. to a remotely located expert(s), receive their sets of interactions or other work product electronically and review them on-screen by means of the invention 722, 724,
(5) access vendor experts electronically (such as at communications services vendors, hardware, software, consulting firms, etc.) while engaged in working on the Instrument Design Repository (IDR) to plan communications strategies, networks, equipment purchases, monitoring services, communications services, etc. 722, 724,
(6) access billing services (such as credit-card vendors, on-line invoicing, etc.) to bill for and pay for any services or products received 736,
(7) Etc.

Customer-Based Product Design (CB-PD) Modules in products 724: On-line communications may be integrated into the CB-PD Modules in products in such a manner that product users may send their data, requests for assistance, additional purchases, etc. on-line to third-parties whether at the vendor organization, allied with the product vendor, or independent from it; may purchase printed, on-line, or other published know-how by transactions directly through their computer; may receive on-line customer support (OCS) provided by third-parties that is delivered by the CB-PD Module in the product during the actual use of the product; may participate in research studies with interactions provided by third parties and data sent to third parties; or engage in other types of working relationships and transactions such as:
(1) access remote analysis services to examine, purchase and either employ their systems of data analysis remotely with CB-PD Module data sent to those services instead of, or in addition to, the product's vendor 724,
(2) access remotely located services to provide on-line customer support (OCS) services through the CB-PD Modules incorporated in a product 726,
(3) receive inquiries (in the form of interactions) from third parties for selling one's data, participating in paid or non-paid independent studies for purposes other than those of the product's vendor, etc. 726,
(4) engage in the sale of one's data to third parties, paid or non-paid independent studies run by third parties, etc. 726, 724,
(5) direct the CB-PD Module to screen third-party requests by the amount of payment offered, or by other criteria, so that only those requests that meet acceptable thresholds for each user are presented to the user by the Module 724,
(6) have the CB-PD Module print a log of third-party transactions (such as the dates on which data is sent, the payment due for each transmitted data set, the total money due from each third party, etc.; such as a list of additional products ordered through the CB-PD Module in the product, the dates ordered, the amount spent for each order and for all orders, etc.; such as a list of outside services received, like on-line customer support (OCS), the cost of each service, the total cost of all services, etc.) for monitoring and other actions based on transactions conducted through the CB-PD Module in the product 724, 726,
(7) access payment services (such as credit-card vendors, on-line invoicing, etc.) to bill for and receive money for any data sold or services provided to third parties 726,
(8) Etc.

Transmission and Security Procedures: Communications with the CB-PD Module in products may be restricted by that product's vendor to exclusive transmission with it (with the exceptions described in "Protecting Personal Privacy and Market Integrity"), or open to include third parties. In the latter case:
(1) Communications may be partially open by means such as pre-authorized lists of third parties with whom communications are permitted, downloadable lists for dynamic re-configuration of accessible third-parties over time, the ability to engage in a CB-PD Module interaction to request the product vendor's permission to engage in on-line communications with a particular third party, etc.
(2) Communications may be opened completely by means such as providing automated access to dial-up Value-Added Networks (VANS) that store-and-forward messages from multiple vendors, (and provide directed contacts when particular products dial in), with user-set controls users may add particular third parties to the systems automatically contacted by their product, etc.

Customer-Based Product Design Reports (CB-PDR): On-line communications 734 may be integrated into the CB-PDR system 732 in such a manner that employees in organizations may send their data or analyses of the data on-line to third-parties inside or outside of their organization for independently provided services; may jointly engage in the design of analyses, actual analysis or review of data on either or both computers; may purchase printed, on-line, or other published know-how by transactions directly through their computer; or engage in other types of working relationships and purchases such as:
(1) access remote analysis services to examine, purchase and either employ their systems of analysis remotely with data sets sent to those service locations, or download appropriate ones and employ them locally on the purchaser's data sets 734,
(2) access remotely located experts to jointly engage in data analysis sessions on either or both computers 732,
(3) electronically select sets of data 732 to electronically mail to specific experts 734 for independent review, analysis, comparison with other data sets, modeling, simulations, etc.; then receive their analyses electronically and review them by means of the CB-PDR systems and controls 732, 734,
(4) electronically delegate the analysis of data, tools to assist in employing or automating this component of the invention, the construction of models or simulations, reviews of product field trials, etc. to a remotely located expert(s), receive their analyses or other work product electronically and review them on-screen by means of the invention 732, 734,
(5) access vendor experts electronically (such as at market research services vendors, market research data vendors, hardware, software, consulting firms, etc.) while engaged in working on the CB-PDR to plan data analysis strategies, automated triggering of reports and notifications, integration with other information systems and functional operations (such as on-line notification of customer service, product distribution, etc. based on customer needs communicated through the CB-PD Module in products throughout the marketplace), reflexive organizational responses, network integration, equipment purchases, monitoring services, communications services, etc. 732, 734,
(6) access billing services (such as credit-card vendors, on-line invoicing, etc.) to bill for and pay for any services or products received 736,
(7) Etc.

SUMMARY OF THE INVENTION

What results are Produced?

Once developed and integrated into a product, an automated Customer-Based Product Design Module (CB-PD Module) adds new and fundamentally different opportunities to obtain continuous Customer information in potentially faster, cheaper and more systematic ways than expensive and occasional product, market and human factors research studies. Since management decisions must inevitably be made about all aspects of products and services, Customers can and should participate in these selections. The CB-PD Module produces usage-based information on several levels:

There are product design decisions, such as which product features should be added or improved to add the most value to that product.

There are product management decisions, such as learning why specific products are preferred by Customers.

There are Vendor management decisions, such as using Customer views of different product categories to help allocate corporate resources so that the business can jump faster and farther toward its revenue and profit objectives.

There are business performance decisions, such as providing a continuous flow of current Customer-Based Product Design Reports (CB-PDR) into the Vendor's internal data networks so many areas of the organization can develop iterative improvements in their operations, performance and results.

Today, every corporation confronts multiple investment opportunities, limited resources and competitive thrusts from world-class corporations. The best decisions possible must be made and coordinated by product designers, product managers, senior executives and functional managers. The quality and accuracy of these decisions determine numerous types of competitive positioning and success. How can the employees, throughout a corporation, continually identify the best available opportunities for leveraging their current resources to produce the largest gains?

This invention proposes a CB-PD Module, with a Customer Design System (CDS) as an added, built-in feature of appropriate products and services for direct customer-based connections that may assist a variety of Vendor employees with high-quality, current information: analyzed and Defined Customer Desires (DCD) as an on-line part of their decision making environment.

Figure 28:
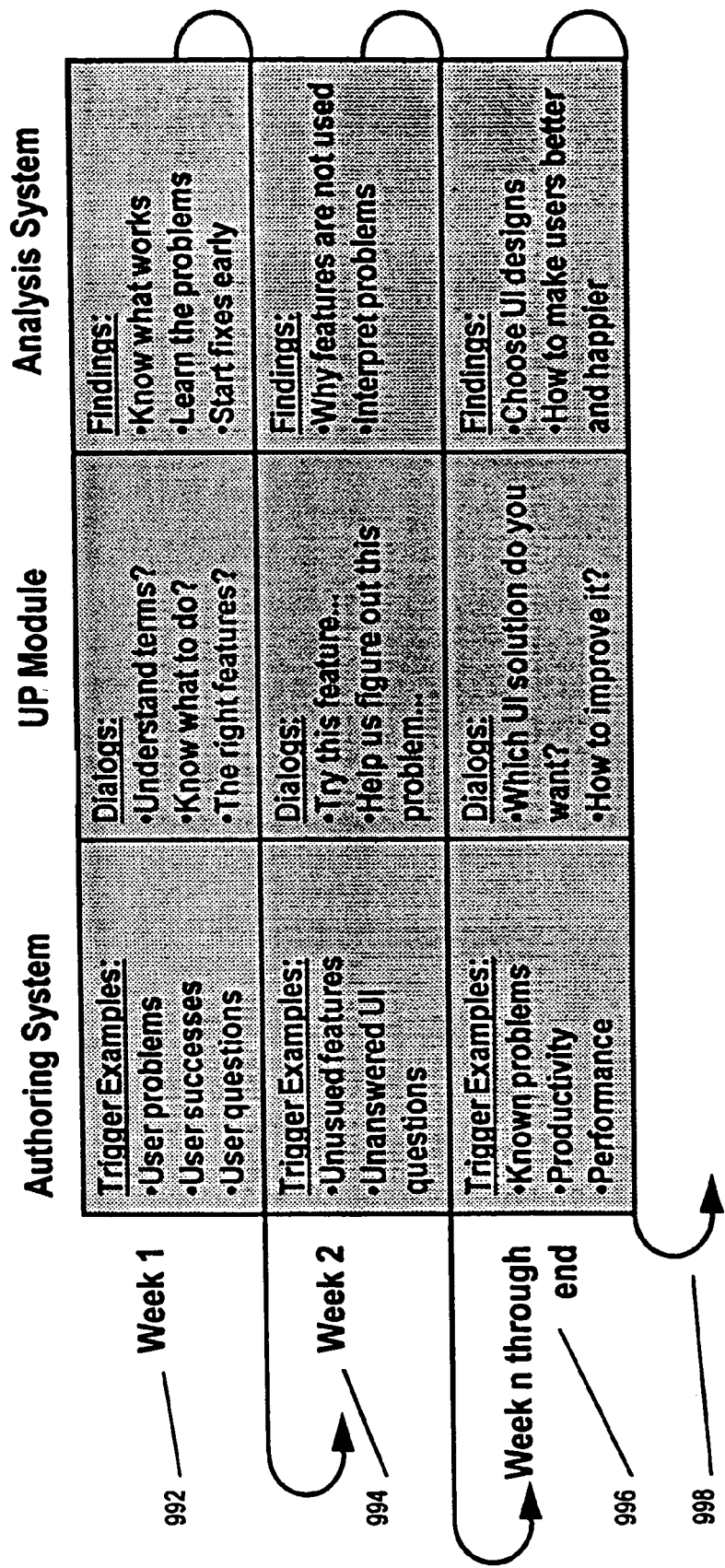

Consider some of the ways that this might be applied in products and markets that "wake up" during use to learn from customers:

Usability and field testing FIGS. 27 and 28: Why run usability tests with just eight users in one city when the present invention can include hundreds of users in the test—internationally in many markets? Why wait months to learn from field tests when in each week one can see new analyzed results from actual uses 992, 994, 996, 998 in FIG. 28? For example, if one adds workflow features to a software application, a trigger point in the authoring system might be when a user tries to employ a workflow feature but then chooses Undo. After attaching an interface accessibility question, when Undo is selected a Development Interaction (DI) is displayed with a title such as "Undo" followed by an interaction such as, "You just used Undo. How sure are you of what to do at this point?" To simplify the response, the user would indicate one quick choice on a 1 through 5 scale (sure through unsure). To gather improvement suggestions and needs, an open-ended question at the bottom could ask, "What would help make this clearer?" In the CB-PDR analysis system at the vendor, the quantitative data would be displayed for each workflow feature (such as "Workflow routing"), showing the actual counts and frequency of each response. For any category (such as "unsure") the reader could drill down to user suggestions and needs (such as "Is there an easy way to see where things are routed?").

Market research FIG. 29: When a product is launched: it is crucial to establish it immediately as a winner. Most market research takes six months or longer to figure out who the buyers really are, why they bought the product, which ad media worked best, what messages sold best in the ads, and what needs customers want to satisfy. Now, the present invention's authoring system can be set to ask these questions after the product is installed, as soon as actual use begins. By first asking whether the user is the product's buyer, a recommender or a user, the appropriate market research questions can be displayed. In a week, the product's marketing manager can turn to the CB-PDR Module analysis system to start learning answers. This can be e-mailed and faxed to the sales force, distributors, retailers, ad agency, PR firm, etc. to get them up to speed on the real needs of the real customers.

Personal customer support FIG. 30: Different users encounter different problems when they use a product in their own ways, and their needs change over time as they move from novice to intermediate to expert. After any Development Interaction (DI) that discovers a user problem, the authoring system can be set to branch from learning to asking if the user wants the appropriate solution delivered and displayed automatically. Then, when the CB-PD Module uploads data, it can download those specific solutions to that specific user's CB-PD Module and attach them to the specific trigger events that indicate those specific problems during product use. The next time the user takes those actions, the CB-PD Module automatically displays the precise and specific solution needed by that individual product user (such as the title "Workflow Routing" followed by "1. Display the Employee Map that shows users. 2. To route your document to the proper users, drag and drop it on them in the proper order."). The CB-PDR analyses may displays how often users ask for and use on-line support, how much support each product feature needs, and, in some cases, the impact of the CB-PD Module's on-line support for improving user performance and reducing error rates.

New point-of-use revenues FIG. 31: Just as customers can place orders by phone, CB-PD Modules can add that to products that are located in customer hands throughout marketplaces. In the Instrument Design Repository authoring system, trigger points may include user problems that can be solved by a hardware service contract or a training class, the re-order points for inventories of disposable supplies, and product upgrades whose new features can be demonstrated immediately after a user employs the old feature. For example, if a user's average time for completing a measurable task is consistently slow, that could prompt the Development Interaction, "Your performance may be increased by taking our training class on [this part of the program]. For additional information on how this class would improve your productivity, click here [BUTTON]." Interested customers could enroll in the class through the CB-PD Module. Or, they could simply send inquiries to receive additional information. The analysis system 1092 would flag these customer inquiries and transactions, then it may route them via system e-mail 1094 to the correct groups (transactions to order entry and inquiries to the correct salesperson) 1096 who can act on them 1098 and may receive additional information on demand through any of a variety of means 1100.

What else can be accomplished by products with a CB-PD Module that wakes up at trigger events to interact with users?

Non-intrusive sales leads: Is the product or some of its features used so much that the customer needs more units? If so, who wants help in expanding capacity, and what are their needs?

Consulting services: When services are outsourced (such as computer support, third-party maintenance or sales consulting), those consultants can learn client needs continuously through the information systems clients use, or from the systems they support.

Figure 32:
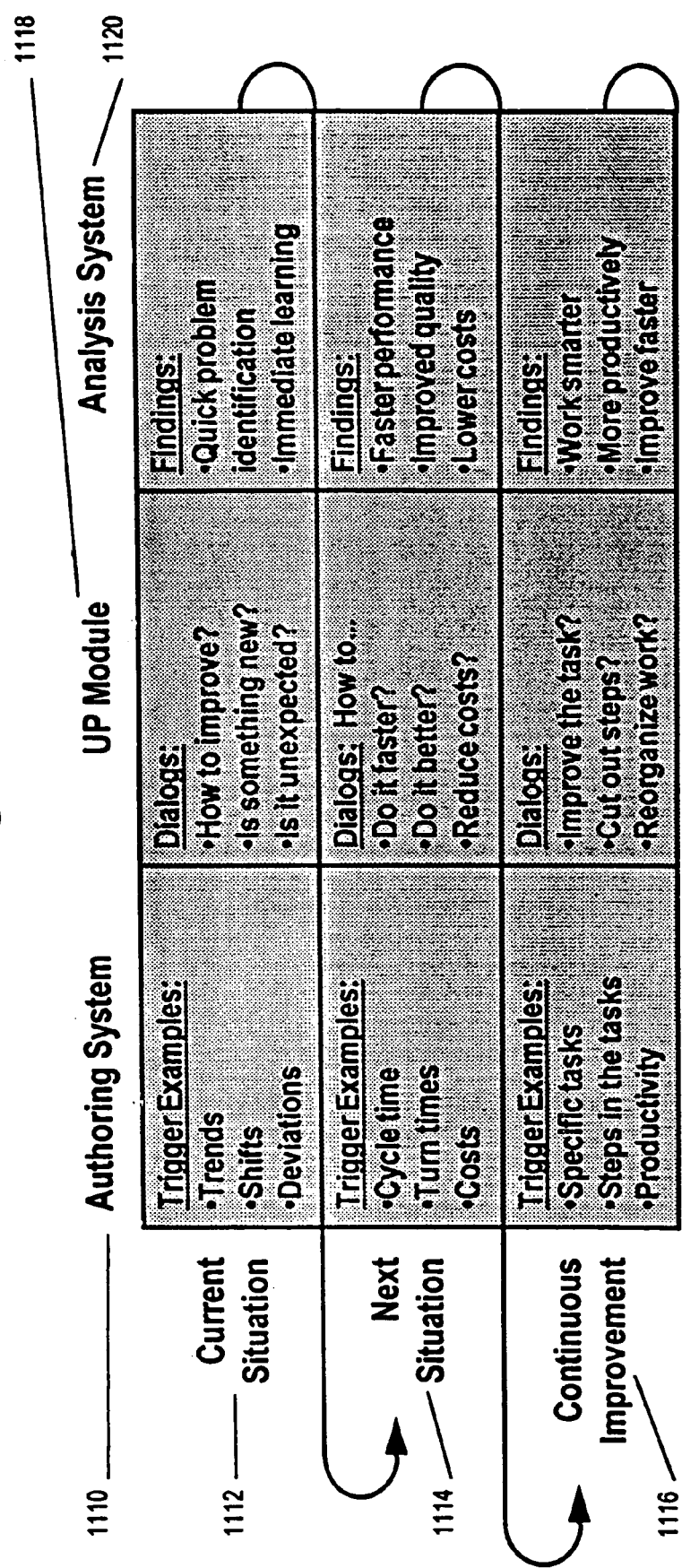

Discovering new market niches and changing user requirements FIG. 32: Do some users employ obscure features repeatedly? Do they represent a new market niche that could be captured and "owned" before competitors even learn it exists? Can the current situation 1112 be transformed into the next situation 1114 by engaging in continuous improvement 1116, by means of the present invention 1110, 1118, 1120?

Benchmarking: Which competing products does a customer use and why? What do the competing products provide that users want, and how critical are those features?

This produces continuous learning opportunities for Customer-based iterative and radical improvements in products and services. With such marketwide communications throughout product life cycles, this invention may help compress the cycle of setting objectives, producing accurate designs, improving performance, and reaching targeted objectives—whether the goals are to produce more sales, to gain new market share, to improve internal operating performance—or to deliver the highest quality, most desired products and services available anywhere.

What might happen to the business environment and the economy?

This invention's result might become more than just a new product feature. Over time, this may produce a new type of economic planning and decision making environment—an on-line "marketplace community"—that is based on automated systems for communications, learning and improvement. The key to forming such a community could be interactive partnerships between Customers, product designers, service designers, and Vendors. For example, if product designers and managers prepare for decision making meetings using this invention's Customer-Based Product Design Reports (CB-PDR), they would enter these meetings with a quantitative and qualitative understanding of how well that product is actually working in the marketplace during the current period, and the parts of the product's design and performance that need to be improved. Such well-informed meetings, instead of being rare, could become more frequent and perhaps even a daily expectation in some businesses.

What might be the biggest change of all? When you make a decision empirical data from customers would be in front of you. Instead of flying by the seat of your pants, or stopping for 30 days to run a study, you know what users want so you make both faster and more accurate decisions. And when you want new information you can learn it quickly and cheaply from customers at their point of need, while they use your products.

New empirical information from the marketplace helps vendors shrink product life cycles, evolving them faster and more accurately toward what customers want and need. Both iterative improvements and radical breakthroughs are possible. In fact, the biggest competitive advantages will come from using this "inside information" to leap to the next product generation, seize the largest market share, and leave competitors behind—then do it again before they leap over you.

Figure 33:
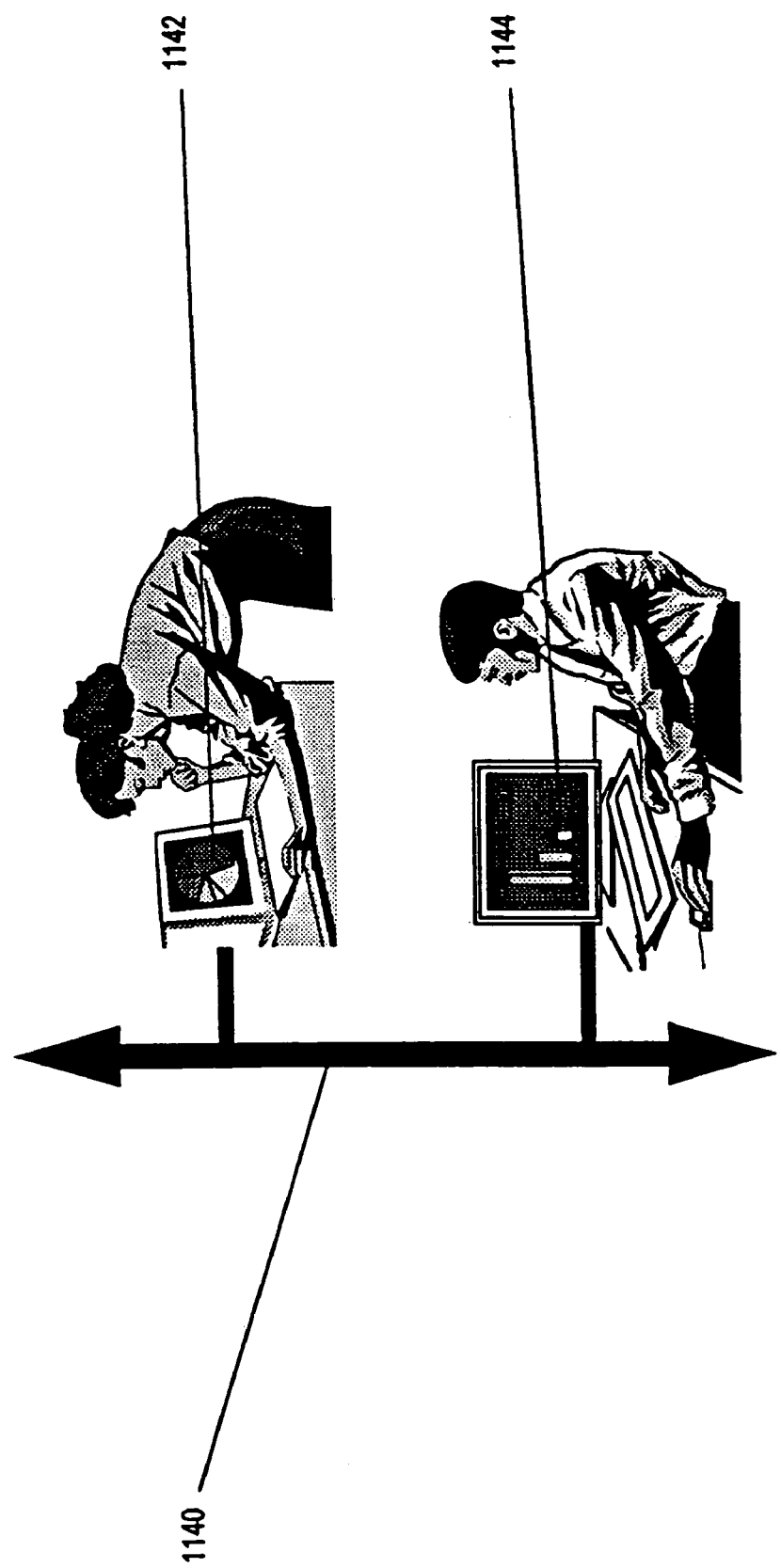
FIG. 33 is an illustration of the invention's re-use of components, thus producing savings in time, cost, etc.

A similar improvement process may be possible from the empirical information generated by this invention in enterprise-wide information systems, internal corporate software applications, manufacturing systems and back-office automation. In business information systems, which have increasingly become the normal infrastructure for business operations, on-the-spot Development Interactions (DI) can immediately gather information from users 1140, 1144 in FIG. 33 to track where problems occur, which needs are unfulfilled, what requirements are changing, etc. Those analyses can be distributed right away to those who need to fix specific problems or pro-actively meet new needs before they become problems 1140, 1144, yielding opportunities for iterative improvements, continuous re-engineering, or performance breakthroughs.

These capabilities are embodied in this invention's replicable systems, so that once developed they can be applied rapidly and less expensively to new products and services 1140. This re-use, throughout a company's networks and product lines 1142, 1144, lowers the cost of successive uses. For example, there is a high cost for the first product with a CB-PD Module and related components, but the fifth or tenth product with such a Module is able to take advantage of a growing range of re-usable components and features in that company's systems, so it may be added at a much lower cost.

Automated Customer-Based Product Design Reports (CB-PDR), as close as the computer screen at one's elbow, would help compress the innovation cycle by producing customer-based direction for continuous increases in both customer satisfaction and sales. The result could be the development of a direct partnership between Customers and Vendors to engage them, as a cooperative "marketplace community", in creating the improvements that they want—faster and sooner—as a normal part of product use.

A generation from now, it may be taken for granted that many types of products and services should include an ongoing product feature for continual Customer involvement, to offer Customers the chance to solve product problems and rapidly improve the design and performance of the products and services that they buy. It may also be taken for granted that product marketplaces are information marketplaces, with active two-way learning by both customers and vendors.

Today, these new insights are being developed as this systematic technology, which may start by helping individual Vendors identify the best available opportunities for improving individual products, for investing in new products and product features, for optimizing their marketing and support services—to make their products, services and companies the most successful in the world.

To begin, new technology developers typically generalize from themselves, and imagine they know what the market wants. Since CB-PDS System technology assumes that the market decides, its first reduction to practice is based on consulting, not products.

CB-PD Modules aren't a "disk-in-a-box" product—yet. The first licensees receive expertise and assistance in constructing their instantiations. Licensee fees are lowered so early adopters receive low-cost licenses that make this technology easily accessible. Future licensees may pay license fees based on market prices.

Within a few years the market may indicate what it wants from this invention. Then shrink-wrapped software can be developed that provides the appropriate feature sets, such as:

Are CB-PD Modules primarily used for field testing during product development?

Ar CB-PD Modules primarily used for improving marketing accuracy during and after product launch?

Are CB-PD Modules primarily used for giving users built-in problem identification and customer support?

Are CB-PD Modules primarily used for gathering sales leads non-intrusively?

Are CB-PD Modules primarily used for conducting point-of-use transactions throughout the marketplace?

Are CB-PD Modules primarily used for adding usage-based communications to marketplaces, or to information systems throughout enterprises?

Are CB-PD Modules primarily used for other applications and uses?

Because many different uses are provided by this one technology, its business model is based on the evolution of the software industry. That began with consulting to build custom applications, then packaged software emerged. This business model will attempt to leap from its inception into a mature and useful technology by listening to the market's needs.

A Customer-Based Economy (CBE)

This CB-PD Module may produce products and services that can be closely and continuously linked to the needs and values of their Customers. The resulting Customer Directed Products (CPD) become the joint creations of Customers and Vendors. New preferences, product features, and Customer capabilities could be developed by this partnership.

The fact is, each product exists within the context or frame of reference in which it is used, so that its Customers ultimately make sense of its features and capabilities and either value or do not want the benefits claimed by the product's Vendor. Inevitably, therefore, every product design is biased. For that bias to work for the Customer, there must be design selectivity and judgment that includes the Customer's viewpoint. The approach embodied here is that one effective way to include the Customer's judgment is to enable his or her participation in making these choices by means of a networking module that may be embedded into or attached to appropriate products and services.

Today, an increasing number of products and media are being merged and delivered by two-way networks. The installation of optical fiber networks to businesses and homes will produce an enormous expansion in the products and services that may be marketed and delivered over networks. In this context, which is the emergence of networked societies and economies, this invention is more than just a reflection of the financial needs of Vendors to increase revenues and profits. It can also be seen as a reflection of the emerging beliefs, assumptions, and values of such a networked society or economic system.

The fundamental change is for Customers to assist in providing the vendor's conscious decision making function; they help choose the nature of the products and services they prefer and the features they want included or excluded. Thus, the transition proposed here is to interactive products that are actively shaped by the conscious and self-chosen needs, demands and constraints of the people and organizations that use them.

The eventual result could be that products and services are manufactured based on active preferences, beliefs and values that emerge (at least in part) from the people who buy and use them, as a normal feature of product use.

This reflects the inventor's belief that Customers do not have to be as passive as they are today. Customers may do more than select the products they buy; they could help design them to fit their interests, goals, and beliefs. In such an environment, vendors would find it harder to throw at the market products that are based on features and capabilities that do not interest Customers or that they do not want. Customers would interact with an increasing range of products and services throughout the products' life cycles (perhaps even from early concept/prototype stages), to help evolve them toward the features they want and will use. And if a product has been bought that is too difficult, too confusing, or offers something that Customers do not want, Customers could become very accustomed to hitting the interactive "module" to tell the Vendor immediately that there is a problem, perhaps how to fix it, or to request a specific service—like customer assistance or even a refund.

Most often, though, Customers will use only those portions of a product which they want and like, and they will interpret each product to be whatever they believe it is. For the first time, Vendors will be able to understand what that really means to customers on a day-to-day basis throughout the marketplace: Customers may or may not think the same features are valuable that the Vendor believes; they may or may not use the product for the purposes the Vendor intended; or they may apply it in new ways that are unsuspected and unknown to the Vendor. Thus, the most likely difference is the continuous education of Vendors about the current and changing real needs and interests of Customers. Since this invention provides private information only to those Vendors who include this module in their products, this is strategic information that Vendors may translate directly into improved products, revenues and profits.

A Networked Marketplace (NM)

In the end, an underlying belief drives this invention. The expectations of the participants in a Networked Marketplace (NM) may or may not evolve from those we practice today. To consider the potential impact a Networked Marketplace (NM), and include the range of intellectual property that this invention provides to marketplaces, inevitably includes currently unknown ways that this invention might be employed in the future. To pursue this line of development, however, extends this invention directly into three stages of perception, growth and use of this invention by Customers and Vendors:

Stage 1: Comprehension—What is it?

Stage 2: Mirroring—Who are we, really, and what can we accomplish with this knowledge?

Stage 3: Mastery—How might this invention help increase market efficiency, societal prosperity and human perfection?

Stage 1: Comprehension

What is each product (that has a CB-PD Module) to its Customers? How does it fit into their life? What are the product's unintended uses, impacts and effects? What is the real picture of the product and its related services, how it might develop and be improved by the modern, Networked Marketplace (NM) of the next century?

Stage 2: Mirroring

How can we extend and project ourselves into our products and services? When and how do Customers mentally or emotionally invest part of themselves in the products and services they buy? When and how do they merge products and services into their personal and group goals, behavior, performance and ideals? What are the Customers' ultimate motivations (e.g., performance, prosperity, improvement, happiness, fulfillment, etc.), and what are the best ways that Vendors can help them achieve those goals?

Stage 3: Mastery

If this invention makes products and services modifiable based on what is in Customers' heads and hearts, how do we bring that level of life (i.e., conscious imaginative transformations to achieve our goals) to the surface and into our daily activities? Is a Customer Design System (CDS) a new medium through which we might collectively improve our society, environment and world? What are the possibilities for using a Networked Marketplace (NM) to help Customers and Vendors mutually achieve their ultimate goals? Can the idea (or actuality) of Customer Directed Products be marketed as the possibility (or the promise) of new levels of achievement that may actually be generated by rapid iterative improvements? Is this a chance for Customers see themselves and the products they choose as perfectible? A chance to bring our aspirations into our lives through our products and our lifestyles? For example, "If the Customer can do it right and TELL US, then our company can make it right AND DO THAT FASTER THAN COMPETITORS, and make our customers happier and better off than their customers." In other words, there may be a mutually worthwhile and beneficial attraction and holding power in the relationships this invention might foster between Customers and Vendors.

Thus, a possible economic impact is that this invention may cause a material transformation in products, services and Vendor-Customer relationships by producing a Networked Marketplace (NM) in which all participants may experiment with varying degrees of influence. This produces potentials for evolving toward an economy where Aggregate and Defined Customer Desires (ACD and DCD) help direct and control manufacturing, services, distribution, training customer support, etc. This would transfer some commercial control, guidance and direction from Vendors to Customers. It would redefine Customers based on their competence, preferences, buying power and control.

Since this invention is far from the only way in which society is networked, it might also help provide Customers with a new interactive role within which to reach out to extend their influence and guidance through commercial channels. For example, it would afford market segments new opportunities to play with product concepts and test ideas for new products, new relationships with Vendors, etc. By using a spectrum of networking opportunities simultaneously, Customers might figure out some of the "rules" for a networked society faster than Vendors.

For example, Customers might use other networks to organize their responses to specific products, and rapidly "feed" Vendors with preferences (i.e., an environmental group could use this in combination with other types of networks to publicize their cause and attract large numbers of people to give certain Vendors certain environmental messages about the ozone-depleting chemicals used to manufacture their products; or an immigrant group could send messages urging greater employment of their group members by the Vendors of products sold to that group). In other words, Customers might establish dynamic partnerships with Vendors that eventually extend beyond the design of products and their associated services. What is suggested is that the re-engineering/design space within which a Customer Design System (CDS) may operate may turn out to be considerably larger and more flexible than the preferred embodiments described above.

Can a society even consider approaching perfection? Based on systems of Customer guidance, can we conceive of a larger "invisible hand" than the one Adam Smith described, one that might work on our behalf to help with a larger task than the efficiency and effectiveness of the marketplace? With Networked Marketplaces (NM), could we see this "meta-hand" emerge from our ability to make conscious choices and the marketplace moving to provide what we say we want? Could we start to find ourselves with an economic system that continuously becomes more efficient and accurate in meeting our needs—a virtuous circle that builds what we want on our behalf?

If so, this invention might open a door to responsive Customer-Vendor partnerships that are based on constantly evolving Customer needs, suggestions and preferences. That Networked Marketplace (NM) could be an explicit and self-conscious economic system that never existed before. But if that came to pass, that interactive marketplace might evolve explicit and empirically testable commercial opportunities to design and market the types of lifestyles, belief systems, social systems and world that groups of people might decide that they really want, which they would then have the built-in marketplace systems, responsive vendors and communication channels to request, design, purchase, refine and enjoy—worlds of their own desire and creation that they could try to live in simply because there would be a way to ask for it, have it made, buy it and improve it interactively.

The ultimate transformation would be from acted-upon Customers to connected partners—and perhaps then evolving from that to market segments of Customers that interactively guide and direct "Customer-responsive Vendors." The opportunity would then exist for "Customer-responsive Vendors" to transform themselves, or one or more business units, into the companies that build and sell the lifestyles and worlds groups of people aspire to and would like to inhabit.

Instead of today's feeling that some global corporations are becoming aggressively dominant, the economic direction proposed by this invention might lead toward emergent Customer groups who are supported and backed by major global Vendors—without feeling threatened by them.

The result might be named something like "Partnership Capitalism," "Partnership Democracy" or "Democratic Capitalism." This should remain consistent with fundamental beliefs about personal freedom and free markets; with the protection of the individual and of private property; with freedom of thought and speech; with the protection of privacy for individuals and corporations; with the value of a good education and honest respect for others; with the ability to live a quality secure life and to enjoy the fruits of one's work and success. These and many more of our fundamental free-market and democratic beliefs are protected and supported by this invention.

What might be different because of this invention? First, by means of this invention the range of offers Vendors can make to Customers is likely to be wider and more personalized. Since this is a two-way environment that may be built into an increasing spectrum of products and services, this invention may become increasingly personalized so that an increasing number of individual customers may have the chance to become active participants in making their products and services into the ones that they want. By extension, they would be making this a world that they personally design and enjoy. This process would not come in one step. Rather, it would be based on the same basic processes as Adam Smith's invisible hand of the marketplace, not from a "master plan." In short, the process of a Networked Marketplace (NM) is an ever-changing conversation, not a final declaration. But it is the type of conversation in which many would have a voice; the Customer Design System (CDS) facilitates interactions that might enable many to make our world into their own worlds.

In the end, the outcomes from an invention like this are unknowable. Its hoped for impact is to create unstoppable technological and business advantages that allow the corporations who use them to triumph in individual competitive battles. That will produce clear financial incentives that may eventually redirect commercial marketplaces toward networked relationships that provide what customers want sooner and more accurately. To work, those incentives may collectively reward individuals (Customers), corporations (Vendors) and societies (Marketplaces) by providing Customer Directed Products (CDPs) and Networked Marketplaces (NMs) that are more efficient, profitable and accurate in fulfilling Customer and Vendor needs. Its hoped for goal is to help capitalism evolve from a somewhat centrally controlled economic system whose leaders can concentrate economic power in the hands of a smaller number of self-directed organizations, toward an economic system that functions by concentrating economic power in the hands of organizations whose business operations are explicitly dedicated to providing what people really want and need, and to protecting the privacy and integrity of Customers and people as a central part of that process.

Ramifications

Location and Use of Components of the Invention

The operation of the Customer Design System (CDS) in FIG. 1 is already described in the preferred embodiments as spanning multiple locations. The division points between those locations may be moved, so that many of the connecting "lines" between parts of this invention may become either local or long-distance lines. In other words, many of the lines in the Figures between various parts and functions in this invention may be within one physical unit or they may connect two or more physical units.

For example, if the Customer Directed Product (CDP) is a PBX telephone system with several thousand users in one corporation, those users could be scattered in a number of locations. A single, centrally located CB-PD Module could use the voice, LED display, keypad and other features of the PBX system and its individual phone stations to investigate the utility, efficiency, user-friendliness and other aspects of the features of that PBX system. For example, it might ask appropriate questions after each Nth use of a particular feature 282 in FIG. 10 such as conference calls that include at least two internal and two external participants. It could read the appropriate Customer Design Instrument (CDI) 284 and "call" the user who set up the conference call after it was completed, to request participation 268. If the user chose to participate, the probes 294 might investigate whether or not the user felt a conference call was easy to set up, what problems were encountered and what could be done to make this feature simpler, faster and less prone to errors. The user could reply by pressing numbers on the keypad 296 or by speaking replies into the telephone handset 296 that are recorded as audio or digital records 304. At periodic pre-set intervals, the CB-PD Module could dial the Vendor 328 in FIG. 11 and send the Aggregate Customer Desires (ACD) data from its various Development Interactions (DI).

Thus, the principle is clear: by varying the locations of the components of this invention, it is possible to locate more of the physical and information components of the Customer Design System (CDS) at the optimum locations that support manufacturing, maintaining and upgrading the performance of an entire system, even if the product(s) are spread over multiple locations or delivered in diverse ways. Several more examples will be provided to illustrate that this might be accomplished in a variety of ways.

For example, in the embodiment in FIG. 3, the facsimile machine 70, can demonstrate how a centrally located CB-PD Module might interact with many individual products and customers that are in many distant locations. The preferred embodiment that was taught included the microprocessor/ROM memory 186 and memory 198 inside the facsimile machine 70. The CB-PD Module was located inside the product; it controlled the entire Development Interaction (DI) with the Customer locally and then connected to the Vendor's computer to transmit the resulting data. As an alternative, a custom microprocessor 186 in FIG. 7 may perform only the hard-wired functions of triggering the Development Interaction (DI) at certain events and, after obtaining the Customer's participation, connects the Customer Designed Product (CDP) 70 to the Vendor's computer. In this configuration, the digital-analog converter 194 and the analog-digital converter 196 would be located within the Vendor's computer and the Customer Designed Product 70 would not contain a modem 204. The Customer would conduct the Development Interaction (DI) 284 in FIG. 10 by means of voice spoken through the facsimile machine's handset 74, 78 which is then transmitted via a telephone line directly to a CB-PD Module located in the Vendor's computer. That centrally located Module would conduct the Development Interaction (DI) 294–308 inclusive and record the Aggregate Customer Desires (ACD) 304 directly in the ACD database within the Vendor's computer.

As various types of networks throughout society become interactive (such as a cable TV network, computer Bulletin Board Systems, on-line computer and information services, etc.) this invention may be added to those networks to determine how their Customers would like those networks to develop their services. Beyond that, however, these types of broad-based networks could serve as one component (such as a delivery vehicle for Development Interactions (DI); or a communications channel between a Vendor and certain products or markets; or a recorder and repository for the data from Development Interactions) within another Vendor's Customer Design System (CDS). For example, a cable TV service might sell multiple Vendors a "Customer-Based Product Design Channel" (CB-PDC) that would serve those Vendors as one component of this invention's Customer Design System (CDS). As brief examples, this channel could be used by a VCR manufacturer to evaluate how its Customers feel about the controls and interface on its VCRs and what can be done to redesign them, or the content of an educational "how-to" show could be evaluated along with what could be done to clarify its "how-to" instructions. In a more detailed example, a cable TV Vendor might use the Customer-Based Product Design Channel to schedule Development Interactions (DI) of a series of products (like JVC VCRs at 9:00 PM and JVC television video cameras at 9:30) 282 run the appropriate Customer Design Instrument (CDI) 284 at those times, and display the probes sequentially 294 for the Customers while they are told what to do with their VCRs and video cameras. If a customer agrees to participate 288, the probes are posed using the customer's TV screen (hence, the questions could be in text, in audio, or in full-motion video). The customer would use a two-way response method appropriate for that cable TV vendor 296 (such as pressing numbers on a keypad or the hand-held remote, calling in on a particular phone number and pressing numbers on the phone's keypad, etc.). The Development Interaction (DI) and response recording components of the CB-PD Module might then be located at the cable TV service or by high-speed data network it could be relayed to another data center. If at the cable TV vendor, it would collect the data at the station 304. If at a central location, that would collect the data 304. If its system permits it and the participant authorizes the release of that information, the cable TV Vendor might also identify the responses by household, so the product Vendor (JVC in this example) can computer-match the responses to households that have registered as owners of JVC VCRs and video cameras, to confirm the validity of those Customer suggestions. It can compare households that have not registered JVC products to those that do, to determine which views generalize to potential JVC customers and which do not. JVC might also buy the list of households that participate but do not own JVC products, as potential customers with whom it may be valuable to establish a relationship. This Customer Design System (CDS), as a broadcast service, provides opportunities for current and potential Customers to assist Vendors like JVC in designing new products and services, with built-in market research systems for determining the commercial success of those designs, and for following up personally with current and potential Customers.

In addition to networks like cable TV, a variety of computerized services (like Prodigy, CompuServe and Bulletin Board Systems [BBS's]) may offer on-line Customer-Based Product Design Services like the example just described. Unlike a cable TV Vendor, however, a computerized service may provide these assessments one-on-one with individual Customers, with each Development Interaction (DI) personalized for individual Customers by the service's computer.

Another ramification is that a CB-PD Module can be generalized into an interactive two-way networking device that can provide various types of assistance, communications or other services, in addition to what has been described above. For example, the CB-PD Module in the telephone PBX, above, could be used by the company's human resources department to dial each employee in the company's on-line telephone directory 282, ask if it may take a moment to ask a health question 288, and if the employee agrees 288, asking whether the employee smokes cigarettes 294. If the employee says yes (such as by pressing 1 for yes and 2 for no on the telephone keypad), the next probe could ask if the employee would like to be enrolled in a stop-smoking class 294. Favorable responses could be added to a list 304 that is transmitted back to the human resources department 312 from which employees may be phoned and classes scheduled.

New Specialized Systems

The present invention may provide many types of specialized feedback systems from customers and markets by enabling them to "talk back" to products, so that specific audiences at vendor companies may accomplish their objectives better than is currently possible, such as:

Research and Development (R&D): Specialized systems that view the marketplace as a listening system and a learning laboratory, with clear measures of what is wanted that doesn't yet exist, so customers receive more of the incremental improvements and new breakthroughs that they want to buy.

Product designers and programmers: Specialized systems that clearly tell them the biggest problems customers and users have with existing products, and with the new prototype products they design, along with the information they need to solve those problems.

Product testing: Specialized systems that are easy and inexpensive to incorporate into prototype products at various stages of development, to enable cheap and fast field testing worldwide, to learn what needs to be fixed before the product is shipped.

Marketing: Specialized systems that research market needs, identify customers with those needs, and sum the results so that marketing managers know the biggest and most valuable opportunities for growth, and how to achieve them.

Sales: Specialized systems that learn from each customer who at that company needs to buy more product, why they need it, their budget authority and available budget, and assists in putting a salesman (or an on-line purchase opportunity) in front of that person as soon as their needs develop.

Customer support: Specialized systems that tell customer support managers what the users' precise problems are, store the customer support that will solve those problems, download the support solutions on-demand into products throughout the marketplace, and help customers during product use at the precise moment when they encounter those problems.

Training: Specialized systems that learn what are the customers' goals as well as their problems, to assist in rapidly reformulating training courses and materials to help them achieve their unique goals as well as solve their precise problems.

Etc.

These examples of specialized systems describe a small part of the range of organizational objectives that may be met by means of the present invention or of parts of it. In addition, this invention may be employed to develop many new types of specialized systems based on both traditional and non-traditional models of organizational behavior, objectives, etc.

Examples of New Systems Based on Traditional Objectives

This invention may be used to extend many types of traditional products, services, tools, software applications, corporate information systems, etc. For example, if the designer of a medical monitor is using a Computer Aided Design (CAD) tool and starts designing or re-designing the product's control panel, this product extension could automatically bridge from that type of use of the CAD tool to the Customer-Based Product Design Report (CB-PDR) database to display the customers' real problems, needs and suggestions for improving that product's control panel. Thus, the customers' and market's knowledge and needs would be displayed automatically and interactively at specific points during the use of other tools that are used to design and create products.

For another example, if a Computer Aided Software Engineering (CASE) Tool software developer is designing a specific part of a software application, such as its workflow automation, by working on each of those specific features in the application design, this invention's product extension could automatically display the relevant portions of the CB-PDR database so that the produce developer would know, at valuable moments during product development, the real customer problems and needs for each of those parts of the product.

By means of similar product extensions, vendor employees such as product managers, marketing managers, customer support and many others throughout an organization could also receive immediate, built-in display of unfulfilled customer needs at the precise moments when they are working on the related areas of the organization's business, tasks, activities, steps, etc. In each case the tools that they use to do their jobs (executive information systems, marketing information systems, customer support systems, service employee systems such as at car rental checkout counters, within equipment such as medical monitors for cardiac stress tests, and within general tools such as spreadsheets, etc.) would be extended to automatically access and display the real customer needs that will help workers do specific tasks better.

Similarly, other types of organizations could incorporate these types of extensions into their tools, tasks and operations. The benefits of accurate and timely understanding of their "customers'" problems and needs could be interactively and automatically displayed during the specialized tasks of employees working in government departments, agencies, non-profit organizations, charities, think tanks, international bodies, ad hoc working groups, industry associations, etc.

While the information from Customers would certainly be focused on obvious improvements such as product designs and increased revenues, such feedback systems could also provide "views" that sort and display the data to focus employee activities on cross-cutting goals that meet the broader needs of organizations, markets and societies. Some examples include:

Safety (the desired improvements that make the manufacture, sale and use of a product safer for both Customers and Vendor employees), Cost (the desired improvements that lower Vendor costs and produce greater margins for the Vendor and increased purchasing power for Customers), Errors (the desired improvements that reduce the rate of errors by those who use the product), Performance (the desired improvements that increase the performance of Customers and Vendors in clear and measurable ways), Etc.

Such performance extensions may make many types of material transformations in the capabilities, quality and services of organizations that integrate them into one or more parts of their operations, objectives and achievements.

Examples of New Systems Based on Non-traditional Models

Non-traditional models may be found from a wide diversity of sources. Consider the human body as an example of two separate but mutually supporting patterns of operation that exist simultaneously, to illustrate combining various types of CB-PD Module systems with each other and with entirely different types of systems. In the human body every cell knows what to do. At the same time, people think at the level of conscious actions, conceptual thoughts and conscious sensory messages received from the world—they do not think about their individual cells or consciously manage cellular behavior. This "human model" differs from many bureaucracies that manage the behaviors of their individual employees at a virtually microscopic level. In contrast to bureaucratic organizations, human beings offer the model of separate control systems: Cells receive messages from the organism as a whole, but each cell's control center is its own DNA; that DNA guides its development (such as determining whether it becomes a brain cell, a muscle cell, skin, intestine or whatever) and its behavior (what to do, when to do it, when to reproduce and when to die). On the organism level, the human brain is freed to attain consciousness (such as formulating plans to use the body as an integrated whole to interact with the world, construct its purposes, plan steps, and achieve them) and meta-consciousness (to think about how effective one is in achieving one's purposes; why that works or doesn't work; what one's goals and ideals should be; and what other behaviors, beliefs, appearances, etc. might be more successful).

Similarly, this invention may provide multiple levels and types of feedback systems based on the model just described (or any of many models that may be chosen). Two examples are Interactive Marketing Audit Systems and Reflexive Operating Systems. Together, these might assist an organization in starting to operate more like the conscious organism depicted above than a bureaucratic organization (should an organization want to evolve in such a direction). That is, organizations might gain systems focused on improving their ability to deal with large markets (Interactive Marketing Audit Systems, a parallel to consciousness and meta-consciousness), while individual parts of the organization gain systems that help them improve their ability to deal with their local performance and situations (Reflexive Operating Systems, a parallel to local cellular control). One of the reasons for such a choice might be to make an organization more focused and efficient; that is, it devotes fewer resources to micro-managing each person and each task, and enables each part of the organization to devote more time, energy and resources to achieving its objectives.

Interactive Marketing Audit Systems

What do customers and markets really think of a company's product(s), its objectives, their relationship(s) with the company, etc.? Why do they think that? What would they like the product(s) or company to do to maximize value to them, their performance, etc.?

Instrument Design Repository (IDR):

Many types of Interactive Marketing Systems may be constructed by gaining direct communications with Customers through CB-PD Modules in products throughout a marketplace. The example proposed here is a high-level marketing self-audit that learns if the company has the marketing and product objectives Customers believe it should have. To learn this, select interactions that let users state what they believe the product or company's objectives are, and should be, from their viewpoints. Then select interactions that determine if the company is reaching those perceived objectives, or what the company should do to reach those perceived objectives. Other CB-PD Module studies might investigate the company's actual objectives and how it can achieve them better; the company's product or marketing plans for the next year and how well those plans will meet customer needs; or what customers would consider a breakthrough in the product, the company's support for it, the business relationship, etc.—what would make them stand up and cheer.

One type of interactive marketing audit might establish comparative baselines in what could be called an Interactive Benchmarking Study. That could determine a company's or a product's competitive advantages and deficiencies compared to its major competitors. Use the CB-PD Module to benchmark the performance and expectations of specific groups of customers. To learn about the relative performance of customers who use competing products, identify them through the CB-PD Module and run iterative studies that ask them to provide answers about competitor products through the Module in your product. Include questions about the specific reasons why the customer buys each product, what they receive from each product, the areas in which each product is superior or deficient, and what it would take for the customer to switch purchases to your company. Keep all replies anonymous, or allow customers to identify themselves if they would like a salesperson to call on them.

While Interactive Marketing is often thought of as focused on individual customer needs, this entire invention provides those capabilities. This example of an Interactive Marketing Audit adds to normal marketing the capability of asking the "big" questions that determine how one's company could grow faster and why: How do customers decide which products they buy, what are ideal relationships with vendors and how would they like to build those relationships, etc. Select interactions that iteratively uncover the important unknowns in how these core customer needs may be supported to produce increased market share. Many types of interactions are possible and they can be determined by senior management; by the company's specialists in areas like market research, sales, etc.; by outside consultants; etc.

Development Interactions (DI) in the CB-PD Modules:

A crucial step in any deeper use of this invention is that it is an iterative dialog, not a one-time survey. For example, in one type of Interactive Marketing Audit employ the responses to the first round of questions to divide respondents into three groups based on their replies: those who like the company's (or product's) objectives and performance, those who like the objectives but dislike the actual performance, and those who would like changes. Then download follow-up questions into each group's CB-PD Modules in its products, with the interactions attached to multiple triggers that represent their group's satisfactions and dissatisfactions, so that focused interactions will occur at appropriate times during actual product uses: (1) For those who feel the company (or product) has the best objectives and is achieving them, ask one set of questions, (2) For those who feel the company has the best objectives but isn't achieving them, learn how they would like the company (or product) to perform better, and ask what difference it would make if that were done? Include interactions that let customers demonstrate (by such means as on-line actions, transactions, measurable product use, etc.) or state (by means of questions and responses) what they would do if those changes were made, (3) For those who feel the company (or product) needs to change its objectives and performance, clarify what those changes should be, why, and what difference it would make; select interactions that let customers demonstrate (by such means as on-line actions, transactions, measurable product use, etc.) or state (by means of questions and responses) what they would do if the company or product made those changes. Use the CB-PDR System to store and analyze the data; if possible, compare the results with other organizations that run similar Interactive Marketing Audits.

Communications and Transmissions:

Three of the changes intended by this high-level Interactive Marketing Audit System depend on the invention's in-product communications: (1) To provide customers with faster and more valued product evolution than competitors, (2) To meet customer needs more accurately than competitors, and (3) To communicate more with customers in multiple markets than competitors. In brief, Interactive Marketing Audits generate a strategic impact through communications advantages that expand speed, accuracy and scope: The companies that employ it engage customers and markets in dialogs (as described throughout the preferred embodiment) and high-level Interactive Marketing Audits that assess both personalized and "big picture" performance that may re-open opportunities for breakthrough transformations in the company's role and value, especially when compared to the performance capabilities of its competitors.

Customer-Based Product Design Reports (CB-PDR):

Use data analysis and this Interactive Marketing Audit System for broadly accessible reports that communicate the market's assessment of the product's or company's roles; the views of key customer groups; and opportunities for transformation and re-engineering that may increase marketing performance, accelerate growth, provide greater value for shareholders, etc.

Frequency:

These types of high-level Interactive Marketing Audits may be run when needed such as (1) every five years on a worldwide basis with all customers; (2) once a year with one (or more) large representative sample(s) of all customers, (3) continuous and iterative learning from small samples of customers in multiple markets, or (4) in any manner desired. Regardless of frequency or scope, the present invention may be employed as a marketing assessment or audit system, to rapidly and more accurately realign the organization's objectives and operations with the needs of its customers and its markets.

Recursive Use:

Attach CB-PD Modules to triggers throughout the Interactive Marketing Audit System to determine the areas where particular types of Interactive Marketing Audits succeed and where any difficulties lie. Go into the IDR to select or adapt interactions and triggers that overcome the difficulties, download the new interactions to the products used by appropriate customers, and employ recursive assessment to confirm that the problems are solved. Iterate with any remaining difficulties until the Interactive Marketing Audit System provides evidence of smooth and effective operation.

Reflexive Operating Systems

Can an information infrastructure become able to ask valuable questions of its users while they are using it, automatically provide those users with event-triggered and on-demand reports, and help users steer themselves toward the improvements they need and want in their own areas? Such reflexive operating guidance, built into an organization's information infrastructure may provide local advantages by helping (1) identify certain problems where and when they begin; (2) maximize certain types of performance as a normal part of work; (3) improve productivity by generating and applying local learning rapidly; (4) gain new operating capabilities by discovering some types of breakthroughs and harnessing them throughout the organization; (5) etc.

Instrument Design Repository (IDR):

A Reflexive Operating System reacts to current conditions and events, triggers questions that may generate earlier awareness and knowledge, and automatically distributes that learning rapidly to appropriate workers so they can adapt or create corrective behavior sooner and more accurately. Rather than asking the "big" questions, select interactions that are task-based, small, quick to answer, and focused on many narrow and measurable areas of business activities or tasks. Concentrate iterative learning on revealing the important unknowns in how individual work and small-group operations actually take place, and the suitability of task outcomes to business objectives. Many types of interactions are possible and they can be determined by the workers themselves, by managers, by internal experts, by outside consultants, etc. For example, to learn if any particular worker is doing the right task in the right way(s), measure portions of worker performance that can be measured and are valuable (such as number completed in a standard period, error rates during that period, where and when errors occur during work, time on task, time on sub-task, etc.). Enter the norms into a CB-PD Module so that its triggers are based on substantial variances from the norms—accomplishing too much as well as too little. From the fastest workers learn what makes them better. From the slowest, what causes their problems and why. From average workers, what are the reasons why small improvements and breakthroughs generally succeed or fail—asked in the context of the actual attempt to make those improvements, with questions based on the outcomes of those attempts. Keep replies anonymous if needed.

Development Interactions (DI) in the CB-PD Modules:

In iterative steps use the findings- to probe in the specific areas uncovered, followed by suggested improvements. Groups of workers can do this by using on-screen CB-PDR reports to see the data during work and then bridging into an IDR database of interactions to probe themselves and to suggest improvements on-line.

Let employees use IDR interactions to suggest improvements to themselves and to each other (see the section on On-line Customer Support, above). Those improvements should be displayed at the specific trigger points where breakdowns occur. Test those improvements, wherever appropriate, with on-line measurements of work performance and outcomes. While adopting valuable improvements use the reflexive operating system to engage in continuous improvement. For example, the next step may be to investigate (1) the opportunities to work faster and better, (2) the obstacles to superior performance, (3) using the invention's On-line Support systems to share "best practice" improvements with other employees, (4) etc.

An important step is turning a reflexive operating system into an iterative dialog, not a one-time survey. Based on the responses to the first round of interactions, divide the respondents into groups that reflect their performance and their replies. Then download follow-up questions into the CB-PD Modules in the portions of the information infrastructure used by each group, with the interactions attached to specific triggers that represent their specific task performance, problems and achievements, so that appropriate interactions will occur at appropriate times during work: (1) For those who perform well and produce successful business results, tailor one set of interactions, (2) For those who perform well but don't produce success, construct a set of interactions that determines breakdowns and needed improvements, (3) For each remaining group focus on learning its unique problems and its opportunities to overcome them. Use the present invention to store and analyze the data, to compare it with other organizations that run similar Reflexive Operating Systems, and to deliver—on-line during work—the solutions and improvements needed.

Communications and Transmissions:

The specific changes intended by a Reflexive Operating System are based on achieving faster and more accurate self-management and self-improvement than bureaucratic organizations provide, especially in down-sized organizations where each manager has a larger span of control. It does this by making various kinds of feedback loops, analysis of them, and the ability to deliver improvement know-how at the correct moments during work, available to employees as a normal part of their jobs. These capabilities depend on the invention's communications: (1) To engage employees in faster self-learning and self-directed performance improvement cycles, (2) To meet performance objectives at the task and activity levels more accurately, and (3) To communicate more with themselves and each other in tasks and activities that determine their performance and achievements. In brief, this invention generates a strategic impact through communications advantages that enable self-measurement, visibility, and precisely targeted solutions: The employees that use it engage themselves and each other, at the individual and small-group level, in assessing their tasks and performance, followed by delivering improvements to the specific people who need them, while they are doing the specific steps where the breakdowns occur.

Customer-Based Product Design Reports (CB-PDR):

Use data analysis and this Reflexive Operating System for broadly accessible reports to provide visibility for the performance of individuals and small-groups in the individual tasks and activities in their jobs, along with the outcomes from their work. Allow employees at many levels to understand what is and isn't being achieved by individuals and groups whose work affects their own performance. Let those employees bridge to IDR interactions that gather additional "fill-in-the-blanks" information that could be used to improve systemic performance. Since the IDR system can be used as a "store and forward" communications system that only delivers its messages when certain trigger conditions are reached, consider allowing employees to store task improvement suggestions that are only delivered if the performance of themselves or others requires it.

Frequency:

A Reflexive Operating System is designed to be used continuously. Regardless of frequency or scope, such a system may be employed as an organizational self-measurement system, to rapidly and more accurately realign individual performance (the micro-level of operations) with the organization's objectives (the meta-level of performance) and its actual operations in serving its customers and its markets.

Recursive Use:

Attach CB-PD Modules to triggers throughout the Reflexive Operating System to determine the areas where particular uses succeed and where any difficulties lie. Go into the IDR to select or adapt interactions and triggers that overcome the difficulties, download the new interactions to the systems used by appropriate employees, and employ recursive assessment to confirm that the problems are solved. Iterate with any remaining difficulties until they are overcome.

Thus the present invention may yield many types of specialized systems that may enhance an organization's current abilities to improve its operations (such as specialized systems that assist R&D, product design, product testing, marketing, sales, customer support, training, etc.); and it also offers a spectrum of innovative systems to assist in redesigning organizational structure, processes, architecture, performance, behavior, etc. (such as Interactive Market Audit Systems and Reflexive Operating Systems). In an information age, such specialized and innovative systems may assist in adjusting to rapid change or even to stimulating it.

By "waking up" an organization's product interfaces and its internal information infrastructure, by adding multi-level feedback systems that provide continuous (and manual and/or automated) customer-based and user-based course corrections on how and when to improve in many areas, the organization gains (1) meta-awareness advantages in setting objectives, improving performance and achieving goals; and (2) reflexive micro-operating advantages in numerous local areas that may be as small as individuals, but can certainly support work groups and business units.

Operating Environments

This CD-PD Module invention is not dependent on a specific type of hardware or on a specific software operating system, manufacturer, product or service. Some environment options include:

This invention may be included as a product feature within or attached to a variety of types of products and services (such as by a CB-PD Module that is built into a product and connected by a transmission means with the product's Vendor; by a desktop computer that links a user with a software vendor or a consulting service; by an interactive television and a connection to a transmission means such as a cable TV line or a telephone line; or by other means that link a Customer's product with a Vendor and turns that product into a Customer Directed Product). It may also be built into products by means of software operating system-level components or utilities, so that all products across the platform of that operating system (such as a computer operating system or an embedded operating system within a physical product) are enabled with this technology and its capabilities. It may also be built into products by means of custom integrated circuits that can be installed as an embedded component or sub-system within a product, so that all products with this set of (one or more) integrated circuits are enabled with this technology and its capabilities.

The Customer can communicate with the CB-PD Module by utilizing any one of many media such as a LCD panel, video display screen, speaker/microphone, keypad or by other output/input means. The CB-PD Module can interface with the Customer by means of various formats and media such as a videotext format, a print format, a touch-sensitive format, a visual format, an audio format, etc.

Customer Directed Products (CDP) may be developed by means of combining a number of different technologies in one specific product, and by combinations of them. Therefore, at any one time it is conceivable that a Customer Directed Product (CDP) may be configured differently depending on the needs of the Vendor; the type of product or service; and the available hardware, software and means of transmission. Nevertheless, the CB-PD Module is fundamentally a computing and networking module that is incorporated into, embedded in or attached to a product or service to provide the means for Customers to use the module or the basic interface of the product to provide quantitative and qualitative data, new ideas, suggestions, etc., during the product's use to guide the Customer Directed Product's (CDP) Vendor in designing and evolving the product to better fit the Customer's needs and desires. Although it is possible for the configuration of the hardware, software, communication services, and other components to differ among the Customer Directed Products from different vendors, the purpose and general interactivity of the CB-PD Module remain similar from the point of view of both the Customer (who is looking to improve the product or service), the Vendor (who is looking to improve the relationship with that Customer and the associated sales and customer satisfaction produced by that relationship), and the combined system of Customer and Vendor (who are looking to benefit jointly as a more efficient and effective team in providing and consuming goods and services, at least in part by means of the inquiry, design, interactive or communications capabilities of the CB-PD Module).

Environments altered by this invention: The application of this invention to various environments, such as markets and information infrastructures, may cause material transformations in their participants, components, processes, architecture, services, etc. Several of these examples were was discussed above (in "Summary of the Invention"). To illustrate the scope of the invention for contributing to new and emerging environments, the example of "Value-Driven Digital Environments" will be presented here.

New Digital Environments

The present invention may also extend the capabilities and qualities of new types of large- and small-scale digital environments. This illustration of the flexibility and scope of the invention may be described with an example that improves the accessibility and value of these digital environments such as (1) integrated corporate-wide information resources, (2) the Internet, (3) combined corporate and external information resources such as an integrated digital environment that includes a firm's internal information resources and a spectrum of resources outside itself—as a single integrated environment, (4) the proposed National Information Infrastructure (NII), and (5) even larger global digital environments.

Conversely, digital environments may be small. Examples include (1) the users of a single brand of word processing software within one workgroup, (2) all users of one brand of one type of software (such as all users of Lotus 1-2-3 for Windows), (3) the users of one type of software (such as all users of desktop publishing software), (4) th users of an internally developed software application, (5) the workers in one department of a business unit such as in a division's customer service, sales, accounting, R&D, or other departments, (6) etc. Thus, small-scale digital environments comprise many types of groupings of users of computer systems.

Similar to the latter examples, the digital environments described here can include physical products served by the present invention (such as all the users of one particular physical product referred to by the preferred embodiment, or any particular group of users of any group of physical products envisioned by the preferred embodiment). The internal functions and features of those physical products may be made more accessible, comprehensible and valuable by the expression of the invention described in this section.

In the domain of large-scale digital environments, these environments force most users to spend more time wrestling with the environment than they may save, because the average person neither understands the environment's full potential nor knows how to harness it. For many, the initial attempt to master such an environment increases one's sense of chaos rather than one's achievements. The enormous amount of information available globally appears as a vast electronic jumble. To paraphrase and modernize T. S. Eliot, "Where is the wisdom? Lost in the knowledge. Where is the knowledge? Lost in the information. Where is the information? Lost in the computer."

Instead of needing access to all information available everywhere, people generally need to obtain the right piece of information, or the right set of features and capabilities, at the right time in order to achieve their current task(s). Since locating those "needles in a haystack" is complex in most digital environments, most people wind up using these new digital environments as personal extensions (through services such as electronic mail and file storage) rather than enhancers that enable them to immediately learn how to make "best practice" leading-edge contributions from each other. From a quantitative view, instead of predictable and measurable benefits, large new digital environments evolve in unpredictable qualitative ways and must be researched simply to learn the nature and formation of their electronic communities and their users' gains and losses in productivity.

This invention may make a range of contributions by providing environment-wide learning and feedback systems that accelerate the evolution of meaningful and valuable patterns of interaction, as well as broad access to those patterns. In addition, this accelerates understanding of the emerging patterns of use by providing visibility into the actual use of the environment as well as the resulting achievements of its users. Thus, it consolidates learning into repeatable examples and models which others may follow virtually immediately. Since these feedback systems may operate on the scale of work groups, products, services, organizations, societies or globally the rate of learning, and the resulting performance improvements, may be increased beyond what such digital environments, and products and services, could otherwise provide.

Examples of such systems could be based on one or more dynamically evolving repositories of user value judgments and navigational pointers that identify the most valuable information available in digital environments of various sizes. For discussion purposes, let us call these Value Locator Repositories, or VLR's. In a generalized instantiation these VLR's could be available on-line and on demand as a dial-in service. In an instantiation that is integrated with the software tools one uses to do work, there could be dynamic links between such a VLR(s) and those tools (where those tools may be enabled for communications with VLR's, or such VLR's may be attached or built into such tools) so that the appropriate pointers to support information from throughout the appropriate digital environment would be displayed automatically at appropriate moments during one's work and users could link to any particular source in one step, regardless of its location worldwide); etc. In a local instantiation, the pointers to a local or product-based VLR(s) could be built into a software application (such as a spreadsheet), a product (such as a medical monitor) or a service (such as a time-sharing computer system) to provide direct access to repositories of content, how-to and other "performance enhancing" information for the product's users in a particular business work group, organization, professional association, users of a particular vendor's product, etc.

By means of this invention, such Value Locator Repositories (VLRs) could dynamically and actively (1) prompt users to contribute additional new learning based on their experiences, and (2) report to users the valuable functions and content discovered by other users of that digital environment. The VLR's would be rapidly adjusted, by either automated or manual means (or both) to reflect recent user experiences and thus reveal what users currently judge to be the most valuable and important information, functions and operations in this environment. Those value, navigation and performance access, along with prompting to continuously learn the value of those pointers to new users and thereby evolve those recommendations, would then be updated in a dynamic learning system(s) throughout the digital environment(s). This accelerated evolution could take place on a dial-in basis, while users work with any tool capable of displaying such information, or in other ways.

Figure 34A:
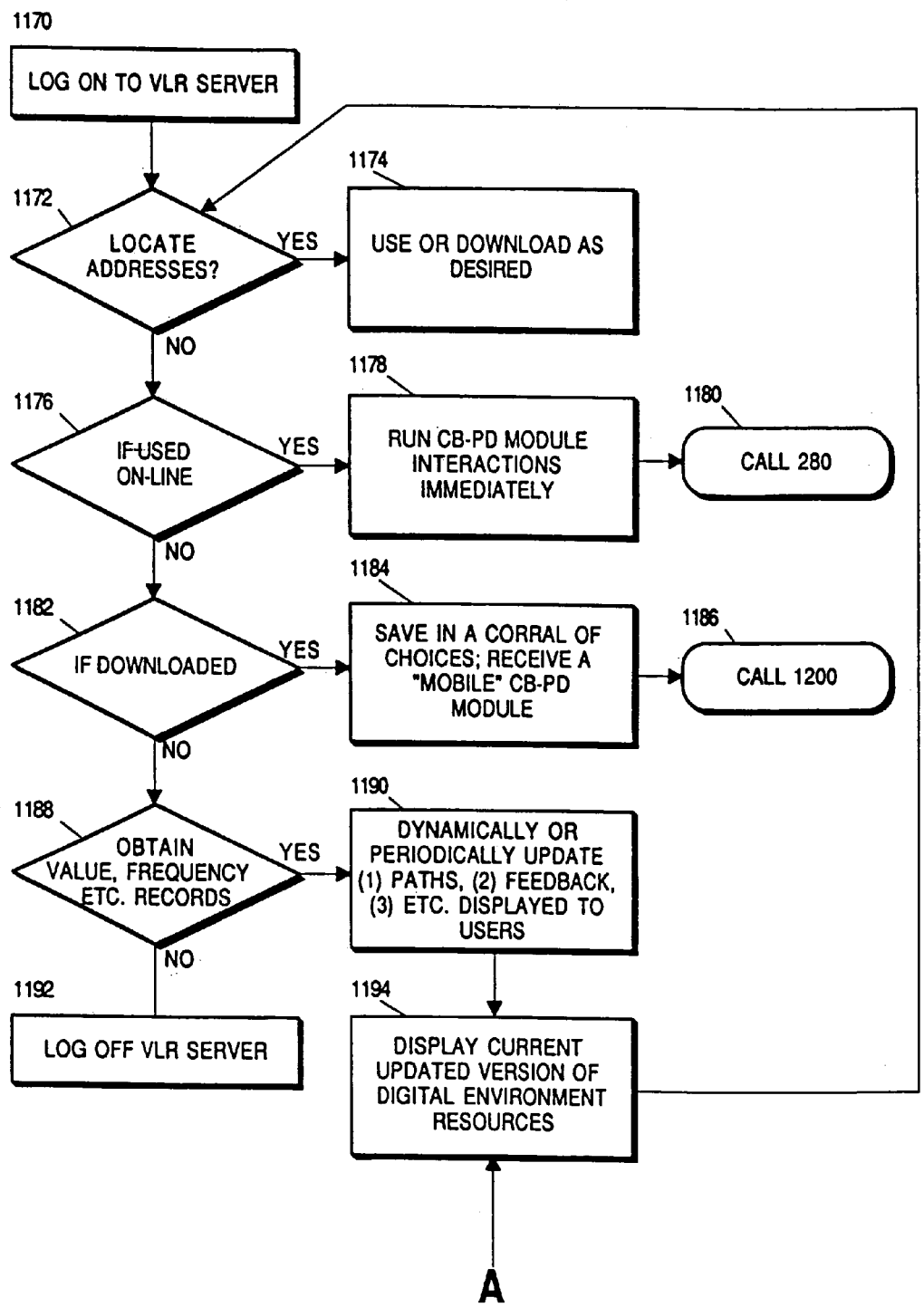
FIG. 34A, 34B is a flowchart of the application of the invention to (existing and new) product environments and digital environments.
Figure 34B:
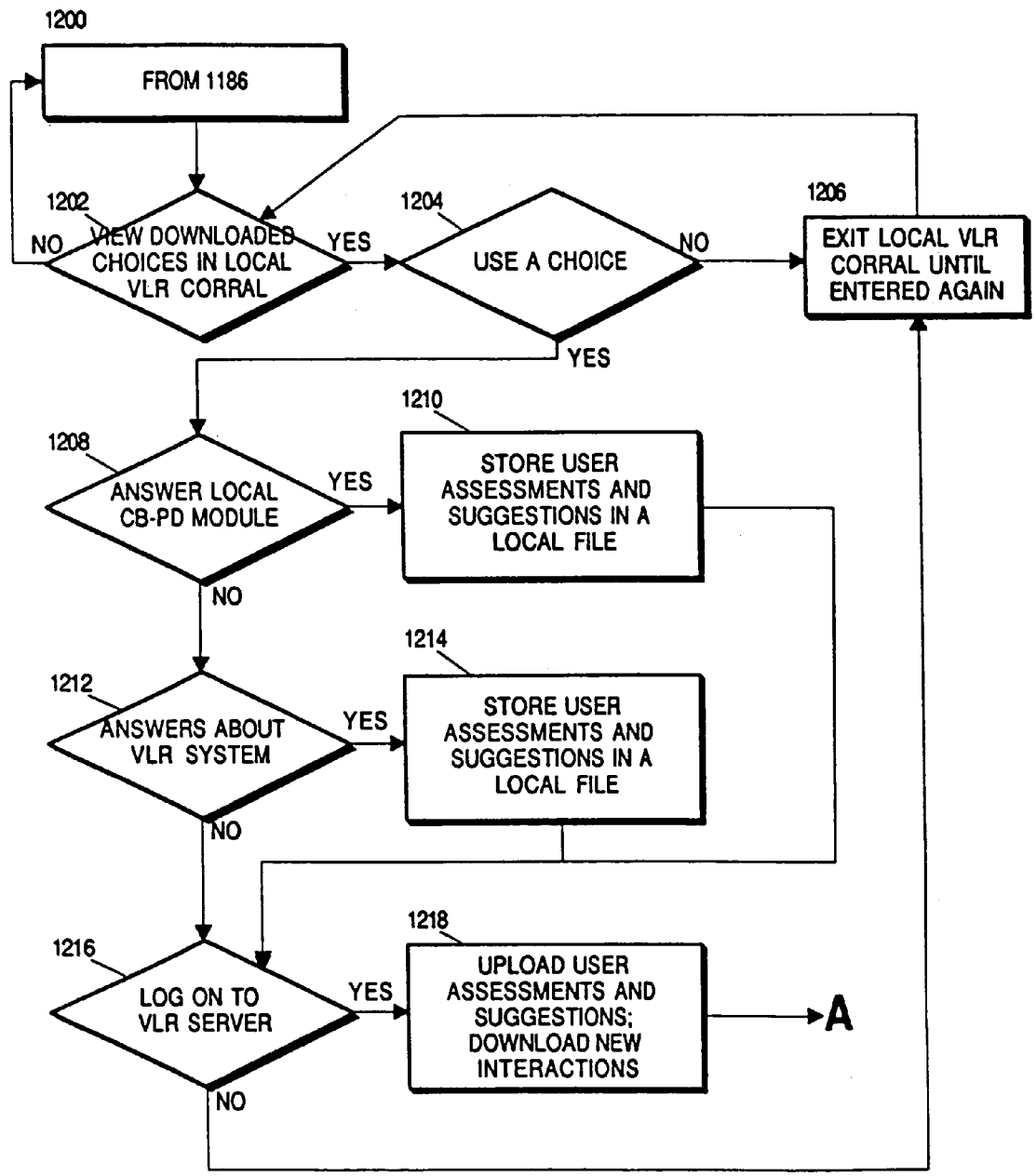

For discussion purposes, let us call one such VLR a "VLR Server" and describe it as if such a VLR Server operated as a free service on the Internet. In this example, personal, organizational or societal "Value Location" might be offered as a continuous service that evaluates the value of the enormous and rapidly expanding base of information available throughout the Internet, along with direct navigational access to it. In practice, there may be multiple VLR Servers in a digital environment; their characteristics and operations may be considerably more flexible than the example described here; and they may be embedded in or attached to other types of systems, organizations and business processes to provide specialized types of Value Location for particular types of users; in addition to the particular instantiation described here. Turning to FIG. 34A, a user logs on to the VLR Server 1170 to locate addresses of valuable information sources along with descriptions of them 1172. These descriptions would display the rankings, comments and ratings of the environment's information resources based on prior uses of them 1194. While logged on the user could use an information source by linking directly to it (e.g., immediately following the navigational pointer to it provided by the VLR Server) 1174, or the user could download one or more VLR addresses and descriptions to a holding "corral" or other local repository on the user's own system 1174. If the user employed any of the VLR Server's pointers while logged in 1176, appropriate CB-PD Module interactions would be run immediately 1178, 1180.

Alternatively, the user could download one or more of the VLR Server's pointers and descriptions 1182 to a local corral on the user's system 1184. During this download the user would receive a "mobile" CB-PD Module that would be stored on the user's system 1184 (such as in the corral of VLR choices). In this latter case, the user could turn to this local corral at any time 1202 to learn whether appropriate resources are available for a particular task. If not, the user may exit this corral 1206. If the user selects a choice in the corral 1204 the mobile CB-PD Module is "attached" to the user's actions with those "value locations" and related uses of the digital environment (as described in the preferred embodiment). Based on the user's actions, at appropriate trigger events CB-PD Module interactions are run 1208 to learn the user's assessments of the information resources found, and the user's suggestions for improving the listing in the VLR Server 1210. While this may be as simple as a value assessment (a subjective ranking of the value of each information resource) and/or a frequency assessment (a quantitative count of how often a particular information resource is accessed, a spectrum of metrics may also be employed. These could include metrics such as:

Cost (of particular information sources and why users chose to pay those prices, or why they did not buy), Productivity (how long users took to select appropriate information resources, whether those turned out to be desirable resources, and correlations between specific presentation styles and the productivity achieved in using the digital environment), Performance (user ratings of the value to them of the content of each information source on their performance, with an automated rating based on the number of "jumps" users make, the percentage of "hits" compared to the number of sources examined, and the length of time spent examining each source), Errors (the ease of accessing each information source, and the particular difficulties encountered during use), User recommended metrics (such as assessments of relevance, value, support for achieving precise objectives, etc.), Features and functions (such as the best ways others found to employ the environment, the software, the product, etc.), Etc.

At the same time, users could provide assessments of the CB-PD Module system 1212 to improve (1) the style and presentation of the digital environment's information resources, so the environment's resources may be made clearer and more accessible, and (2) the ways the CB-PD Module tracks user behavior and interacts with users to learn from them while they are traversing and using the digital environment, so that its own learning system may be improved 1214.

This learning would be communicated to the VLR Server by two-way communications as described in the preferred embodiment. These communications could occur when the user logs on to the VLR Server 1216; by having the mobile CB-PD Module on the user's system "wake up" at specified intervals (as described in the preferred embodiment) to ask permission to send in the data provided by the user and stored on the user's local system; etc. If permitted by the user, the user's assessments are uploaded to the VLR Server and any new interactions are downloaded from the VLR Server to the user's system 1218. The VLR Server receives these user assessments and suggestions from a number of sources such as:

When users employ the navigation pointers and descriptions while on-line 1176 and run CB-PDM interactions immediately 1176, this data is stored directly by the VLR Server 1188.

When users download the navigation pointers and descriptions to their own systems 1182 where they employ them at any time 1202, they may interact with the "mobile" CB-PD Module stored on their system 1208 and this data is stored on their system 1210.

Similarly, a VLR Server may share all or parts of its value data 1178, 1210 with other VLR Servers or receive data from them 1188. This type of data sharing enables the propagation of "value location" data throughout a digital environment to represent the experiences of larger numbers of users in a shorter span of time 1190, 1194. It may also enable the sharing of data that improves the VLR Servers 1212, 1214 throughout a digital environment, increasing the accuracy, helpfulness and effectiveness of VLR Servers to assist users of the digital environment 1194.

Where digital environments overlap and provide common access to users of other digital environments, as some do already, the VLR Servers in different digital environments may share parts of their "value location" data to assist the users of other digital environments.

After a VLR Server has obtained new "value location" data from users 1188 it updates the data displayed to users 1190, 1194. This may take place dynamically, in real time 1190, or it may store the new "value location" data and update its displays periodically 1190 by calculations that are completed at any scheduled interval. Those updates could take place by analysis and presentation means such as those described in the preferred embodiment, or by any other generally accepted method for analyzing data and presenting it in one or more meaningful charts, views, arrangements, hierarchies, graphical maps, sample extracts, abstracts, summary descriptions, hypertext, etc. 1194. Those presentation methods would be an important area for further research by means of the CB-PD Module 1212, 1214 to improve their accuracy and value for specific types of users who are engaged in specific tasks to help them achieve their particular objectives.

There are differences between the preferred embodiment and this expression of the invention. For example, in the preferred embodiment the providers of the invention's information were a product's customers; the users of the information were the product's vendors; though these two groups have many common purposes and goals, they do not generally share the knowledge that comes from this invention except to provide improved products. In the embodiment of the invention described here, this dichotomy disappears. The invention fosters the creation of rapidly self-evolving digital environments: Users of the environment(s) both provide value judgments and they see the analyzed data from the users of the environment(s); in essence, the "marketplace" provides the data and makes use of it, becoming "self-aware" in a new and self-determined way. Thus, this embodiment of the invention provides a new type of marketplace "self-guidance system."

VLR Servers that may be accessed directly as marketplace self-guidance systems may expand the value of the present invention. Modern societies have an amazing capacity to generate an overabundance of mediocre information. Consider that an average 18-year old in the US has spent nearly 50% more time in front of television than in school, and been exposed to some 18,000 televised murders. New digital environments are poised on the brink of providing new environments within which people can be inundated by gargantuan quantities of dubious information. With the growth of cross-border data flows, this information will be generated by a growing number of societies worldwide, dwarfing the current nation-sized communications channels. Without systems like a "Value Locator Repository" so that customers of these environments can dynamically discover and provide clear paths to the most valuable information, civilization may be condemned to a withering bombardment by overwhelming quantities of potentially harmful information.

Once such systems are in place and "value locators" may be looked up or employed interactively during one's work, other ramifications are available: Individual "value locators," or groups of them, could be turned into personal or organizational filters. These filters could enable individuals, workers, business units and organizations to personalize these new digital environments to fit their needs and desires. Consider how such filters could work. Embodiments such as VLR Servers enable individuals and groups to identify patterns of meaningful information, sources, and to download those to their own local systems. With appropriate "gatekeeping" software, these navigational pointers could also provide meaningful filters or search tools. As filters they could screen out information sources not on or similar to these pre-selected lists. As search tools they could be employed to locate additional instances of content or function that resemble those already on the lists. Examples example include be a television viewer-controlled system in which audiences have the ability to rate the acceptability of violence in particular television shows and movies interactively while watching them. As a result, each show could have one or more viewer-set indicators or measures on one or more "violence scales." By selecting a filter point of how much violence a viewing household is willing to accept (perhaps by time of day so that adults and children could set different levels), shows that exceed that level of violence would automatically be excluded (of course, viewers could turn on particular shows when they want, or reset their violence scale by altering a control, such as by moving a slider). In another television example, some news shows concentrate on politics, others on foreign events, many local news shows focus on local fires and murders, and what is called "tabloid journalism" offers what has been termed "sleaze." With such a VLR-based system as described here, viewers may be able to set personal filters that pro-actively assist in selecting the type of news in which they are interested, and the best shows in that category as judged by groups of viewers whose standards are similar to theirs. In sum, through the coordinated use of the information in VLR Servers, it is possible to construct readily available systems for personalizing and customizing many types of digital environments.

In an evolutionary mode, the users of these customized filters could make their choices and identities known to the VLR Servers from which they download their filter patterns. By doing so, the VLRs would serve as even more types of repositories for vendors who provide additional material that meets the needs of those buyers (whether the material is a TV show, a medical monitor that could work in several ways, or a software product). Such systems could enable customers to use their combined preferences and purchasing goals to guide vendors in more self-conscious ways than are possible today, to receive the market outcomes that consumers would rather have. Such customer-directed marketplace repositories provide clear metrics on the size and scope of particular market segments and specific customer objectives, along with identifying specific purchasers who want to be contacted with improved products and services. With clearer product improvement goals and focused communications, the savings from these efficiencies and the higher performance from achieving these goals can be shared as higher profits for first-to-market vendors and greater performance for early-adopter buyers.

Instead of the relatively closed communications systems described in the preferred embodiment, this embodiment provides: (1) the identification of "value" can be an active part of product use across marketplaces and digital environments, (2) that knowledge could be embodied in "Value Locator Repositories" that is employed by larger numbers of users so that they immediately receive greater value from products, services and environments (hereafter "products"), (3) those VLRs could be accessible during product use to improve performance interactively and immediately, (4) preferred sets of "value locators" could be downloaded to serve as filters to customize the digital environment to produce more of the product use outcomes purchasers prefer, (5) filters and those who employ them (where users are willing to share that information) could be stored on the VLRs where vendors could access them to learn what customers want to buy across the marketplace, (6) responsive vendors can serve those needs faster, producing more rapid evolution toward the types of human welfare people themselves would like.

One result could be faster evolution of products, services, environments and markets to supply the types of human and product progress people need and want to purchase. A second result could be a faster transfer of commercial guidance from vendors to those who pay the money (e.g., customers). In the end, since customers spend the money they could now have an independent self-conscious ability, with interactive market-wide communications, to steer vendors toward selling them the world they would like to buy.

What is claimed is:

1. A system comprising:
   units of a commodity that can be used by respective users in different locations,
   a user interface, which is part of each of the units of the commodity, configured to provide a medium for two-way local interaction between one of the users and the corresponding unit of the commodity, and further configured to elicit, from a user, information about the user's perception of the commodity,
   a memory within each of the units of the commodity capable of storing results of the two-way local interaction, the results including elicited information about user perception of the commodity,
   a communication element associated with each of the units of the commodity capable of carrying results of the two-way local interaction from each of the units of the commodity to a central location, and
   a component capable of managing the interactions of the users in different locations and collecting the results of the interactions at the central location.

2. The system of claim 1 in which the user interface is triggered based on user behaviors to generate two-way interactions with each of the users, each of the interactions relating to a corresponding specific one of the behaviors.

3. The system of claim 1 in which the interactions are triggered to occur repetitively for each of the users based on repeated uses of a feature of a unit of the commodity by the user.

4. The system of claim 1 in which the user interface comprises part of a functional user interface of the unit of the commodity that can be used to control features of the commodity.

5. The system of claim 1 in which the communication element also carries information from a passive probe that monitors the user's use of the commodity.

6. The system of claim 1 in which the units of the commodity comprise telephone extension equipment and the central location comprises a private branch exchange or other central telephone network facility.

7. The system of claim 1 in which the results of the interactions are forwarded from the central location to a remote server for analysis.

8. The system of claim 1 in which the units of the commodity comprise facsimile equipment and the user interface triggers the two-way interaction to occur on-line between the unit of the facsimile equipment and a vendor of the facsimile equipment.

9. The system of claim 8 in which the on-line interaction occurs by voice spoken through the facsimile machine's handset, transmitted by telephone line to a computer of the vendor, and stored at the vendor's computer.

10. The system of claim 1 in which the two-way interaction provides instructions on how to use the commodity.

11. The system of claim 1 in which the units of the commodity comprise consumer television equipment.

12. The system of claim 11 in which the two-way interaction comprises posing questions to a user on a television screen concerning use of the commodity and receiving answers from the user expressed through a keypad or a handheld remote.

13. The system of claim 12 in which the answers are forwarded to a vendor of the commodity.

14. The system of claim 12 in which the keypad or hand-held remote comprises numeric keys.

15. The system of claim 1 in which the two-way interaction is mediated by a publicly or privately accessible on-line computerized information service.

16. The system of claim 1 in which the user interface presents information in one or more of the following styles: text, lists, charts, views, arrangements, hierarchies, graphical maps, sample extracts, abstracts, summary descriptions, or hypertext.

17. The system of claim 16 in which the user interface triggers two-way interactions that comprise training based on two-way interactions with all or some other users, the interactions being arranged to present actions that the user could take to increase performance or satisfaction to a level achieved by other users.

18. The system of claim 16 in which the style is hypertext.

19. The system of claim 1 wherein the user interface can be triggered based on user comprehension or performance with respect to the user's use of the commodity.

20. The system of claim 1 wherein the user interface can be triggered by premature termination of use of the commodity.

21. The system of claim 1 wherein the user interface can be triggered by an exception resulting from use of the commodity.

22. The system of claim 1 wherein the elicited information is information about the user's needs with respect to use of the commodity.

23. The system of claim 1 wherein the elicited information is information about the user's perception of competing commodities.

24. The system of claim 1 wherein the two-way local interactions comprise a transaction for sale of a product or a service contract for the commodity.

25. The system of claim 1 wherein the two-way local interactions comprise a request for servicing of the commodity by the user.

26. The system of claim 1 wherein the user interface includes a sound recorder.

27. The system of claim 1 wherein the units of commodity are configured to store voice or sound information.

28. The system of claim 1 wherein the units of commodity are configured to digitize voice or sound information.

29. The system of claim 1 wherein the two-way interaction comprises voice communication.

30. The system of claim 1 wherein the user interface includes a console displaying text or graphics.

31. The system of claim 30 wherein the console comprises a display of a computer, phone, or handheld device.

32. The system of claim 1 wherein the component is configured to provide access to the collection of results to vendors of the commodity.

33. The system of claim 1 wherein the component is configured to provide access to the collection of results to the users of the commodity.

34. The system of claim 33 wherein the component distributes results of the interactions to the users as a function of when the interactions occurred.

35. The system of claim 33 wherein the component further manages collection of information for each interaction about usefulness of the interaction to other users.

36. The system of claim 33 wherein the component is further configured to allow each user to filter information in the collection of the results according to a user's own needs, or desires.

37. The system of claim 1 wherein the component is configured to provide access to the collection of results to third parties.

38. The system of claim 1 in which the units of commodity store one or more probes that elicit specific information from the respective users through the user interfaces.

39. The system of claim 38 in which the component that manages the interactions of the users sends the probes to each of the units of the commodity.

40. The system of claim 1 in which the information about the commodity comprises value information.

41. The system of claim 40 in which the value information comprises usage logs.

42. The system of claim 40 in which the value information comprises information about user comprehension.

43. The system of claim 40 in which the value information comprises information about user performance.

44. The system of claim 40 in which the value information guides a user's interaction with the commodity.

45. The system of claim 40 in which the value information comprises marketing information or information about future product design.

46. The system of claim 1 in which the two way local interaction enables the user to request help or support.

47. The system of claim 1 in which the information relates to perception of a problem relating to use of the commodity.

48. The system of claim 47 in which the two-way local interaction includes suggestions of the user to solve the problem.

49. The system of claim 47 in which the two-way local interaction includes suggestions of another user to solve the problem.

50. The system of claim 1 wherein the commodity is a demonstration unit.

51. The system of claim 1 wherein the communication element also carries objective information about the user's use of the commodity.

52. The system of claim 1 wherein the two-way local interactions occur while the user is using the commodity.

53. The system of claim 1 wherein the component further manages collection of the results of the interactions along with information about a trigger event that initiated each respective interaction.

54. A system comprising:
units of a facsimile equipment that can be used by respective users in different locations,
a user interface which is part of each of the units and is configured to trigger a two-way interaction to occur on-line between the unit of the facsimile equipment and a vendor of the facsimile equipment, the user interface being configured to generate information about use of the unit by the user,
a communication element associated with each of the units capable of carrying results of the two-way local interaction from each of the units to a central location, and
a component capable of managing the interactions of the users in different locations and collecting the results of the interactions at the central location.

55. The system of claim 54 in which the user interface can be electronically triggered based on user behaviors to generate two-way interactions with each of the users, each of the interactions relating to a corresponding specific one of the behaviors.

56. The system of claim 54 wherein the component is configured to provide access to the collection of results to the users of the commodity.

57. The system of claim 54 wherein the component is configured to provide access to the collection of results to vendors of the commodity.

58. The system of claim 54 wherein the component is configured to provide access to the collection of results to third parties.

59. The system of claim 54 in which the on-line interaction occurs by voice spoken through the facsimile machine's handset, transmitted by telephone line to a computer of the vendor, and stored at the vendor's computer.

60. A system comprising:
units of a commodity that can be used by respective users in different locations,
a user interface which is part of each of the units of the commodity and is configured to provide a medium for two-way local interaction between one of the users and the corresponding unit of the commodity for generating information about use of the unit of the commodity by the user, the user interface being configured to elicit information about (i) steps that a vendor of the commodity could take to improve the user's satisfaction or (ii) training or support provided for users of the commodity;
a communication element associated with each of the units of the commodity capable of carrying results of the two-way local interaction from each of the units of the commodity to a central location, and
a component capable of managing the interactions of the users in different locations and collection of the results of the interactions at the central location and provides access to the collection of results to a third party.

61. The system of claim 60 in which the results of the interactions are forwarded from the central location to the third party.

62. The system of claim 60 in which the results of the interactions are forwarded from the central location to a remote server for analysis.

63. The system of claim 60 in which the third party is a vendor of the commodity.

64. The system of claim 60 in which the third party is a designer of the commodity.

65. The system of claim 60 wherein the user interface presents user information in a style that comprises hypertext.

66. The system of claim 60 in which the user interface can be electronically triggered based on user behaviors to generate two-way interactions with each of the users, each of the interactions relating to a corresponding specific one of the behaviors.

67. The system of claim 60 in which the interactions are triggered based on repeated use of a feature of a unit of the commodity by the user.

68. The system of claim 60 in which the component is further configured to provide access to the collection of results to the users of the commodity.

69. A method for gathering information from units of a commodity in different locations, each unit of the commodity being coupled to a remote database on a network, the method comprising:

eliciting user perceptions of respective units of the commodity through interactions at a user-interface of the respective unit;

generating perception information based on inputs of the users at the respective user-interfaces;

transmitting the perception information to the remote database;

receiving the transmitted perception information from different units of the commodity; and collecting and storing the received information at the remote database.

70. The method of claim 69 further comprising enabling users of the commodities to access the received information.

71. The method of claim 69 further comprising enabling third parties to access the received information.

72. The method of claim 71 in which the third parties include vendors or designers of the commodities.

73. The method of claim 69 further comprising making a design change using the received information, or marketing the commodity using the received information.

74. The method of claim 69 wherein said eliciting step includes interacting with the users through the respective user-interfaces of units of commodity to elicit perception information about (i) steps that a vendor of the commodity could take to improve user satisfaction or (ii) training or support provided for users of the commodity.

* * * * *